US009841563B2

(12) United States Patent
Lapstun

(10) Patent No.: US 9,841,563 B2
(45) Date of Patent: Dec. 12, 2017

(54) SHUTTERED WAVEGUIDE LIGHT FIELD DISPLAY

(71) Applicant: Paul Lapstun, Rodd Point (AU)

(72) Inventor: Paul Lapstun, Rodd Point (AU)

(*) Notice: Subject to any disclaimer, the term of this patent is extended or adjusted under 35 U.S.C. 154(b) by 66 days.

(21) Appl. No.: 15/007,255

(22) Filed: Jan. 27, 2016

(65) Prior Publication Data

US 2016/0139402 A1 May 19, 2016

Related U.S. Application Data

(63) Continuation-in-part of application No. 14/269,071, filed on May 2, 2014, now Pat. No. 9,456,116.

(51) Int. Cl.

| | | |
|---|---|---|
| *G02F 1/13* | (2006.01) | |
| *G02B 6/27* | (2006.01) | |
| *G02B 6/34* | (2006.01) | |
| *G02B 6/02* | (2006.01) | |
| *G02B 26/10* | (2006.01) | |
| *G02B 27/22* | (2006.01) | |

(Continued)

(52) U.S. Cl.
CPC ....... *G02B 6/2766* (2013.01); *G02B 6/02066* (2013.01); *G02B 6/274* (2013.01); *G02B 6/34* (2013.01); *G02B 26/101* (2013.01); *G02B 27/0075* (2013.01); *G02B 27/0093* (2013.01); *G02B 27/225* (2013.01); *G02B 27/2214* (2013.01); *G09G 3/003* (2013.01); *G09G 3/02* (2013.01); *H04N 13/0228* (2013.01); *H04N 13/0242* (2013.01); *H04N 13/0402* (2013.01); *G09G 2354/00* (2013.01); *H04N 5/2254* (2013.01); *H04N 13/0484* (2013.01)

(58) Field of Classification Search
CPC .. G02B 6/2766; G02B 6/02066; G02B 6/274; G02B 6/34; G02B 6/353; G02B 26/101; G02B 27/0075; G02B 27/0093; G02B 27/2214; G09G 3/003; G09G 3/02; G09G 2354/00; H04N 13/0228; H04N 13/0242; H04N 13/0402; H04N 5/2254; H04N 13/0484
See application file for complete search history.

(56) References Cited

U.S. PATENT DOCUMENTS

| | | | | |
|---|---|---|---|---|
| 2002/0122015 A1* | 9/2002 | Song | ................... | G02B 27/0081 345/8 |
| 2011/0007377 A1* | 1/2011 | Selbrede | .............. | G02B 6/0053 359/222.1 |

* cited by examiner

*Primary Examiner* — Nathanael R Briggs

(57) ABSTRACT

A light field display device comprising at least one multiplexed light field display module, the multiplexed light field display module comprising a view image generator, a waveguide, and a set of shutters spatially distributed along the waveguide, the view image generator optically coupled to the waveguide, the waveguide optically coupled to each shutter, the view image generator operable to generate a set of beams of light from one of a set of view images, the waveguide configured to transmit the set of beams along its length via internal reflection, each shutter operable to be switched between a closed state and an open state, the closed state of the shutter configured to prevent the beams from escaping the waveguide, the open state of the shutter configured to allow the beams to escape the waveguide, the module operable to generate, over time, the set of beams from a different one of the set of view images, and to open, over time, a different subset of the set of shutters, thereby to allow the set of beams escaping from the subset to correspond to a different one of the set of view images.

20 Claims, 64 Drawing Sheets

(51) Int. Cl.
G09G 3/00 (2006.01)
G09G 3/02 (2006.01)
H04N 13/02 (2006.01)
H04N 13/04 (2006.01)
G02B 27/00 (2006.01)
*H04N 5/225* (2006.01)

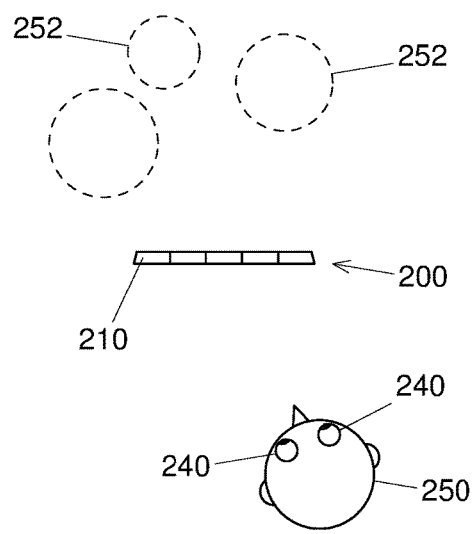
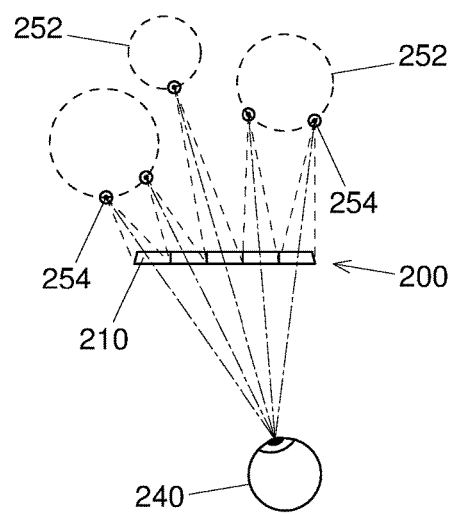
Fig. 10A    Fig. 10B
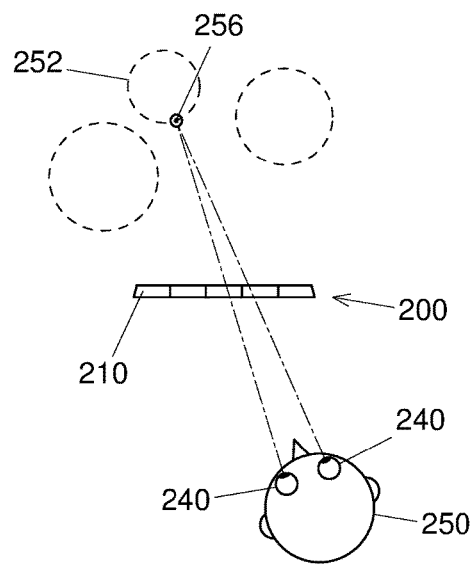
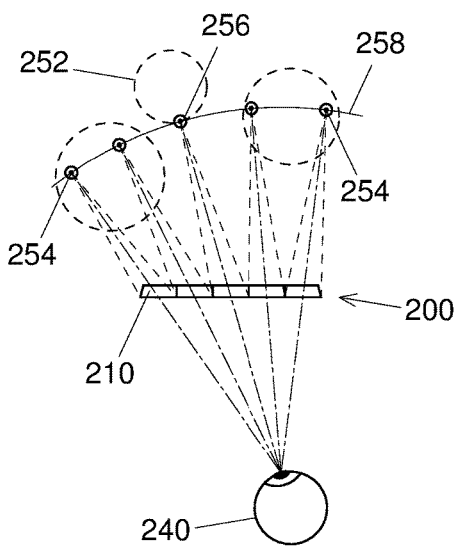
Fig. 10C    Fig. 10D

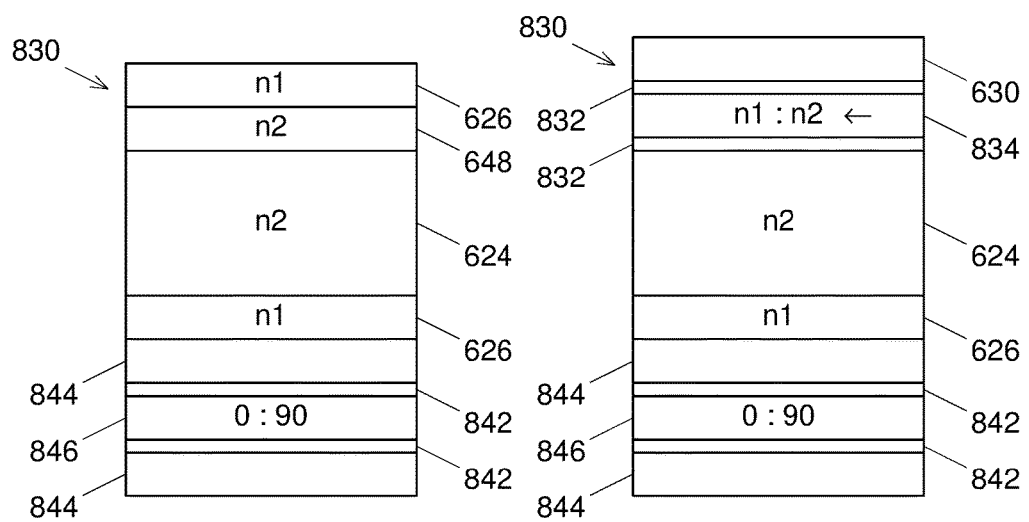

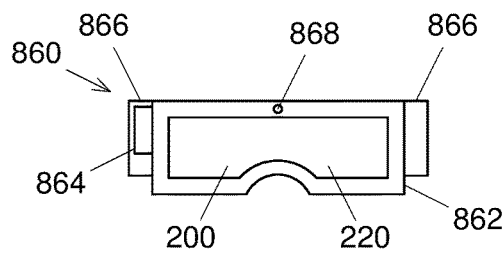
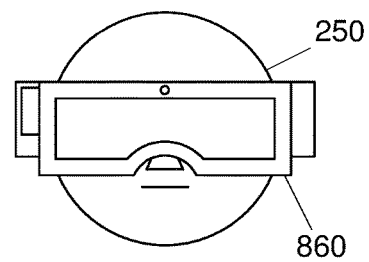
Fig. 55A                    Fig. 55B
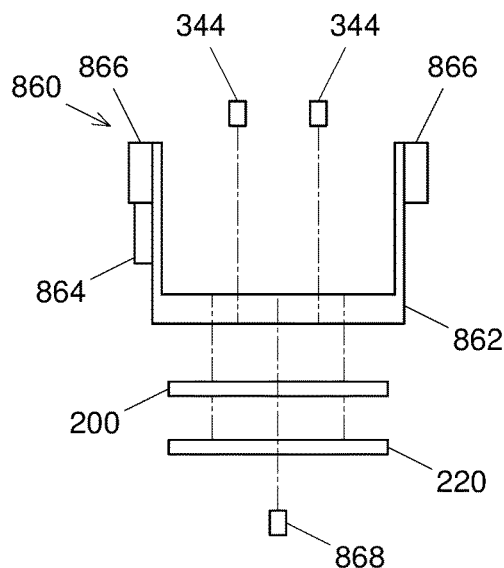
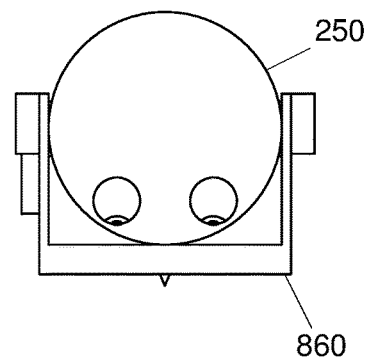
Fig. 55C                    Fig. 55D

SHUTTERED WAVEGUIDE LIGHT FIELD DISPLAY

CROSS-REFERENCE TO RELATED APPLICATIONS

This application is a continuation-in-part of application Ser. No. 14/269,071, filed May 2, 2014, which is a continuation of application Ser. No. 13/567,010, filed Aug. 4, 2012, now U.S. Pat. No. 8,754,829, both of which are incorporated herein by reference in their entirety.

FIELD OF THE INVENTION

The present invention relates to high-fidelity light field displays, cameras, and two-way displays.

BACKGROUND OF THE INVENTION

A 7D light field (or plenoptic function [Adelson91]) defines the spectral radiance of every ray passing through every point in a volume of space over time, and therefore contains every possible view within that volume. A 6D light field defines the spectral radiance of every ray passing through a given surface over time, i.e. it represents a slice through a 7D light field.

Typically, only rays passing through the surface in one direction are of interest, e.g. rays emitted by a volume bounded by the surface. The 6D light field at the boundary can be used to extrapolate the 7D light field of the surrounding space, and this provides the basis for a light field display. The extrapolation is performed by rays emitted by the display as they propagate through space.

Although an optical light field is continuous, for practical manipulation it is band-limited and sampled, i.e. at a discrete set of points on the bounding surface and for a discrete set of ray directions.

The ultimate purpose of a light field display, in the present context, is to reconstruct a continuous optical light field from an arbitrary discrete light field with sufficient fidelity that the display appears indistinguishable from a window onto the original physical scene from which the discrete light field was sampled, i.e. all real-world depth cues are present. A viewer sees a different view from each eye; is able to fixate and focus on objects in the virtual scene at their proper depth; and experiences smooth motion parallax when moving relative to the display.

The ultimate purpose of a light field camera, in the present context, is to capture a discrete light field of an arbitrary physical scene with sufficient fidelity that the discrete light field, when displayed by a high-fidelity light field display, appears indistinguishable from a window onto the original scene.

Existing glasses-free three-dimensional (3D) displays fall into three broad categories [Benzie07, Connor11]: autostereoscopic, volumetric, and holographic. An autostereoscopic display provides the viewer (or multiple viewers) with a stereo pair of 2D images of the scene, either within a single viewing zone or within multiple viewing zones across the viewing field, and may utilise head tracking to align the viewing zone with the viewer. A volumetric display generates a real 3D image of the scene within the volume of the display, either by rapidly sweeping a 0D, 1D or 2D array of light emitters through the volume, or by directly emitting light from a semi-transparent voxel array. A holographic display uses diffraction to recreate the wavefronts of light emitted by the original scene [Yaras10].

Volumetric and holographic displays both reconstruct nominally correct optical light fields, i.e. they generate wide-field wavefronts with correct centers of curvature. However, volumetric displays suffer from two major drawbacks: the reconstructed scene is confined to the volume of the display, and the entire scene is semi-transparent (making it unsuitable for display applications that demand realism). Practical holographic displays suffer from limited size and resolution, and typically only support horizontal parallax in current implementations [Schwerdtner06, Yaras10, Barabas11].

Typical multiview autostereoscopic displays provide a limited number of views, so don't support motion parallax. So-called 'holoform' autostereoscopic displays [Balogh06, Benzie07, Urey11] provide a larger number of views (e.g. 10-50), so provide a semblance of (typically horizontal-only) motion parallax. However, they do not reconstruct even nominally correct optical light fields.

SUMMARY OF THE INVENTION

In a first aspect, the present invention provides a light field display device comprising at least one multiplexed light field display module, the multiplexed light field display module comprising a view image generator, a waveguide, and a set of first shutters spatially distributed along the waveguide, the view image generator optically coupled to the waveguide, the waveguide optically coupled to each first shutter, the view image generator operable to generate a set of beams of light from one of a set of view images, the waveguide configured to transmit the set of beams along its length via internal reflection, each first shutter operable to be switched between a closed state and an open state, the closed state of the first shutter configured to prevent the beams from escaping the waveguide, the open state of the first shutter configured to allow the beams to escape the waveguide, the module operable to generate, over time, the set of beams from a different one of the set of view images, and to open, over time, a different subset of the set of first shutters, thereby to allow the set of beams escaping from the subset to correspond to a different one of the set of view images.

The set of view images may constitute a light field frame or a light field video.

The device may comprise a set of focus modulators, each focus modulator optically coupled to a subset of the set of first shutters, each focus modulator operable to impart a specified variable focus to the set of beams escaping the subset.

The waveguide may comprise a core at least partially surrounded by a cladding, the core having a larger refractive index than the cladding, thereby to allow the waveguide to transmit the set of beams along its length via total internal reflection.

The first shutter may be opened by overcoming total internal reflection, or by activating a grating configured to couple the set of beams out of the waveguide.

The first shutter may comprise a birefringent liquid crystal cell adjacent to the core, the first shutter opened by switching the cell to select a refractive index of the cell matching the core refractive index, thereby to overcome total internal reflection.

The core may incorporate a grating configured to weakly couple the set of beams out of the waveguide, thereby to allow the waveguide to act as an exit pupil expander.

The first shutter may comprise a polarization rotator sandwiched between two linear polarizers, the first shutter opened by switching the rotator to rotate a polarization of the set of beams to match a relative rotation of the two linear polarizers.

The device may further comprise a set of second shutters spatially distributed along the waveguide, the waveguide optically coupled to each second shutter, each second shutter operable to be switched between a closed state and an open state, the closed state of the second shutter configured to prevent the beams from escaping the waveguide, the open state of the second shutter configured to allow the beams to escape the waveguide when a corresponding one of the set of first shutters is also open.

The second shutter may comprise a polarization rotator sandwiched between two linear polarizers, the second shutter opened by switching the rotator to rotate a polarization of the set of beams to match a relative rotation of the two linear polarizers.

DRAWINGS

Figures

FIG. 10A shows a viewer gazing at a light field display emitting a light field corresponding to a virtual scene consisting of several objects.

FIG. 10B shows the location of one of the eyes used to determine a viewing direction through each display element, and thus, for each viewing direction, an intersection point with a scene object.

FIG. 10C shows the gaze direction of each of the viewer's two eyes used to estimate their fixation point.

FIG. 10D shows the plane of focus of one of the eyes, estimated from the depth of the fixation point, and, for each viewing direction, an intersection point with the plane of focus.

FIG. 51A shows a diagram of a shuttered element utilizing polarization rotation.

FIG. 51B shows a diagram of a shuttered element utilizing index matching and polarization rotation.

FIG. 55A shows a front elevation of a video see-through head-mounted light field display.

FIG. 55B shows a front elevation of a video see-through head-mounted light field display, with viewer.

FIG. 55C shows an exploded plan view of a video see-through head-mounted light field display.

FIG. 55D shows a plan view of a video see-through head-mounted light field display, with viewer.

DRAWINGS

Reference Numerals

Figure 1A:
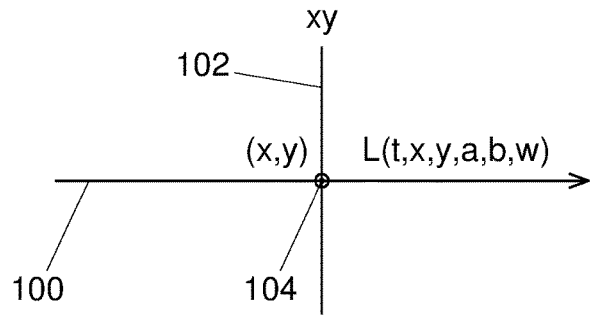
FIG. 1A shows a representative ray of a continuous 6D light field, traversing the boundary of a volume of interest.

100 Ray of light field.
102 Light field boundary.
104 Ray intersection point with light field boundary.
110 Light field video.
112 Temporal interval.
114 Temporal sampling period.
116 Light field frame.
118 Spatial field.
120 Spatial sampling period.
122 Light field view image.
124 Angular field.
126 Angular sampling period.
128 Spectral radiance.
130 Spectral interval.
132 Spectral sampling basis.
134 Radiance sample.
136 Depth.
138 Sampling focus.
150 Light sensor array.
152 Light sensor.
154 Angular sampling beam.
156 Angular sampling filter pinhole.
158 Image plane.
160 Spatial sampling filter lens.
162 Spatial sampling beam.
164 Image point.
166 4D sampling beam.
168 Object point.
170 Object plane.
180 Light emitter array.
182 Light emitter.
184 Angular reconstruction beam.
186 Angular reconstruction filter pinhole.
188 Spatial reconstruction filter lens.
190 Spatial reconstruction beam.
192 4D reconstruction beam.
200 Light field display.
202 Display output beam.
204 Virtual point source.
206 Wavefront.
210 Light field display element.
212 Element output beam.
220 Light field camera.
222 Camera input beam.
224 Real point source.
230 Light field camera element.
232 Element input beam.
240 Viewer eye.
242 Eye object point.
244 Eye pupil.
246 Axial input beam.
248 Eye image point.
250 Viewer.
252 Scene object.
254 Display element focus.
256 Viewer fixation point.
258 Viewer eye object plane.
300 Two-way light field display.
310 Two-way light field display element.
320 Network.
322 Two-way display controller.
324 Remote viewer.
326 Virtual image of remote viewer.
328 Local viewer.
330 Virtual image of local viewer.
332 Remote object.
334 Virtual image of remote object.
336 Local object.
338 Virtual image of local object.
340 Camera controller.
342 Display controller.
344 Tracking camera.
400 First positive lens.
402 Electrode.
404 Convex part of variable negative lens.
406 Variable negative lens.
408 Electrode.
410 Linear polarizer.
412 Second positive lens.
414 Output/input beam.
416 Second variable negative lens.
418 Switchable polarization rotator.
450 Multiplexed light field display module.
452 View image generator.
454 Collimator.
456 Output waveguide.
458 Output shutter.
460 Multiplexed light field camera module.
462 View image sensor.
464 Decollimator.
466 Input waveguide.
468 Input shutter.
470 Multiplexed two-way light field display module.
472 Collimator/decollimator.
474 Waveguide.
476 Shutter.
478 Focus modulator.
480 Beam multiplexer.
500 Scanned output beam.
502 Output view image.
504 Line scanner.
506 Frame scanner.
508 2D scanner.
510 Timing generator.
512 External frame sync.
514 Frame sync.
516 Line sync.
518 Sampling clock.
520 Radiance controller.
522 Beam generator.
524 Radiance modulator.
526 Output focus.
528 Output focus controller.
530 Output focus modulator.
540 Color beam generator.
542 Red beam generator.
544 Red radiance modulator.
546 Green beam generator.
548 Green radiance modulator.
550 Blue beam generator.
552 Blue radiance modulator.
554 First beam combiner.
556 Second beam combiner.
600 Scanned input beam.
602 Input view image.
604 Radiance sensor.
606 Radiance sampler.

608 Input focus.
610 Input focus controller.
612 Input focus modulator.
614 Beamsplitter.
620 Shuttered waveguide.
622 Exit pupil expander.
624 Waveguide core.
626 Waveguide cladding.
628 Waveguide coupling grating.
630 Shutter coupling grating.
632 Closed internal shutter.
634 Open internal shutter.
636 Generated display ray.
638 Internally-reflected ray.
640 Internal-shutter-transmitted ray.
642 Exiting display ray.
644 Entering camera ray.
646 Sensed camera ray.
648 Weak coupling grating.
650 Closed external shutter.
652 Open external shutter.
654 External-shutter-transmitted ray.
660 Shuttered 2D waveguide.
662 Shuttered row waveguide.
664 Shuttered column waveguide.
666 Open column shutter.
668 Selected shuttered column waveguide.
670 Open element shutter.
672 Row waveguide ray.
674 Column waveguide ray.
680 Collimating lens.
682 Variable focus lens.
700 Laser.
702 Angular reconstruction filter.
704 Variable output focus.
706 Beamsplitter.
708 Mirror.
710 Biaxial scanning mirror.
712 Mirror.
714 Variable input focus.
716 Fixed input focus.
718 Aperture.
720 Photodetector.
730 Angular reconstruction filter lenslet.
732 Collimated output beam.
734 Angular reconstruction beam let.
740 Biaxial scanner platform.
742 Biaxial scanner platform hinge.
744 Biaxial scanner inner frame.
746 Biaxial scanner inner frame hinge.
748 Biaxial scanner outer frame.
750 Biaxial scanner mirror support post.
752 Biaxial scanner mirror.
760 Stationary input beam.
762 Shift-and-accumulate photodetector linear array.
764 Photodetector linear array.
766 Photodetector.
768 Analog shift register.
770 Analog shift register stage.
772 Analog-to-digital converter (ADC).
774 Beam energy sample value.
800 Oscillating display panel.
802 Oscillating display chassis.
804 Oscillating display frame.
806 Oscillating display cover glass.
808 Support spring.
810 Spring support bracket on panel.
812 Spring support bracket on chassis.
814 Actuator.
816 Rod.
818 Actuator support bracket on panel.
820 Actuator support bracket on chassis.
830 Shuttered waveguide element.
832 Internal shutter electrode.
834 Internal shutter nematic liquid crystal.
836 Surface relief coupling grating.
838 Internal shutter FLC polarization rotator.
840 Birefringent cladding.
842 External shutter electrode.
844 External shutter linear polarizer.
846 External shutter FLC polarization rotator.
850 Multiplexed video see-through light field display module.
852 Multiplexed optical see-through light field display module.
854 Ambient linear polarizer.
856 Ambient ray.
858 Polarized ambient ray.
860 Video see-through head-mounted light field display.
862 Head-mounted display frame.
864 Head-mounted display controller.
866 Headphone and microphone.
868 Range finder.
870 Optical see-through head-mounted light field display.
872 Prescription optics.
874 Transparent light field display.
900 Detect face & eyes.
902 Estimate gaze direction.
904 Transmit eye positions & gaze direction.
906 Autofocus in gaze direction.
908 Estimate fixation point.
910 Transmit eye positions & fixation point.
912 Focus on fixation plane.
920 Capture light field frame.
922 Transmit light field frame.
924 Resample light field frame.
926 Display light field frame.
930 Eye positions (datastore).
932 Fixation point (datastore).
934 Light field video (datastore).
936 Resample light field frame with focus.
938 3D animation model.
940 Render light field frame with focus.
950 Two-way panel controller.
952 Two-way element controller.
954 View image datastore.
956 Two-way element controller block.
958 2D image datastore.
960 Collimated view image datastore.
962 Network interface.
964 Input video interface.
966 Output video interface.
968 Display timing generator.
970 Panel motion controller.
972 High-speed data bus.
980 Display element field.
982 Display element eye field.
984 Foveal field.
986 Partial view image datastore.
988 Partial foveal view image datastore.

DETAILED DESCRIPTION OF PREFERRED EMBODIMENTS

Light Field Parameterization

FIG. 1A shows a representative ray 100 of a continuous 6D light field, traversing the boundary 102 of the volume of interest at an intersection point 104. The radiance (L) of the ray 100 is a function of time (t), boundary position (via coordinates x and y), ray direction (via angles a and b), and wavelength (w).

While the radiance of the ray is strictly only defined at the boundary, i.e. at the intersection point 104, additional knowledge of the transparency of the two volumes separated by the boundary can allow the ray's radiance to be extrapolated in either direction.

Radiance is a measure of radiant power per unit solid angle per unit area (measured in watts per steradian per square meter, $W/sr/m^2$). For an infinitesimal ray of a continuous light field, the radiance is defined for an infinitesimal solid angle and area.

For eventual display to a human, the radiance is usually sampled sparsely using either a triplet of basis functions related to the tristimulus color response of the human visual system, or a single basis function related to the human luminance response. These basis functions ensure proper band-limiting in the wavelength (w) dimension. For convenience the wavelength dimension is usually left implicit in most analysis. Thus a 6D light field becomes a 5D light field.

The time dimension (t) may be sampled at discrete time steps to produce a sequence of 4D light field frames analogous to 2D image frames in a conventional video sequence. To avoid motion blur, or just as a matter of practicality, proper band-limiting is often not applied to the time dimension when sampling or generating video, and this can lead to aliasing. This is typically ameliorated by sampling at a sufficiently high rate.

References in the literature to a 4D light field (and in the present specification, where appropriate) refer to a 4D light field frame, i.e. defined at a particular instant in time, with an implicit wavelength dimension.

Figure 1B:
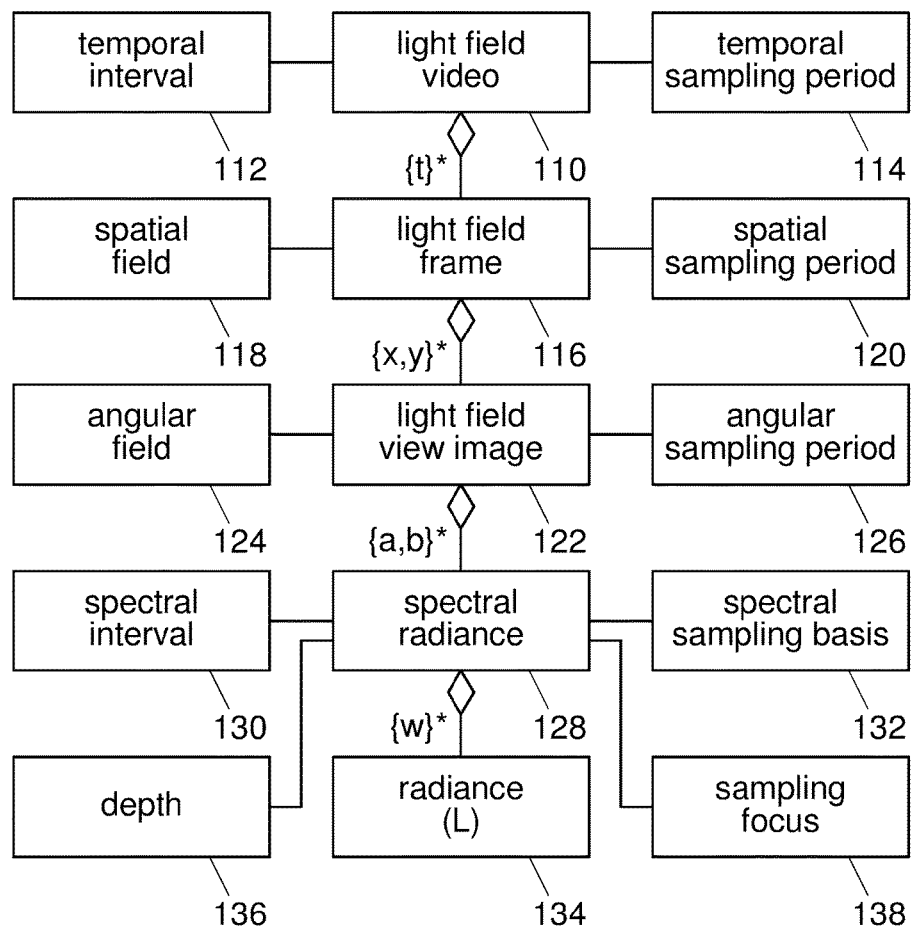
FIG. 1B shows a class diagram for a sampled, i.e. discrete, 6D light field.

FIG. 1B shows a class diagram for a sampled, i.e. discrete, 6D light field, structured as a light field video 110.

The light field video 110 consists of a sequence of light field frames 116, ordered by time (t), and captured over a particular temporal interval 112 with a particular temporal sampling period 114.

Each light field frame 112 consists of an array of light field view images 122, ordered by ray position (x and y), and captured over a particular spatial field 118 with a particular spatial sampling period 120.

Each light field view image 122 consists of an array of spectral radiances 128, ordered by ray direction (a and b), and captured over a particular angular field 124 with a particular angular sampling period 126.

Each spectral radiance 128 consists of a sequence of radiance (L) samples 134, ordered by wavelength (w), and captured over a particular spectral interval 130 according to a particular spectral sampling basis 132. The spectral radiance 128 has an optional depth 136, i.e. the depth of the scene in the ray direction, if known. The spectral radiance 128 also records the sampling focus 138 with which it was captured. The depth 136 and sampling focus 138 are discussed further below.

Each radiance (L) sample 134 records a scalar radiance value.

In this specification the term "beam" is used to refer to a bundle of rays, whose characteristics vary but are qualified in each context.

Light Field Sampling

FIGS. 2A, 2B, 3A and 3B illustrate an approach to band-limiting and sampling a continuous light field to obtain a discrete light field.

Figure 2A:
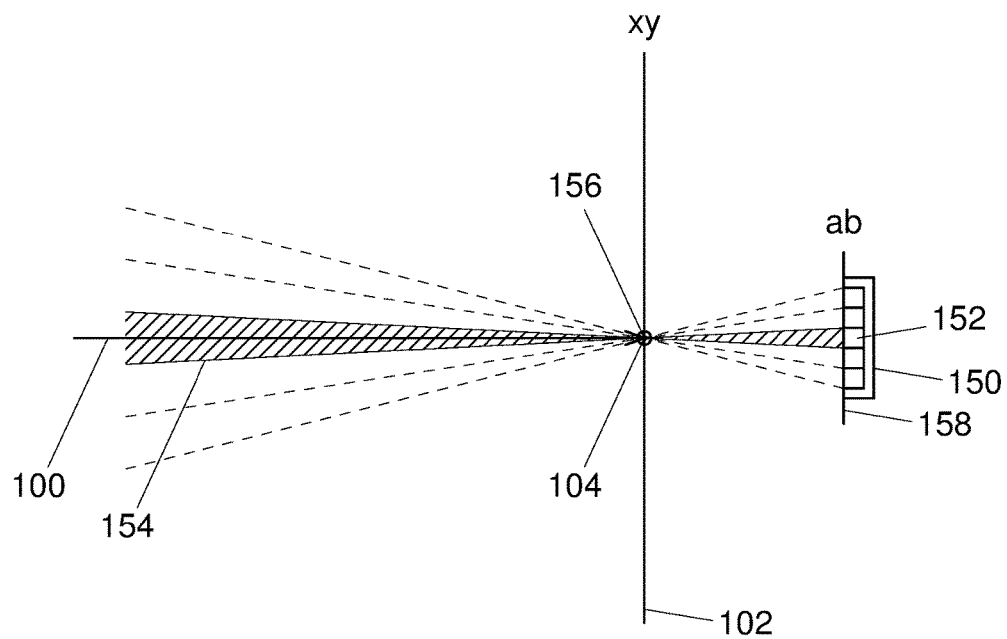
FIG. 2A shows a light sensor array sampling ray direction for a particular ray position.

FIG. 2A shows a light sensor array 150 sampling the continuous light field with respect to ray direction for a particular ray position 104. Each light sensor 152 of the array 150 samples a particular ray direction, and integrates the beam 154 surrounding the nominal ray 100. This integration effects 2D low-pass filtering with respect to ray direction. The effective filter kernel is a non-ideal box filter corresponding to the spatial extent of the light sensor 152. The light sensors are ideally closely packed to ensure adequate filter support. The angular sampling beam 154 is focused at an infinitesimal pinhole aperture 156, which coincides with the ray position 104 on the boundary 102.

The light sensor array 150 lies in a plane 158, parameterized by ray direction angles a and b.

The angular field 124 is the angle subtended at the angular sampling filter pinhole 156 by the light sensor array 150. The angular sampling period 126, i.e. the inverse of the angular sampling rate, is the angle subtended by the center-to-center spacing of the light sensors 152. The angular sample size (i.e. the filter support) is the angle subtended by the extent of the light sensor 152. The angular sample count equals the angular field 124 divided by the angular sampling period 126, i.e. the number of light sensors 152.

Figure 2B:
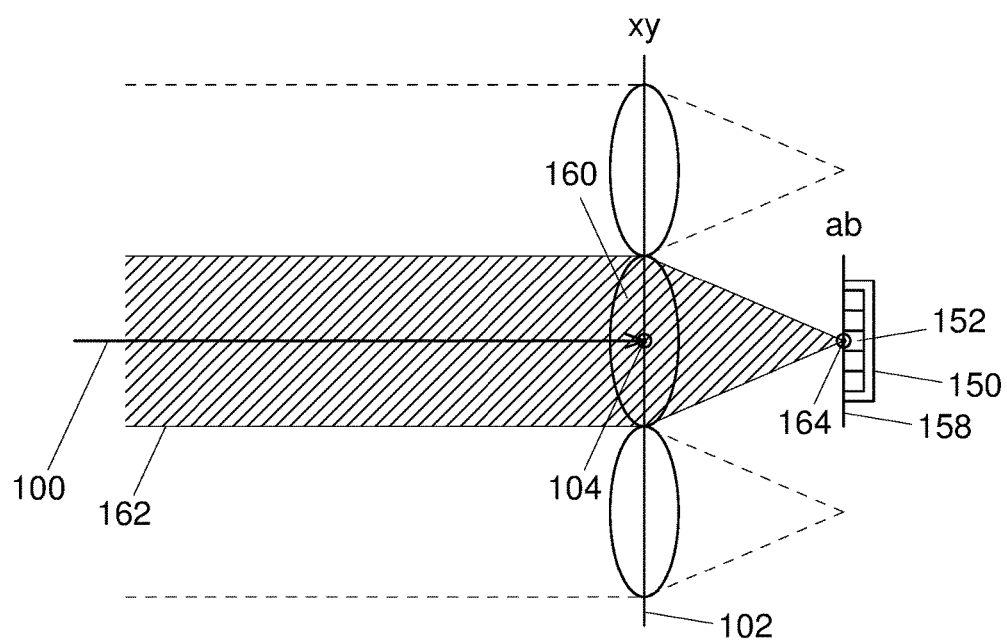
FIG. 2B shows an array of lenses sampling ray position at the light field boundary.

FIG. 2B shows an array of lenses sampling the continuous light field with respect to ray position at the boundary 102. Each lens 160 of the array samples a particular ray position, and integrates the parallel beam 162 surrounding the nominal ray 100 by focusing the beam to a point 164 on the light sensor 152. This integration effects 2D low-pass filtering with respect to position. The effective filter kernel is a non-ideal box filter corresponding to the spatial extent of the aperture of the spatial sampling filter lens 160. The lenses are ideally closely packed to ensure adequate filter support.

The image distance is the distance from the second principal point of the lens 160 to the image plane 158.

The spatial field 118 equals the extent of the bounding surface 102. The spatial sampling period 120, i.e. the inverse of the spatial sampling rate, is the center-to-center spacing of the spatial sampling filter lenses 160. The spatial sample size (i.e. the filter support) is the area of the aperture of the lens 160. The spatial sample count equals the spatial field 118 divided by the spatial sampling period 120, i.e. the number of lenses 160.

Figure 3A:
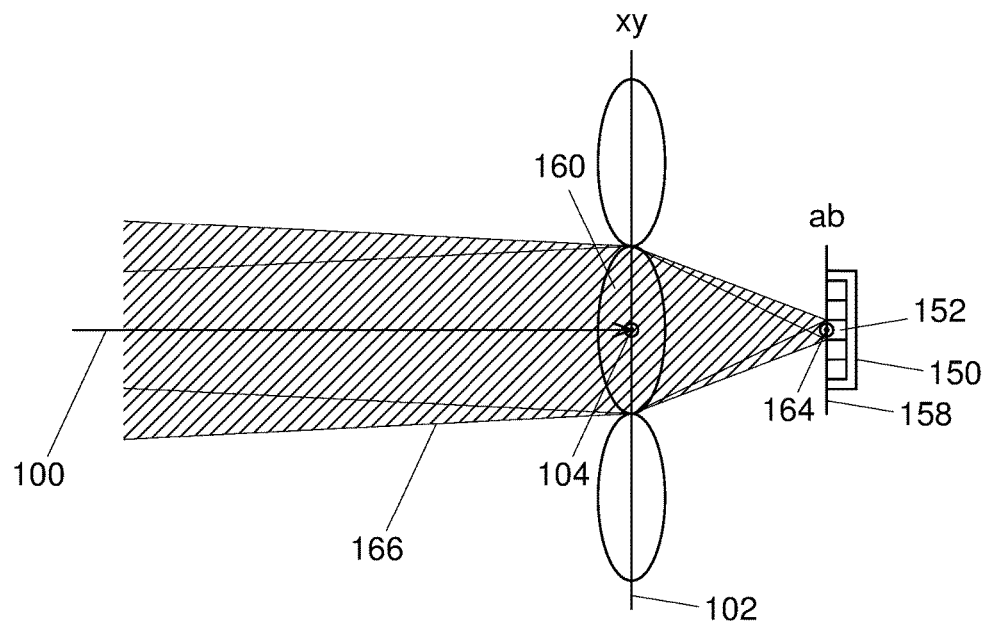
FIG. 3A shows the combined effect of the spatial extent of the light sensor and the aperture of the lens to effect 4D low-pass filtering.

FIG. 3A shows the combined effect of the spatial extent of the light sensor 152 and the aperture of the lens 160 integrating sampling beam 166 to effect 4D low-pass filtering, i.e. with respect to direction and position simultaneously. The effective filter kernel is a 4D box filter, which provides reasonable but non-ideal band-limiting. It is difficult to do better than a box filter when integrating light spatially.

The scalar value obtained from the light sensor 152 is typically proportional to the time-integral of radiant power, i.e. radiant energy. It is convertible to a radiance sample 134 by dividing it by the 5D sample size (i.e. 1D exposure duration, 2D spatial sample size, and 2D angular sample size).

Note that the size of the light sensor 152 in the figures is exaggerated for clarity, and that the divergence of the (otherwise parallel) beam 166 due to angular sampling is therefore also exaggerated.

Low-pass filtering of a light field results in visible blurring. In the present sampling regime, blur is proportional to the diameter of beam 166. This has two additive components: the angular sampling blur, which corresponds to the angular sampling filter, i.e. the diameter of angular sampling beam 154 in FIG. 2A; and the spatial sampling blur, which corresponds to the spatial sampling filter, i.e. the diameter of spatial sampling beam 162 in FIG. 2B.

Figure 3B:
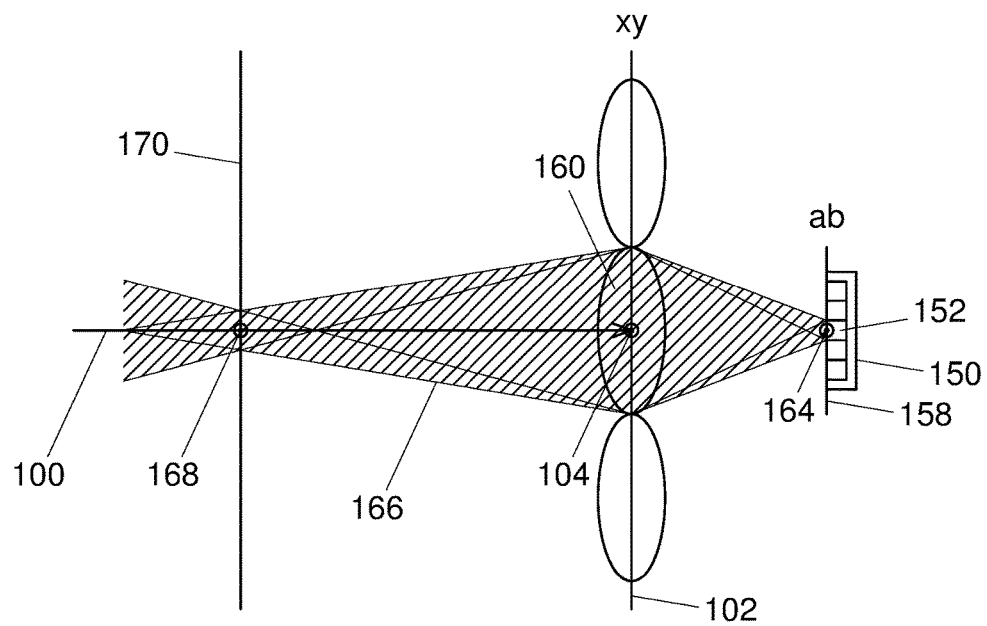
FIG. 3B shows the sampling beam of FIG. 3A focused at a point in object space using a lens with higher power.

FIG. 3B shows beam 166 focused at a point 168 in object space using a lens 160 with higher power than the lens 160 in FIG. 3A. The corresponding object distance is the distance from the object point 168 to the first principal point of the lens 160. At the object point 168 (and in general on the object plane 170) the spatial sampling blur is zero, and the beam diameter corresponds to the angular sampling blur alone.

The object sampling period, i.e. at the object plane 170, equals the (tangent of the) angular sampling period 126 multiplied by the object distance.

When the object plane 170 is at infinity then the sampling beam 166 of FIG. 3A is obtained.

The convergence angle of the sampling beam 166 (or more properly the spatial sampling beam 162) is the angle subtended by the aperture of the lens 160 at the object point 168. Depth of field refers to a depth interval, bounded by a given threshold spatial sampling blur (or defocus blur), bracketing the object point 168. The larger the convergence angle the more rapidly defocus blur changes with depth, and hence the shallower the depth of field (i.e. the shorter the interval). Depth of field is relatively shallower for object distances that are shorter and for apertures that are larger (i.e. corresponding to lower spatial sampling rates).

Adjusting the focus of the sampling beam 166 allows defocus blur at one depth to be eliminated at the expense of increasing defocus blur at other depths, while maintaining proper support for the 4D low-pass filter. This allows defocus blur to be traded between different regions of the light field, which is useful when blur minimisation is more important in some regions than others (e.g. regions corresponding to the surfaces of objects).

Changing focus does not affect the field of view or the total captured radiance, since each lens 160 captures essentially the same set of rays independent of focus.

If the sampling beam 166 is focused at infinity (as shown in FIG. 3A) its spatial sampling blur is constant and corresponds to the aperture of the lens 160. Since angular sampling blur increases with object distance, the relative contribution of this constant spatial sampling blur decreases with distance. This indicates that there is a threshold object distance beyond which angular sampling blur becomes dominant, and that minimising blur by focusing the sampling beam 166 provides diminishing returns as the object distance increases beyond this threshold distance.

The focus of beam 166 is recorded in the discrete light field 110 as the sampling focus 138 associated with the spectral radiance 128.

The optional depth 136 may be determined by range-finding (discussed below), and the sampling focus 138 may correspond to the depth 136, e.g. when beam 166 is focused according to scene depth.

In the well-known two-plane parameterization of the 4D light field [Levoy96], the uv plane coincides with the light field boundary 102 and the st plane coincides with the object plane 170 (or equivalently the image plane 158). The st plane is typically fixed, corresponding to fixed-focus sampling.

Light Field Reconstruction

The sampling regime used to capture a discrete light field 110, including the focus 138 of each sample, is used as the basis for reconstructing the corresponding continuous light field.

A continuous physical 4D light field is reconstructed from a discrete 4D light field using a 4D low-pass filter. The filter ensures that the continuous light field is band-limited to the frequency content of the band-limited continuous light field from which the discrete light field was sampled.

FIGS. 4A, 4B, 5A and 5B illustrate an approach to band-limiting and reconstructing a continuous light field from a discrete light field. These figures mirror FIGS. 2A, 2B, 3A and 3B respectively, and the same reference numerals are used for corresponding parts where appropriate.

Figure 4A:
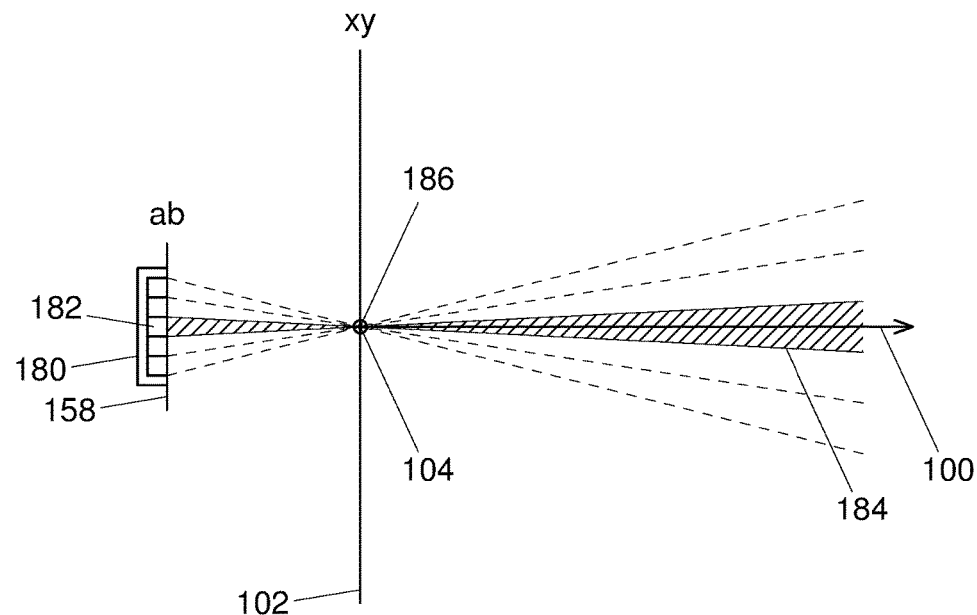
FIG. 4A shows a light emitter array reconstructing ray direction for a particular ray position.

FIG. 4A shows a light emitter array 180 reconstructing a continuous light field with respect to ray direction for a particular ray position 104. Each light emitter 182 of the array 180 reconstructs a particular ray direction, and generates the beam 184 surrounding the nominal ray 100. This generation effects 2D low-pass filtering with respect to ray direction. The effective filter kernel is a non-ideal box filter corresponding to the spatial extent of the light emitter 182. The light emitters are ideally closely packed to ensure adequate filter support. The angular reconstruction beam 184 is focused at an infinitesimal pinhole aperture 186, which coincides with the ray position 104 on the boundary 102.

Figure 4B:
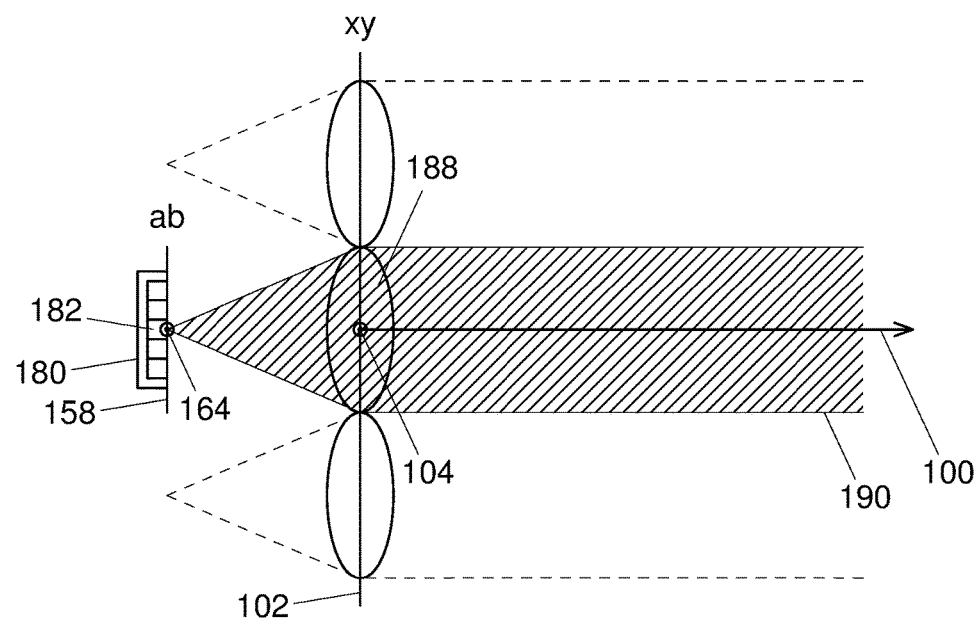
FIG. 4B shows an array of lenses reconstructing ray position at the light field boundary.

FIG. 4B shows an array of lenses reconstructing the continuous light field with respect to ray position at the boundary 102. Each lens 188 of the array reconstructs a particular ray position, and generates the parallel beam 190 surrounding the nominal ray 100 by focusing from point 164 on the light emitter 182. This generation effects 2D low-pass filtering with respect to position. The effective filter kernel is a non-ideal box filter corresponding to the spatial extent of the aperture of the lens 188. The lenses are ideally closely packed to ensure adequate filter support.

Figure 5A:
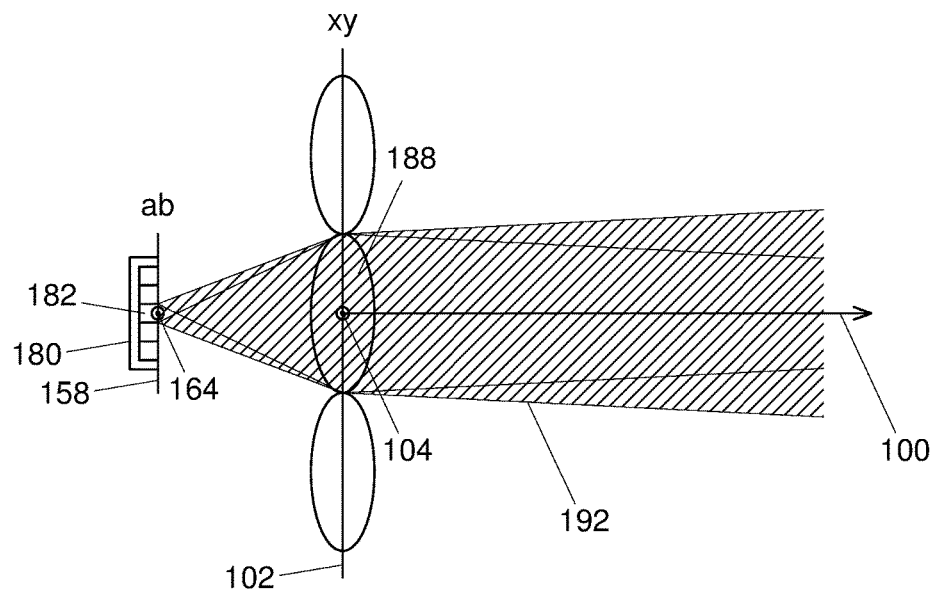
FIG. 5A shows the combined effect of the spatial extent of the light emitter and the aperture of the lens to effect 4D low-pass filtering.

FIG. 5A shows the combined effect of the spatial extent of the light emitter 182 and the aperture of the lens 188 generating reconstruction beam 192 to effect 4D low-pass filtering, i.e. with respect to direction and position simultaneously. The effective filter kernel is a 4D box filter, which provides reasonable but non-ideal band-limiting. It is difficult to do better than a box filter when generating light spatially.

The scalar value provided to the light emitter 182 is typically proportional to emitter power. The radiance sample 134 is convertible to emitter power by multiplying it by the 5D sampling period (i.e. the 1D temporal sampling period 114, the 2D spatial sampling period 120, and the 2D angular sampling period 126), and dividing it by the actual on-time of the emitter (which is typically shorter than the temporal sampling period 114). Note that if the 4D (spatial and angular) reconstruction filter support is smaller than the 4D sampling period then the same radiant power is simply delivered via a more compact beam.

Proper 4D reconstruction relies on the light emitter 182 emitting all possible rays between the extent of the light emitter 182 and the aperture of the lens 188. This is satisfied if the emitter 182 is diffuse.

Figure 5B:
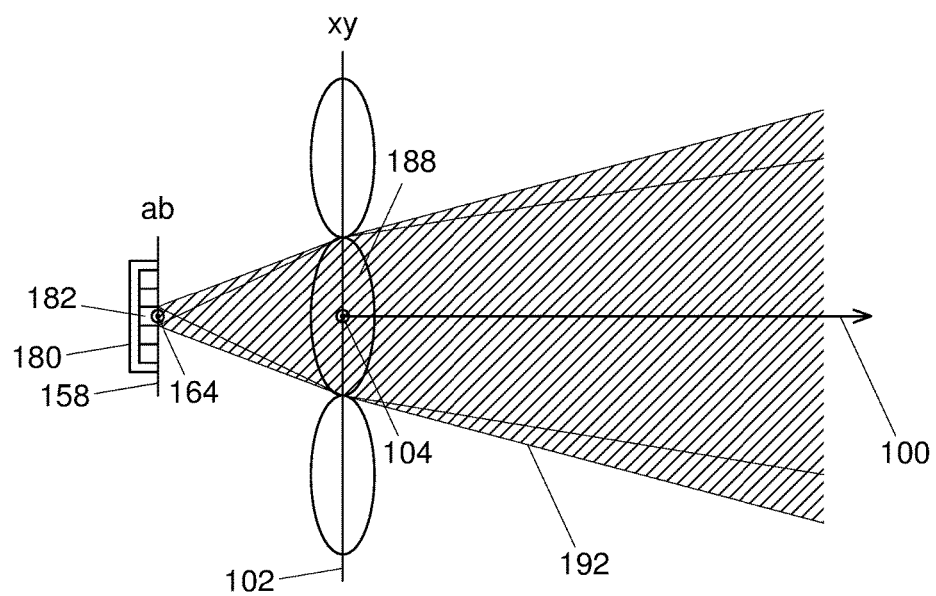
FIG. 5B shows the reconstruction beam of FIG. 5A focused from a virtual object point using a lens with lower power.

FIG. 5B shows beam 192 focused from a virtual object point (to the left of the array 180, and not shown in FIG. 5B, but coinciding with object point 168 in FIG. 6B) using a lens 188 with lower power than the lens 188 in FIG. 5A.

When the virtual object plane is at infinity then the beam 192 of FIG. 5A is obtained.

The divergence angle of the reconstruction beam 192 (or more properly the spatial reconstruction beam 190) is the angle subtended by the aperture of the lens 188 at the virtual object point. The reconstruction beam 192 has a depth of field, determined by its divergence angle, corresponding to the depth of field of the sampling beam 166 in FIG. 3B.

Adjusting the focus of reconstruction beam 192, per the sampling focus 138, allows it to be matched to the sampling beam 166 used to create the sample value.

Figure 6A:
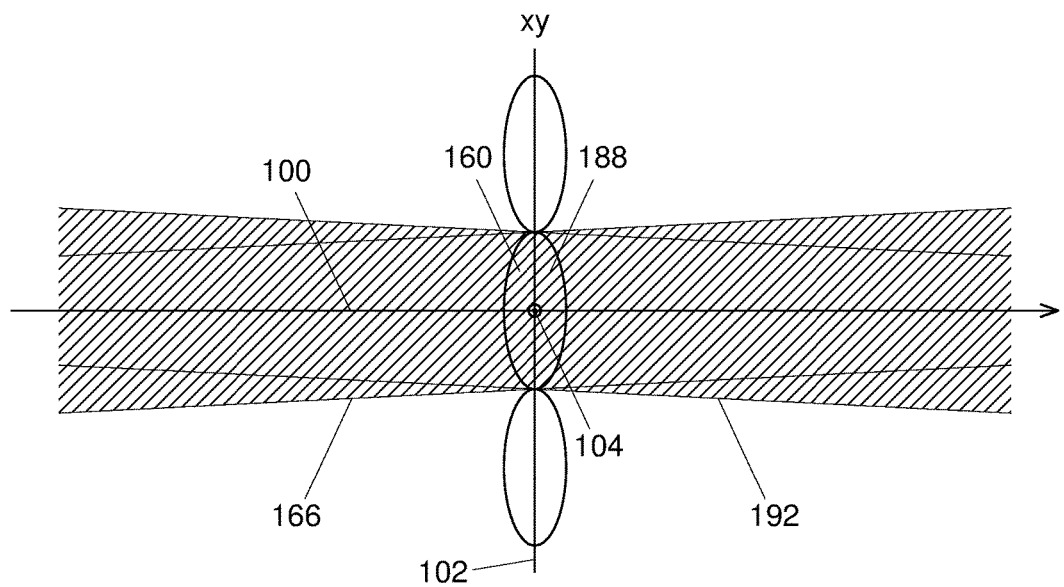
FIG. 6A shows matched sampling (left) and reconstruction (right) beams, corresponding to FIGS. 3A and 5A.
Figure 6B:
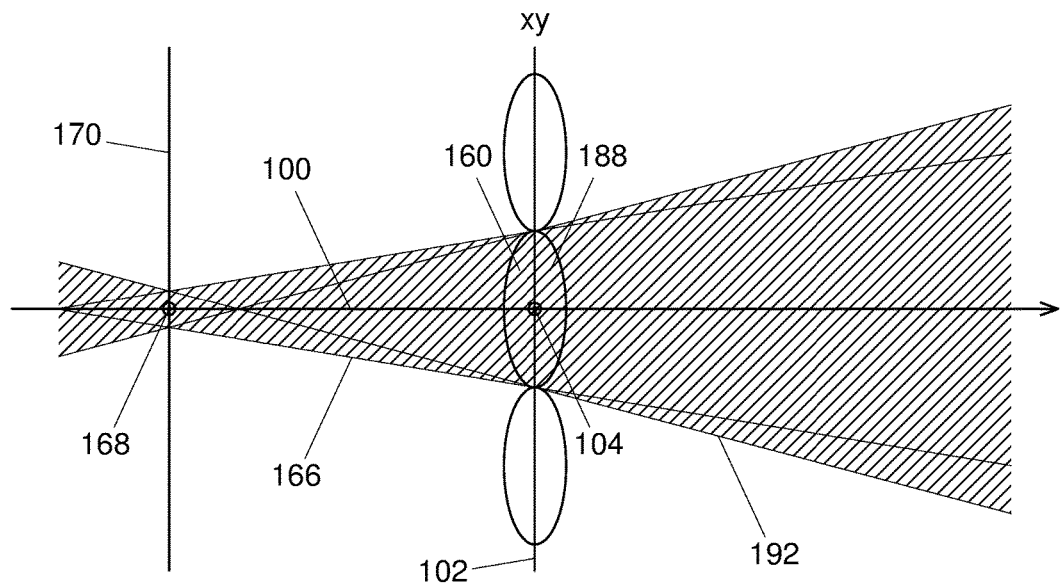
FIG. 6B shows matched sampling (left) and reconstruction (right) beams focused at/from an object point, corresponding to FIGS. 3B and 5B.

The reconstruction beams 192 of FIGS. 5A and 5B match the sampling beams 166 of FIGS. 3A and 3B respectively, and this is illustrated explicitly in FIGS. 6A and 6B, where the left side of each figure shows the sampling beam 166 and the right side shows the matching reconstruction beam 192.

Light Field Display

Figure 7A:
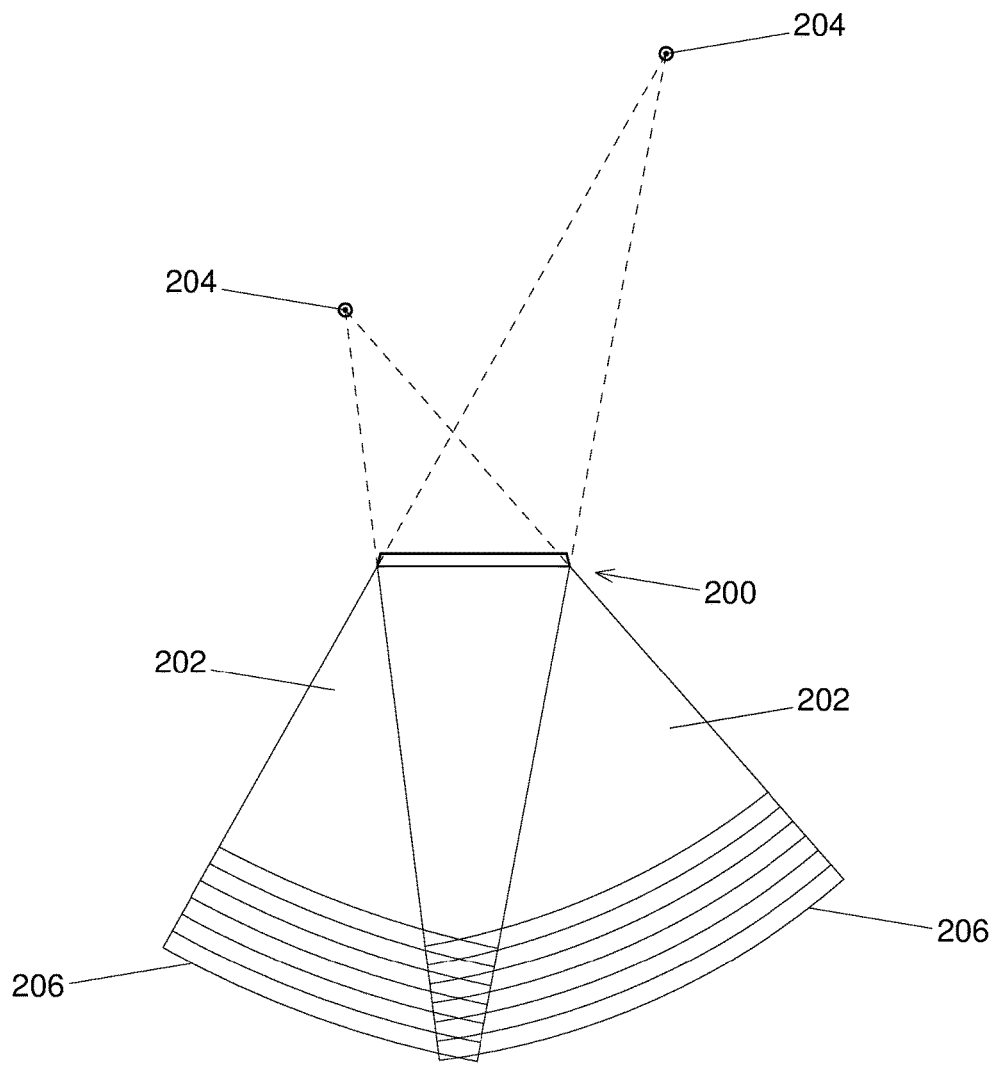
FIG. 7A shows wavefronts emitted from an ideal light field display.

FIG. 7A shows an idealized light field display 200 emitting output beams 202 corresponding to two virtual point sources 204 constituting a very simple virtual scene. Each output beam 202 consists of spherical wavefronts 206, each with its origin at respective point source 204. The exit pupil of each output beam 202 at the surface of the display 200 equals the extent of the entire display.

For clarity, FIG. 7A shows only two point sources 204. In practice the display 200 would emit beams from a continuous set of point sources. Also, while not explicitly shown, the radiance cross-section of each beam 202 could be non-uniform.

To an observer situated in front of the light field display 200, the display 200 would appear indistinguishable from a window onto a real scene containing the point sources 204.

While FIG. 7A shows display 200 emitting diverging beams corresponding to virtual point sources 204 located behind the display, the display 200 could also emit converging beams corresponding to virtual point sources located in front of the display.

Figure 7B:
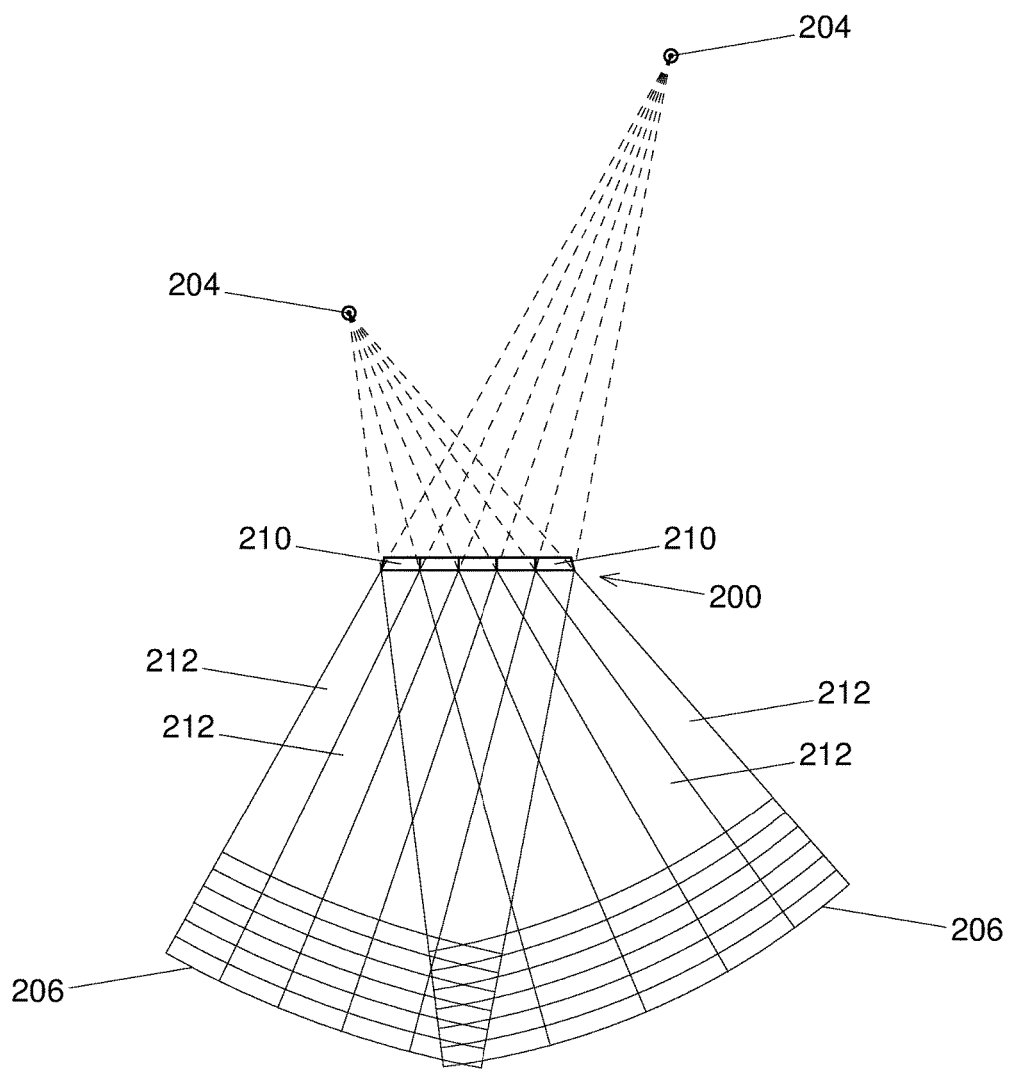
FIG. 7B shows wavefronts emitted from a multi-element light field display.

FIG. 7B shows a realization of the display 200, segmented into an array of contiguous display elements 210, each of which performs the reconstruction functions of the light emitter array 180 and lens 188 in FIG. 5B.

Each display element 210 is shown emitting output beams 212 corresponding to the point sources 204, i.e. each display element 210 behaves in the same way as the overall display 200, but with a reduced exit pupil equal to the extent of the display element 210.

Each output beam 212 emitted by a display element 210 in FIG. 7B is focused at its respective point source 204, thus the output beams 212 abut to form the wider output beams 202 emitted by the entire display 200 in FIG. 7A, with the same wavefronts 206.

The segmented light field display 200 is configured to directly display a discrete 6D light field 110. During display, the surface of the display 200 corresponds to the light field boundary 102 associated with the discrete light field, and the position of each display element 210 corresponds to a sampling position 104 (x, y) on the boundary. The direction of each beam 212 emitted by the display element corresponds to a sampling direction (a, b), and the average radiance of each beam 212 corresponds to the sampled spectral radiance 128. The focus of each beam 212 corresponds to the sampling focus 138.

Thus each display element 210 reconstructs, at a given time, the continuous light field corresponding to a single light field view image 122, and the entire display 200 reconstructs, at a given time, the continuous light field corresponding to a single light field frame 116. The display 200 thus reconstructs, over time, the continuous 6D optical light field corresponding to the discrete 6D light field video 110.

For clarity, the spatial sampling period 120 illustrated in FIG. 7B is relatively large, while the angular sampling period 126 is relatively small. Thus the output beams 212, each of which is associated with a single spectral radiance 128 within the discrete light field 110, are shown to converge exactly at their respective virtual point source 204. In practice the beams converge in a finite area rather than at a point, i.e. the point source is blurred in proportion to the angular sampling period 126.

As is evident from FIG. 7B, the larger the spatial sampling period 120 the less angular object detail is displayed, and the larger the angular sampling period 126 the less spatial object detail is displayed. The former manifests as shallow depth of field, while the latter manifests as blur in the object plane.

The smaller the 4D sampling period (i.e. the higher the 4D sampling rate) the greater the fidelity of the light field display. However, for a fixed number of samples, it is possible to reduce object-plane blur at the cost of shallower depth of field.

Light Field Camera

Figure 8A:
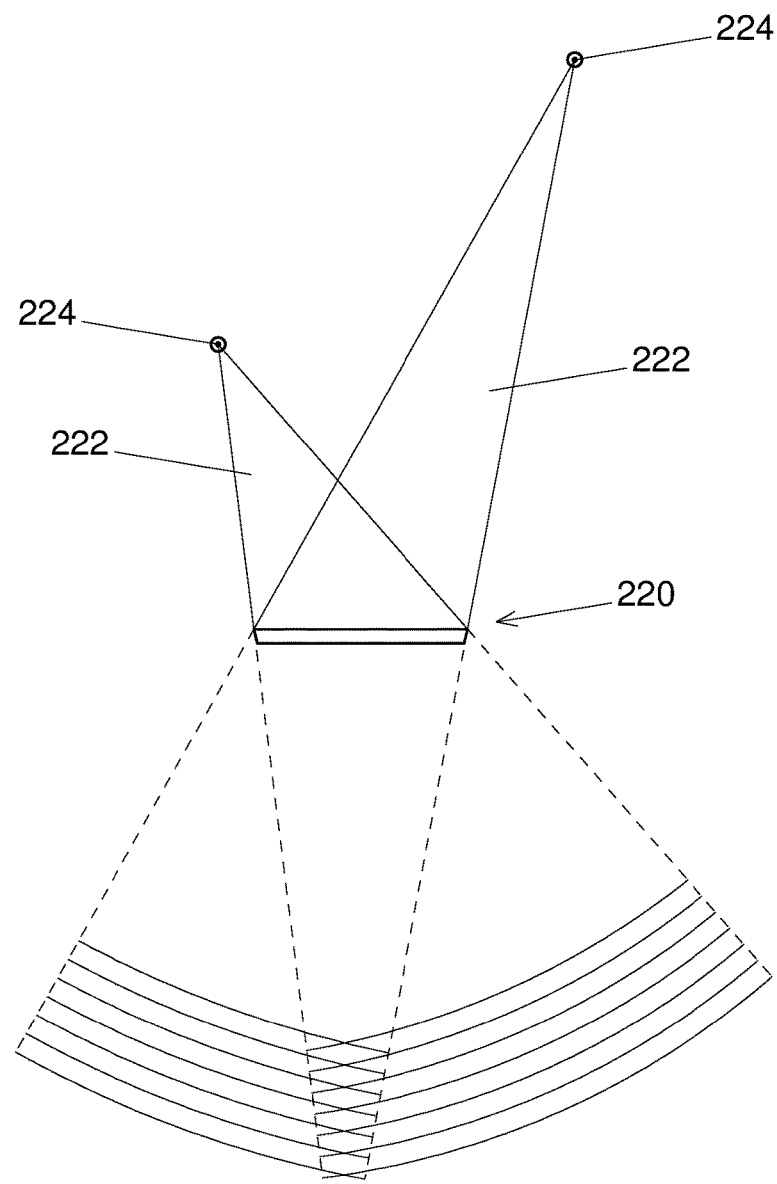
FIG. 8A shows wavefronts captured by an ideal light field display.

FIG. 8A shows an idealized light field camera 220 capturing input beams 222 corresponding to two real point sources 224 constituting a very simple real scene. Each input beam 222 consists of spherical wavefronts, each with its origin at respective point source 224. The entry pupil of each input beam 222 at the surface of the camera 220 equals the extent of the entire camera.

For clarity, FIG. 8A shows only two point sources 224. In practice the camera 220 would capture beams from a continuous set of point sources. Also, while not explicitly shown, the radiance cross-section of each beam 222 could be non-uniform.

Figure 8B:
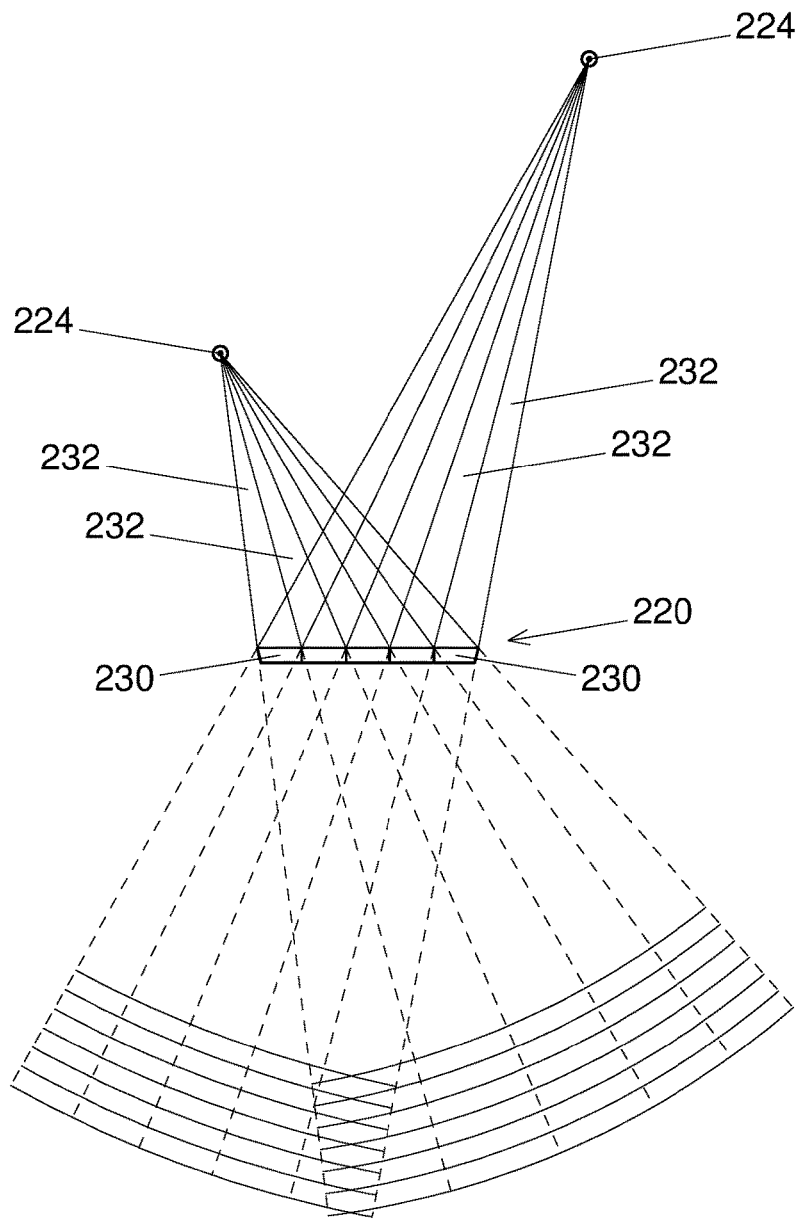
FIG. 8B shows wavefronts captured by a multi-element light field display.

FIG. 8B shows a realization of the camera 220, segmented into an array of contiguous camera elements 230, each of which performs the sampling functions of the light sensor array 150 and lens 160 in FIG. 3B.

Each camera element 230 is shown capturing input beams 232 corresponding to the point sources 224, i.e. each camera element 230 behaves in the same way as the overall camera 220, but with a reduced entry pupil equal to the extent of the camera element 230.

Each input beam 232 captured by a camera element 230 in FIG. 8B is focused at its respective point source 224, thus the input beams 232 abut to form the wider input beams 222 captured by the entire camera 220 in FIG. 8A, with the same wavefronts.

The segmented light field camera 220 is configured to directly capture a discrete 6D light field 110. During capture, the surface of the camera 220 corresponds to the light field boundary 102 associated with the discrete light field, and the position of each camera element 230 corresponds to a sampling position 104 (x, y) on the boundary. The direction of each beam 232 captured by the display element corresponds to a sampling direction (a, b), and the average radiance of each beam 232 is captured as the spectral radiance 128. The focus of each beam 232 corresponds to the sampling focus 138.

Thus each camera element 230 samples, at a given time, the continuous light field corresponding to a single light field view image 122, and the entire camera 220 samples, at a given time, the continuous light field corresponding to a single light field frame 116. The camera 220 thus samples, over time, the continuous 6D optical light field corresponding to the discrete 6D light field video 110.

For clarity, the spatial sampling period 120 illustrated in FIG. 8B is relatively large, while the angular sampling period 126 is relatively small. Thus the input beams 232, each of which is associated with a single spectral radiance 128 within the discrete light field 110, are shown to converge exactly at their respective real point source 224. In practice the beams converge in a finite area rather than at a point, i.e. the point source is blurred in proportion to the angular sampling period 126.

Non-Planar Light Field Boundary

Although the figures show the light field boundary 102 associated with the light field display 200 and the light field camera 220 as planar, it may in practice assume any convenient shape.

Depth Perception

Creatures with foveal vision (such as humans) fixate on a point by rotating the eye (or eyes) so that the image of the point is centered on the high-density foveal region of the retina. This maximises the sharpness of the perceived image. When the retinal images of two eyes are mentally fused into a single image during the process of stereopsis, the degree of eye convergence (or vergence) provides a crucial cue to the absolute depth of the fixation point.

In addition to rotating the eye(s) during fixation, creatures also adjust the shape of the lens of the eye to bring the point of fixation into focus on the retina. In this process of accommodation, the state of the muscles controlling the lens provides another important cue to absolute depth.

The human accommodation response curve shows over-accommodation to far stimuli and under-accommodation to near stimuli, with a typical cross-over (i.e. perfect accommodation) at an object distance of around 50 cm, and a typical minimum response of 0.5 diopters (2 m) for object distances greater than 2-3 m [Ong93, Palmer99, Plainis05]. Crucially, then, the human visual system never accommodates properly to far stimuli.

The vergence and accommodation responses are closely coupled, and any mismatch between the vergence and accommodation cues provided by a display can lead to viewer discomfort [Hoffman08].

Parallax refers to the difference in apparent position of an object when viewed from different viewpoints, with close objects exhibiting greater parallax than distant objects. Binocular disparity due to parallax supports relative depth perception during stereopsis, i.e. relative to the absolute depth of fixation. Motion parallax supports relative depth perception even with one eye.

Perception of a Focused Light Field

As illustrated in FIG. 7B, each output beam 212 corresponding to a point source 204 has its origin at the point source, i.e. each constituent ray of the beam 212 originates at the point source 204. Equivalently, the spherical wavefronts 206 of the beam 212 have their center of curvature at the point source 204. This ensures that a viewer perceives the parallax of point source 204 correctly both within any given beam 212 and across multiple beams 212, resulting in accurate binocular disparity and smooth motion parallax. The smaller the object distance the greater the divergence of each beam 212, and hence the more important the presence of intra-beam parallax. By contrast, fixed-focus 3D displays only provide parallax between different views, and provide incorrect (and therefore conflicting) parallax within any given view. Furthermore, autostereoscopic displays typically provide a modest number of views, resulting in only approximate binocular parallax and discontinuous motion parallax.

The correctly-centered spherical wavefronts 206 of the beams 212 also allow the viewer to accommodate to the correct depth of the corresponding point source 204, ensuring that the viewer's vergence and accommodation responses are consistent. This avoids the vergence-accommodation conflicts associated with fixed-focus 3D displays.

Using a relatively high angular sampling rate decouples the angular resolution of a light field display from the spatial sampling rate (see below). This contrasts with typical 3D displays where the spatial sampling rate determines the angular display resolution. For the present display 200, this allows the spatial sampling rate to be lower than with fixed-focus 3D displays. For a given overall (4D) sampling rate this in turn allows a relatively higher angular sampling rate.

The angular resolution of a focused light field display 200, when displaying a virtual object at a particular object distance (r) behind the display, and viewed at a particular distance (d) in front of the display, is the angle (g) subtended, at the viewpoint, by one object sampling period (h) (i.e. on the object plane), i.e. $g=h/(r+d)$ (for small g).

The object sampling period (h) is a function of the angular sampling period 126 ($q$) and the object distance (r), i.e. $h=qr$ (for small q). Hence $g=qr/(r+d)$.

The angular sampling period 126 ($q$) therefore represents the minimum light field display resolution. As the object distance (r) approaches infinity or the viewing distance (d) approaches zero (i.e. in both cases as r/(r+d) approaches one) the display resolution converges with the angular sampling period 126 ($q$).

The light field display 200 can therefore be configured to match the human perceptual limit, for any viewing geometry, by configuring its angular sampling period 126 ($q$) to match the maximum angular resolution of the eye (about 60 cycles per degree [Hartridge22], equivalent to an angular sampling period of approximately 0.008 degrees). For a 40-degree field of view this equates to an angular sample count of 4800.

The light field display resolution for a given viewing distance (d) and object distance (r) can significantly exceed the angular sampling period 126 ($q$) when the viewing distance exceeds the object distance. For example, if the viewing distance is four times the object distance, the display resolution is five times the angular sampling period 126, and for a 40-degree angular field 124 an angular sample count of 960 is sufficient to match the human perceptual limit.

If the angular sampling period 126 ($q$) is sufficiently large (such as for typical autostereoscopic displays) then the spatial sampling period 120 ($s$) determines the angular display resolution (g). The angular resolution (g) is then the angle subtended by one spatial sampling period 120 ($s$) at the display surface, i.e. $g=s/d$ (for small g). The complete equation for the angular resolution of a light field display is then: $g=\min(s/d, qr/(r+d))$.

The foregoing calculations represent the best case, in that they ignore the imperfect human accommodation response. The perceived resolution of a light field display can be improved by (at least partially) matching its focus to the actual human accommodation response to a given depth stimulus, rather than to the depth itself. This can include matching the known accommodation response of an individual viewer (including the effect of spectacles, if worn). However, any deviation in focus from the proper depth-determined focus leads to parallax error, and this error increases with decreasing object distance. With increasing object distance, however, parallax error is increasingly masked by angular sampling blur. A compromise, then, is to select a threshold object distance beyond which light field focus is fixed. This divides the light field focus regime into a fixed-focus far-field regime and a variable-focus near-field regime. The fixed-focus far-field threshold can be as close as the typical minimum accommodation response (2 m), or significantly larger (including, in the limit, infinity).

Equivalence of Scene Focus and Viewer Focus

Figure 9A:
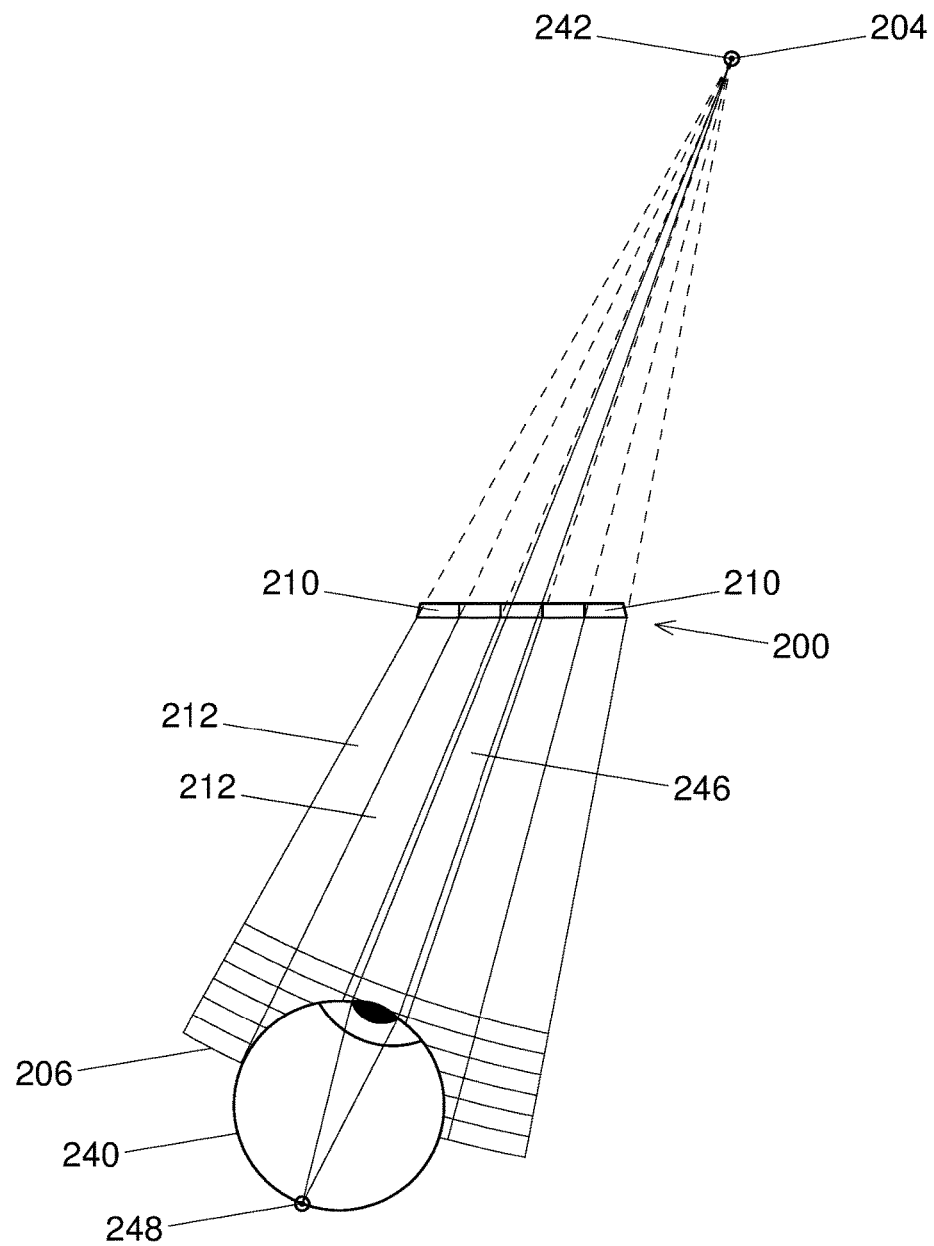
FIG. 9A shows the eye of a viewer located in the reconstructed light field of a virtual point source, with the eye focused at the point source.

FIG. 9A shows the eye 240 of a viewer located in the reconstructed light field of a virtual point source 204. The light field is reconstructed by segmented display 200. The eye is focused at an object point 242 coinciding with the virtual point source 204. The input beam 246 admitted by the pupil of the eye, a sub-beam of one of the output beams 212, is focused to a point 248 on the retina. The image of the point source 204 on the retina is therefore sharp.

Figure 9B:
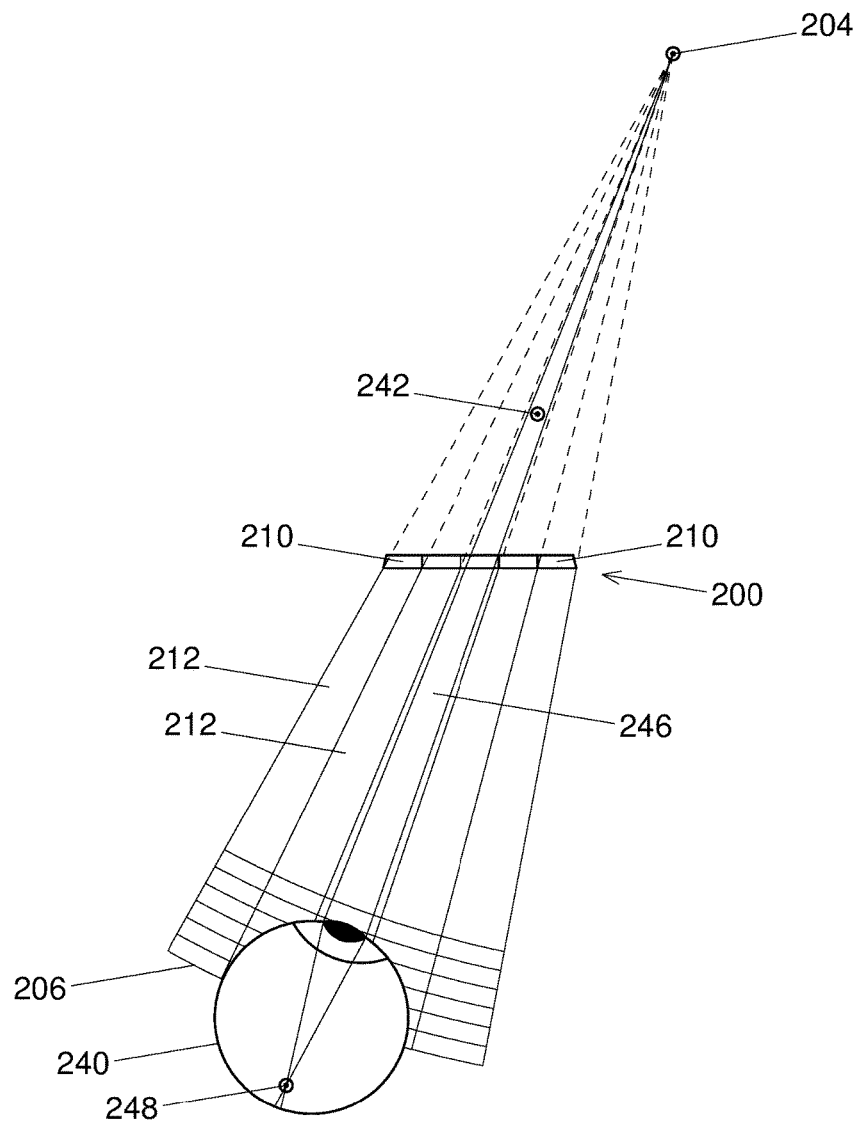
FIG. 9B shows the eye focused at a closer point than the virtual point source.

FIG. 9B shows the object point 242 now closer to the display 200 than the virtual point source 204. The image point 248 corresponding to the point source 204 is now in front of the retina, and the image of the point source on the retina is therefore blurred. This is as it should be, i.e. it matches reality.

Figure 9C:
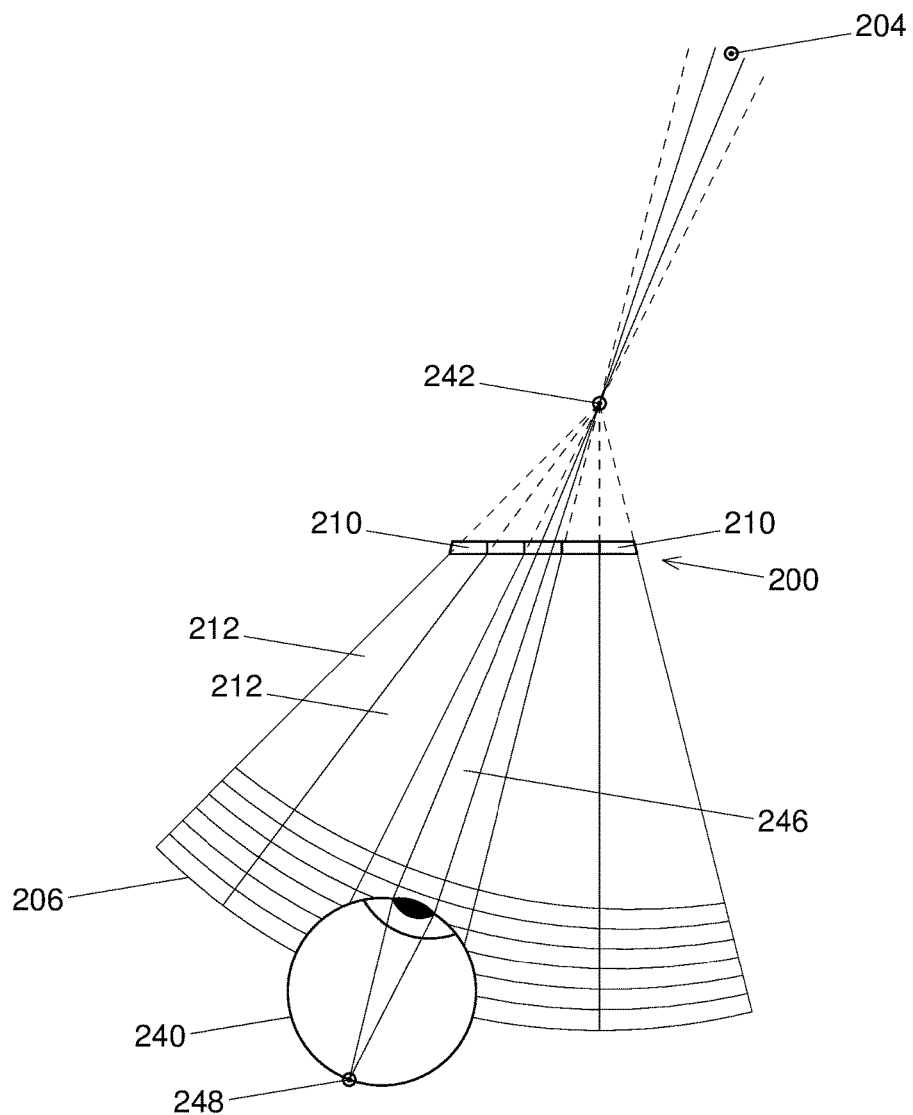
FIG. 9C shows the light field display of FIGS. 9A and 9B emitting the light field of a point source coinciding with the translated object point of FIG. 9B.

FIG. 9C shows the display 200 now displaying the light field of a point source coinciding with the translated object point 242. The input beam 246 is now focused at object point 242 rather than original point source 204, so is once again in focus on the retina (at image point 248). Since the input beam is not in focus at point source 204, the image of point source 204 on the retina remains blurred (and by the same amount as in FIG. 9B). This is again as it should be.

For clarity, FIGS. 9A through 9C only show a single object point 242, on the optical axis of the eye 240. The "plane" of focus is the locus of all such points, and is an approximately spherical surface with a radius equal to the object distance, centred at the first nodal point of the eye.

The equivalence of what the viewer perceives in FIGS. 9B and 9C indicates that there are two useful modes of operation for displaying a focused light field. In the first mode the display is focused on objects in the scene. In the second mode the display is focused according to the viewer's focus.

Light Field Display Focus Strategies

The advantage of scene-based focus is that the reconstructed light field is intrinsically multi-viewer. One disadvantage is that the depth of the scene must be known or determined (discussed below). Another disadvantage is that output focus may need to be varied for each sample, requiring fast focus switching. In addition, a single depth needs to be chosen for each sample, and this may require a compromise when significant depth variations are present within the sampling beam.

If the focus modulation rate of the display element 210 is significantly lower than the sampling rate 114, then multiple depths can be supported via multiple display passes, i.e. one pass per depth. The output focus of each display element 210 is then adjusted for each pass according to its corresponding scene depth in that pass. However, because the number of distinct depths within a view image 122 is typically larger than the practical number of display passes, the set of depths supported for a given display element is likely to be a compromise. One way to choose the set of depths is to estimate the full range of depths within the view image 122 of a display element and then identify the most common depth clusters. Intermediate depths can then be displayed using depth-weighted blending [Hoffman08].

The advantage of viewer-specific focus is that focus can be varied relatively slowly, and depth variations within a single sample are intrinsically correctly handled. The disadvantage is that the reconstructed light field is viewer-specific, and that the viewer must therefore be tracked. It has the additional disadvantage that the light field must be captured (or synthesized) with the correct focus, or refocused before display.

The sharpness of the refocused light field can be increased by recording multiple spectral radiance samples 128 per direction (a, b), each with a different sampling focus 138. Sharpness is particularly increased if each sampling focus 138 corresponds to an actual object depth within the sampling beam 166, whether directly or via a transmitted or reflected path.

The viewer-specific light field view image 122 for each display element 210 is obtained by integrating, for each direction, all rays passing through the object point 242 (or disc, more properly) for that direction and through the aperture of the display element. When the light field 110 is captured via a light field camera 220, this integration may be performed by focusing each camera element 230 accordingly.

In the viewer-specific focus mode, then, the fixation point of the viewer is constantly tracked, and each display element 110 is individually controlled to emit a viewer-specific light field focused according to the depth of the fixation point.

Multiple viewers can be supported via multiple display passes, i.e. one pass per viewer. Alternatively, display focus can be controlled by a single user, and other users can passively view the display at that focus, i.e. in the same way they would view a fixed-focus light field display.

In a hybrid mode, one or more display passes may be viewer-specific, while one or more additional display passes may be scene-based. For example, two display passes can be used to provide a viewer-specific pass, a finite-focus pass for near scene content, and an infinite-focus pass for far scene content.

During an optimised viewer-specific display pass output is only generated in the direction of the viewer, as discussed further below in relation to FIG. 42A. This means that a viewer-specific display pass is only visible to the target viewer, and may only consume a fraction of the frame period, depending on the implementation of the display element 210.

A viewer-specific display pass will typically utilise less than 10% of the angular field 124, and if the display element 210 is scanning (as described in detail further below), then, at least in one dimension, the display pass will only consume a corresponding fraction of the frame period. A reduced-duration viewer-specific frame is referred to as a sub-frame hereafter.

Unlike traditional head-tracking 3D displays where the displayed content is viewer-specific, a light field display 200 operating in viewer-specific mode displays viewer-independent content with viewer-specific focus. If the viewer changes their point of fixation or moves relative to the display then the display focus may need to be updated, but this can happen relatively slowly because the viewer is always embedded in a valid (if not necessarily completely optimal) reconstructed light field, and the human accommodation response is relatively slow (i.e. of the order of several hundred milliseconds).

Viewer-Specific Focus Modes

FIGS. 10A through 10D illustrate two strategies for displaying a viewer-specific light field.

FIG. 10A shows a viewer 250 gazing at a light field display 200 emitting a light field corresponding to a virtual scene consisting of several objects 252. A tracking system incorporated in or associated with the display 200 tracks the face of the viewer 250 and hence the locations of the viewer's two eyes 240.

FIG. 10B shows the location of one of the eyes 240 used to determine a viewing direction through each display element 210, and thus, for each viewing direction, an intersection point 254 with a scene object 252. The focus of each display element is shown set according to the depth of the corresponding intersection point 254.

FIG. 10C shows the tracking system used to track the gaze direction of each of the viewer's two eyes 240, and hence to estimate their fixation point 256. Assuming fixation and accommodation are synchronised, as they are under normal circumstances, the viewer's focus can be estimated from the depth of the fixation point 256.

FIG. 10D shows the plane of focus 258 of one of the eyes 240, estimated from the depth of the fixation point 256, and, for each viewing direction, an intersection point 254 with the plane of focus. The focus of each display element is again shown set according to the depth of the corresponding intersection point 254.

The first viewer-specific mode, shown in FIG. 10B, represents a hybrid mode which relies on scene depth information and face detection, but does not require gaze estimation. It is referred to as the position-based viewer-specific focus mode.

The second viewer-specific mode, shown in FIGS. 10C and 10D, does not rely on scene depth information but does require gaze estimation. It is referred to as the gaze-directed viewer-specific focus mode.

Although FIG. 10D shows the output focus set according to the position of an individual eye 240, for fixation depths that are large compared with the distance separating the eyes the output focus of a particular display element 210 will differ sufficiently little between the two eyes that an average output focus can be used to serve both eyes during a single display pass. Any display element 210 that contributes to foveal vision in one or the other eye (as discussed later in this specification in relation to FIG. 42B) should, however, be focused for the corresponding eye.

The position-based and gaze-directed focus modes are complementary. The gaze-directed mode produces more accurate focus, but relies on gaze estimation which becomes decreasingly tractable as the distance between the viewer and the display increases. The position-based mode relies on face detection, which remains tractable over larger distances, and the accuracy of position-based scene focus increases with distance, since the angle subtended by a display element 210 decreases with distance.

The two modes can therefore be used in tandem, with the operative mode selected individually for each viewer according to the distance between the display and the viewer.

Choice of Focus Strategy

A suitable focus strategy depends on how the display is used, i.e. the number of viewers, their typical viewing distances, and the nature of the displayed scenes. It also depends on the capabilities of a particular implementation of the light field display 200, in particular on the focus modulation rate.

The minimum viewing object distance is the sum of the minimum displayed object distance and the minimum viewing distance. If the minimum viewing object distance is larger than the far-field threshold then a single fixed-focus display pass is sufficient.

If the minimum displayed object distance is larger than the far-field threshold then the far-field regime applies independent of viewing distance, and viewers need not be tracked. For example, the display 200 may be simulating a window onto a distant exterior scene.

If the minimum displayed object distance is smaller than the far-field threshold then the near-field regime applies wherever the minimum viewing object distance is smaller than the far-field threshold, and viewers may need to be tracked.

If the focus modulation rate of the light field display 200 matches the sampling rate 114 then a viewer-independent near-field light field can be displayed in a single pass.

If the light field display 200 is used as a near-eye display (NED) then there is only a single viewing eye. The gaze-directed viewer-specific focus mode may be effectively used, e.g. based on the fixation depth inferred from the vergence of the two eyes, and the focus modulation rate only has to match the relatively slow human accommodation mechanism, which takes several hundred milliseconds to refocus (less than 4 Hz).

If the light field display 200 is used by multiple relatively close viewers, then multiple passes of gaze-directed viewer-specific focus can be effectively utilised.

If the display 200 supports sub-frames then multiple display passes may be made during a single frame duration. If not, then the number of display passes is limited by the ratio of the temporal sampling interval 114 to the frame duration (assuming the temporal sampling interval 114 is perceptually based and therefore cannot be compromised).

If the eye-specific sub-frame period is Teye, the focus switching time is Tfocus, the frame period is Tframe, the number of full-frame passes is Nfull, and the temporal sampling period 114 is Ts, then the available number of eye-specific passes Neye is given by: Neye=floor((Ts−(Tframe*Nfull))/(Tfocus+Teye))

For illustrative purposes it is assumed that the frame period Tframe is half the sampling period Ts. This allows two full-frame passes when the number of eye-specific passes Neye is zero, and the following number of eye-specific passes when the number of full-frame passes Nfull is one: Neye=floor(Tframe/(Tfocus+Teye)). Hence Tfocus=(Tframe/Neye)−Teye.

For illustrative purposes it is further assumed that the required number of eye-specific passes Teye is four, and that the sub-frame duration Teye is 10% of Tframe. The maximum allowed focus switching time Tfocus is then given by: Tfocus=Tframe*0.15.

Assuming a frame rate of 100 Hz, i.e. a frame period Tframe of 10 ms (corresponding to a temporal sampling period Ts 114 of 20 ms (50 Hz)), this equates to a focus switching time Tfocus of 1.5 ms. Assuming a frame rate of 200 Hz, it equates to a focus switching time Tfocus of 750 us.

If the display element 210 is scanning, and it is assumed that viewers are distributed horizontally with respect to the display 200, then it is advantageous to assign the fast scan direction to the vertical dimension of the display to allow focus to be varied horizontally, i.e. in the slow scan direction, during a single display pass (assuming sufficiently fast focus switching). This allows multiple eye-specific focus zones to be created during a single (full-frame) display pass, and provides an alternative to making multiple viewer-specific sub-frame display passes.

The choice of focus strategy during capture by a light field camera 220 follows the same principles as discussed above in relation to display by a light field display 200. This includes adjusting the capture focus according to the position and/or gaze of one or more viewers of a light field display 200, i.e. if the camera 220 is capturing a light field that is being displayed in real time by the light field display 200, as discussed in more detail below.

Depth Estimation

The optional depth 136 associated with the spectral radiance 128 records the scene depth within the sampling beam 166. It may represent a compromise when significant depth variations are present within the sampling beam, e.g. due to partial occlusions, transparency or reflections. For example, it may represent the depth to the first sufficiently opaque surface along the nominal sampling ray 100. Alternatively, as discussed above, multiple depths 136 may be recorded for each direction (a, b).

The depth 136 may be used for a number of purposes, including displaying the light field with scene-based focus (as discussed above), estimating the fixation point of a viewer (discussed below), light field compression (discussed below), and depth-based processing and interaction in general.

When the light field 110 is synthetic, i.e. generated from a 3D model, the depth of the scene is known. When the light field 110 is captured from a real scene, the depth may be determined by range-finding.

Range-finding may be active, e.g. based on time-of-flight measurement [Kolb09, Oggier11], or passive, e.g. based on image disparity [Szeliski99, Seitz06, Lazaros08] or defocus blur [Watanabe96]. It may also be based on a combination of active and passive techniques [Kolb09]. Range-finding is discussed further below.

Two-Way Light Field Display

It is advantageous to combine the functions of a light field display 200 and a light field camera 220 in a single device, due both to the symmetry of application and the symmetry of operation of the two devices. Such a device is hereafter referred to as a two-way light field display.

Figure 11:
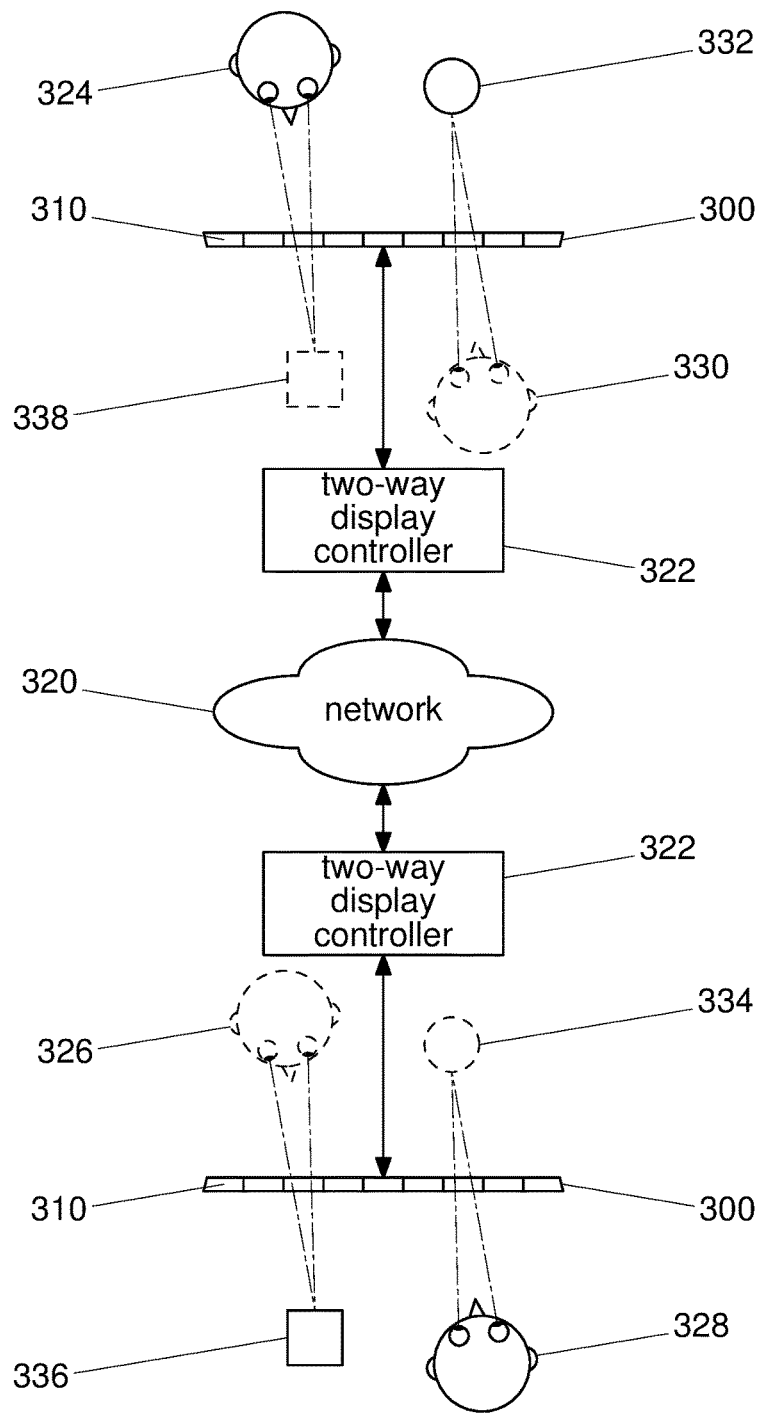
FIG. 11 shows a pair of two-way light field displays connected via a network.

FIG. 11 shows a pair of two-way light field displays 300 connected via a network 320. Each two-way light field display 300 is segmented into an array of contiguous two-way light field display elements 310, each of which performs the functions of light field display element 210 and light field camera element 220.

The figure shows a remote viewer 324, at the top, interacting with the remote two-way light field display 300, and a local viewer 328, at the bottom, interacting with the local two-way light field display 300. Each two-way display 300 is controlled by a respective display controller 322, described in more detail later in this specification.

The remote viewer 324 is accompanied by a remote object 332, while the local viewer 328 is accompanied by a local object 336. The local viewer 328 is shown fixating on a virtual image 334 of the remote object 332, while the remote viewer 324 is shown fixating on a virtual image 338 of the local object 336. The remote display 300 also displays a virtual image 330 of the local viewer, and the local display 300 displays a virtual image 326 of the remote viewer 324.

Each viewer may be tracked by the display controller 322 of their respective two-way display 300, using view images 122 captured via the two-way display 300 (or via separate tracking cameras, discussed below). As previously described (and described in more detailed further below), each viewer's face position or gaze direction may be used to control the capture focus of the corresponding two-way light field display 300.

The use of a pair of two-way light field displays 300 rather than conventional displays and cameras allows significantly improved communication between the remote viewer 324 and local viewer 328, promoting a strong sense of shared presence. For example, each viewer can determine where the other viewer is looking or pointing, and objects can be held up close to the surface of the two-way display 300 for close inspection by the other viewer.

FIG. 11 also makes it clear that if the two two-way displays 300 are mounted back-to-back then they function as a virtual two-way window, i.e. they (and the intervening space) become effectively invisible.

Figure 12:
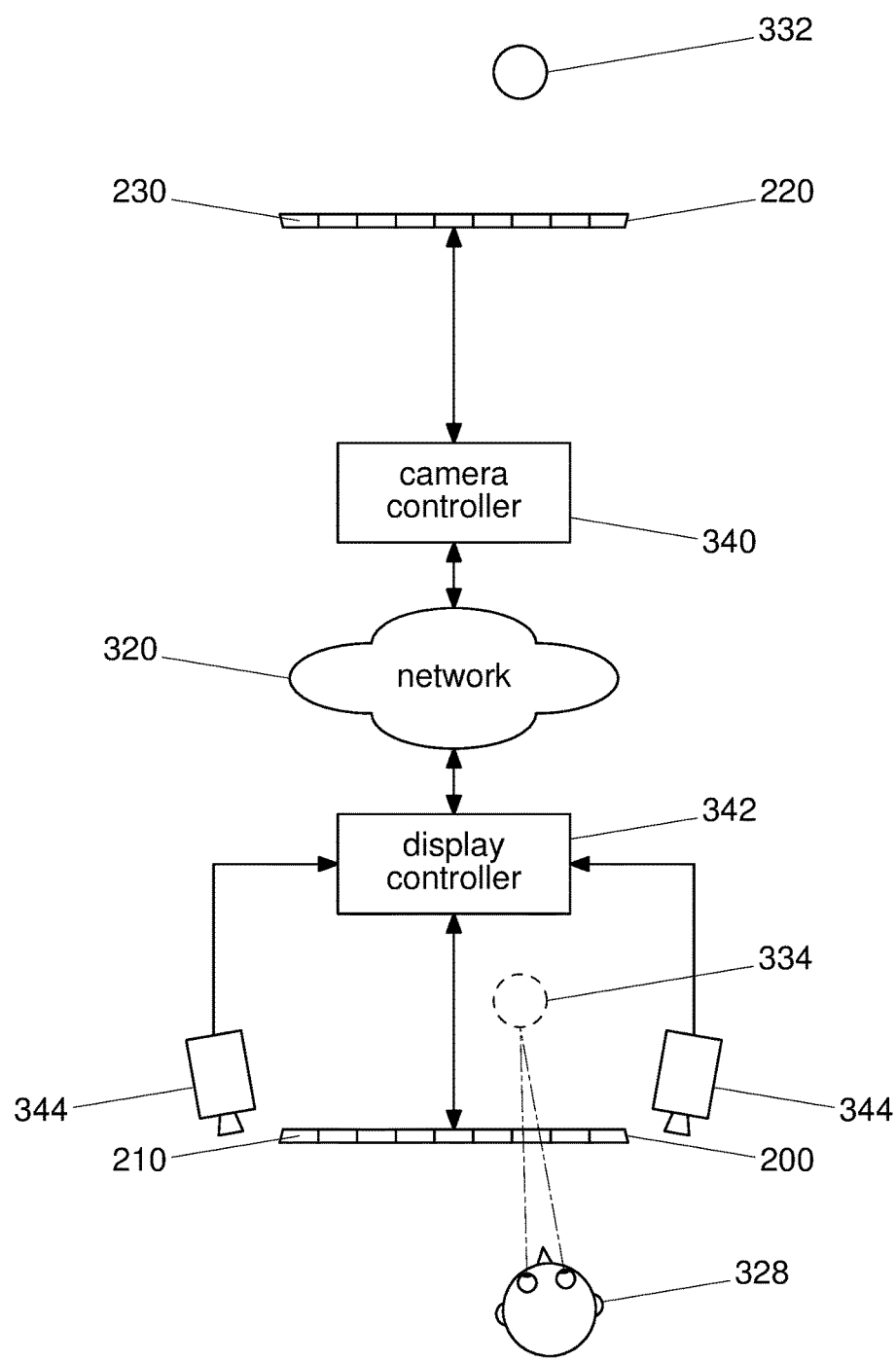
FIG. 12 shows a light field camera and a light field display connected via a network.

FIG. 12 shows a one-way configuration, consisting of a remote light field camera 220, at the top, and a local light field display 200, at the bottom, connected via a network 320.

The figure shows a local viewer 328, at the bottom, viewing the display 200. The light field camera 220 is controlled by a camera controller 340, while the light field display 200 is controlled by a display controller 342. The controllers are described in more detail later in this specification.

The remote scene contains a remote object 332, and the local viewer 328 is shown fixating on a virtual image 334 of the remote object 332.

The viewer 328 may be tracked by the display controller 342, using images captured via two or more tracking cameras 344 connected to the controller 342. As previously described, the viewer's face position or gaze direction may be used to control the capture focus of the light field camera 220.

In the remainder of this specification any reference to a light field display 200 (and light field display element 210) should be taken as equivalent to the display function of a two-way light field display 300 (and two-way light field display element 310), and vice versa. Likewise, any reference to a light field camera 220 (and light field camera element 230) should be taken as equivalent to the camera function of a two-way light field display 300 (and two-way light field display element 310), and vice versa.

Face Detection and Gaze Estimation

As discussed above, the light field display 200 may use knowledge of the position and gaze direction of a viewer to generate a viewer-specific output light field, including with viewer-specific focus and a viewer-specific angular field.

Depending on the distance between a viewer and the light field display 200, the display can variously make use of knowledge of the three-dimensional position of the viewer, the positions of the viewer's eyes, the lines of gaze of the eyes, the fixation depth of the eyes, and the fixation point of the eyes, to generate viewer-specific output. The viewer's gaze direction may only be estimated with useful accuracy when the viewer is relatively close to the display, while the position of the viewer's face and eyes may be estimated with useful accuracy even when the viewer is relatively distant from the display.

Robust and high-speed face detection in digital images is typically based on a cascade of classifiers trained on a database of faces [Jones06]. Multiple face detectors can be trained and used together to cover a wide range of head poses [Jones03].

Approximate eye detection is typically intrinsic to face detection, and more accurate eye positions can be estimated after face detection [Hansen10]. Detection is also easily extended to other useful features of the face and eyes, including the eyebrows, nose, mouth, eyelids, scleras, irises and pupils [Betke00, Lienhart03, Hansen10].

Face detection and subsequent feature detection is performed on images from multiple cameras to obtain estimates of feature positions in three dimensions, using images either from two or more calibrated tracking cameras 344, or from two or more light field camera elements 230 used for tracking (e.g. located at the corners of the light field camera 220). The use of multiple tracking cameras also provides better coverage of potential viewer positions and poses. Feature positions may also estimated from depth data obtained by active range-finding (as discussed above).

For the purposes of gaze estimation, the display 200 includes multiple near-infrared (NIR) light sources to allow the line of gaze of each eye to be estimated from the difference between the position of its pupil and the position of the specular reflection (glint) of each light source on its cornea [Shih00, Duchowski07, Hansen10]. The NIR light sources may be powered only on alternate video frames to assist with the detection of their reflections in an image [Amir03]. To assist with pupil detection the display 200 may incorporate an additional NIR light source, positioned on or close to the axis of one of the tracking cameras, to produce a bright retinal reflection through the pupil of each eye. This light source may be powered on alternate video frames to the glint-producing light sources.

The line of gaze of an eye corresponds to the optical axis of the eye, while the desired line of sight is determined by the retinal position of the slightly off-axis fovea. The line of sight may be estimated from the line of gaze using an estimate of the position of the fovea. The position of the fovea can either be assumed (e.g. based on population data), or can be estimated via calibration. Explicit calibration typically requires the viewer to fixate on a set of targets. Implicit calibration relies on inferring when the viewer is fixating on known scene points. Calibration can be performed anew each viewing session, or calibration data can be stored and retrieved when the viewer interacts with the display. For example, it may be retrieved based on recognising the viewer's face [Turk92, Hua11], or it may be based on another form of identification mechanism, such as a credential provided by the viewer.

The fixation point of the viewer may be estimated from the intersection point of the lines of sight of the viewer's two eyes. The fixation point may be refined using knowledge of the depth of the scene, under the assumption that the viewer is likely to be fixating on a surface point in the scene. Alternatively, the fixation depth may be estimated from the vergence of the two lines of sight, without estimating an explicit fixation point.

As an alternative to active gaze estimation using NIR illumination, gaze estimation may be passive, i.e. based only on images of the viewer's eyes under ambient illumination [Hansen10]. This relies on estimating the relative positions and shapes of key features such as the corners of the eyes, the eyelids, the boundary between the sclera and iris (the limbus), and the pupil, relative to the overall pose of the head. Passive gaze estimation is generally less accurate than active gaze estimation.

For the purposes of both active and passive gaze estimation, the display 200 may include additional steerable narrow-field-of-view (FOV) tracking cameras 344 for obtaining more detailed images of viewers' eyes. Selected camera elements 230, if scanning, may also be used as steerable narrow-FOV tracking cameras by narrowing and angling their angular fields of view.

Two-Way Light Field Display Implementation

In a preferred embodiment the segmented two-way light field display 300 captures and displays a light field video 110, i.e. a succession of light field frames 116, and operates with a sufficiently short temporal sampling period 114 to minimise or eliminate perceived flicker, i.e. ideally at a frame rate of at least 60 Hz, the peak critical flicker fusion (CFF) frequency.

As a motivating example, and for the purposes of illustrative calculations in the remainder of this specification, a two-way light field display 300 with the following parameters is used: a temporal sampling period 114 of 10 ms (i.e. a frame rate of 100 Hz, assuming one frame per temporal sampling period); a spatial sampling period 120 of 2 mm; a spatial field 118 (i.e. display surface extent) that is 1000 mm wide by 500 mm high; hence a spatial sample count of 500 by 250; an angular sampling period 126 of 0.04 degrees; an angular field of 40 degrees by 40 degrees; hence an angular sample count of 1000 by 1000; an RGB spectral sampling basis 132; and 12-bit radiance 134 samples.

This illustrative two-way display 300 configuration has a throughput of 4E13 radiance samples/s in each direction (i.e. display and capture).

Note that many applications allow significantly lower frame rates, sampling periods and sample counts.

Display Luminance and Power

The luminance of the daylight terrestrial sky ranges up to about 10,000 $cd/m^2$ (candela per square meter), which equates to a radiance (in the visible spectrum) of about 15 $W/sr/m^2$. Reproducing this using the illustrative display configuration equates to an output power of about 20 uW (microwatts) per display element 310, and a total output power of about 3 W for the entire display 300. A typical indoor light source may have a luminance an order of magnitude larger, i.e. 100,000 $cd/m^2$, equating to 200 uW per display element and 30 W for the entire display.

Any radiance samples 134 that exceed the maximum radiance of the display 300 can be clamped, or all radiance values can be scaled within the available range.

Array-Based Two-Way Light Field Display Element

Figure 13A:
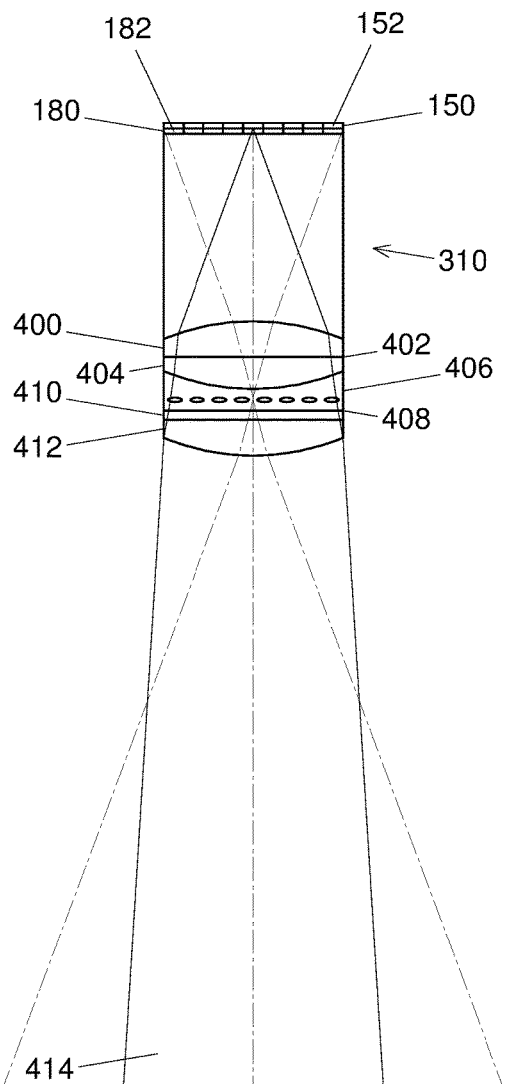
FIG. 13A shows a schematic diagram of an array-based two-way light field display element with a liquid crystal lens in a passive state.
Figure 13B:
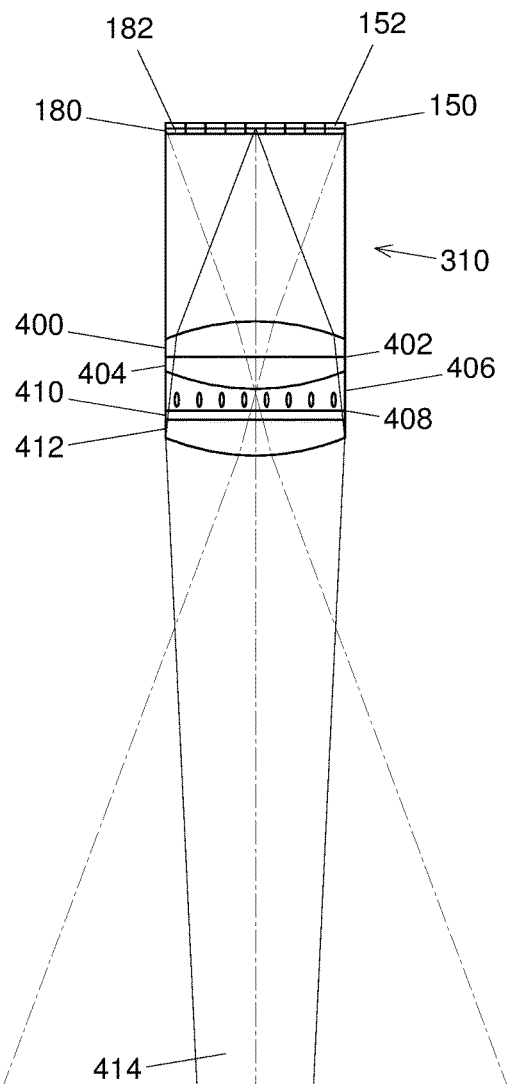
FIG. 13B shows a schematic diagram of the array-based two-way light field display element with the liquid crystal lens in an active state.

FIGS. 13A and 13B show a schematic diagram of one embodiment of a two-way light field display element 310 of the two-way light field display 300.

The two-way element 310 consists of a light sensor array 150 overlaid by a transparent light emitter array 180. Focusing is provided by a first fixed-focus positive lens 400, a variable-focus negative lens 406, and a second fixed-focus positive lens 412.

The variable-focus negative lens 406 may be any suitable lens with controllable focus, as discussed in more detail in relation to the scanning light field display element later in this specification.

The variable-focus negative lens 406 shown in FIGS. 13A and 13B consists of a nematic liquid crystal cell sandwiched between a concave face and a planar face. The concave face is formed by an adjacent convex part 404. The liquid crystal is birefringent, with light polarized parallel to the director experiencing a higher (extraordinary) refractive index (n1e), and light polarized perpendicular to the director experiencing a lower (ordinary) refractive index (n1o). For illustrative purposes an ordinary index of 1.5 and an extraordinary index of 1.8 are used, parameters representative of commercially-available liquid crystal materials such as Merck E44.

The liquid crystal cell is further sandwiched between a pair of transparent electrodes 402 and 408 (e.g. ITO). When no voltage is applied across the electrodes, as illustrated in FIG. 13A, the director (indicated by the orientation of the small ellipses in the figure) follows the horizontal rubbing direction. When a saturation voltage is applied, as illustrated in FIG. 13B, the director becomes vertically aligned with the applied field.

The refractive index (n2) of the convex part 404 is approximately matched to the ordinary refractive index (n1o) of the liquid crystal. The power of the variable-focus lens 406 is therefore close to zero when the saturation voltage is applied, while the (negative) power of the variable-focus lens 406 is at a maximum when no voltage is applied, as a function of the difference between the two refractive indices (n1e and n2) and the curvature of the convex part 404. Intermediate voltages are used to select focus values between these extremes.

When the (negative) power of the variable-focus lens 406 is at a maximum the two-way element 310 produces the diverging beam of FIG. 13A. When the lens power is at a minimum the two-way element 310 produces the converging beam of FIG. 13B.

The liquid crystal variable-focus lens 406 works in conjunction with a linear polarizer 410, which ensures that only light polarized parallel to the default director (FIG. 13A) passes into or out of the two-way display element 310, i.e. only light focused by the variable-focus lens 406.

As an alternative to using a single liquid crystal variable-focus lens 406 in conjunction with a linear polarizer 410, two liquid crystal variable-focus lenses with orthogonal rubbing directions can be used to focus light of all polarizations [Berreman80].

The combined power of the fixed-focus positive lenses 400 and 412 is balanced against the power of the variable-focus negative lens 406 to yield a focus range from short negative through to short positive, as illustrated in FIG. 13A and FIG. 13B respectively.

During two-way use of the element 310, display and capture may be time-multiplexed, with each frame period divided into a (relatively longer) display interval and a (relatively shorter) capture interval, with the variable-focus lens 406 refocused appropriately before each interval.

Figure 14A:
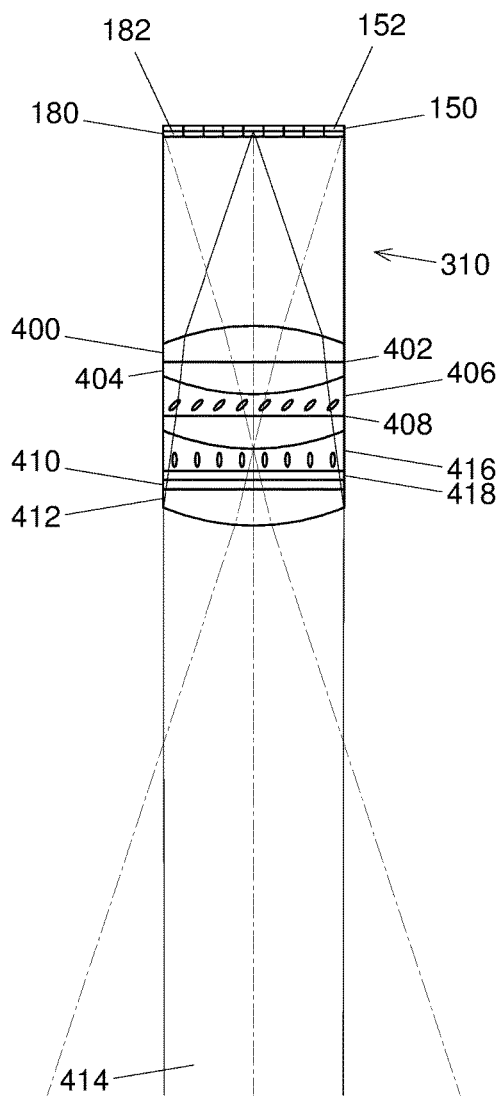
FIG. 14A shows a schematic diagram of an array-based two-way light field display element with dual liquid crystal lenses, with the first lens active.
Figure 14B:
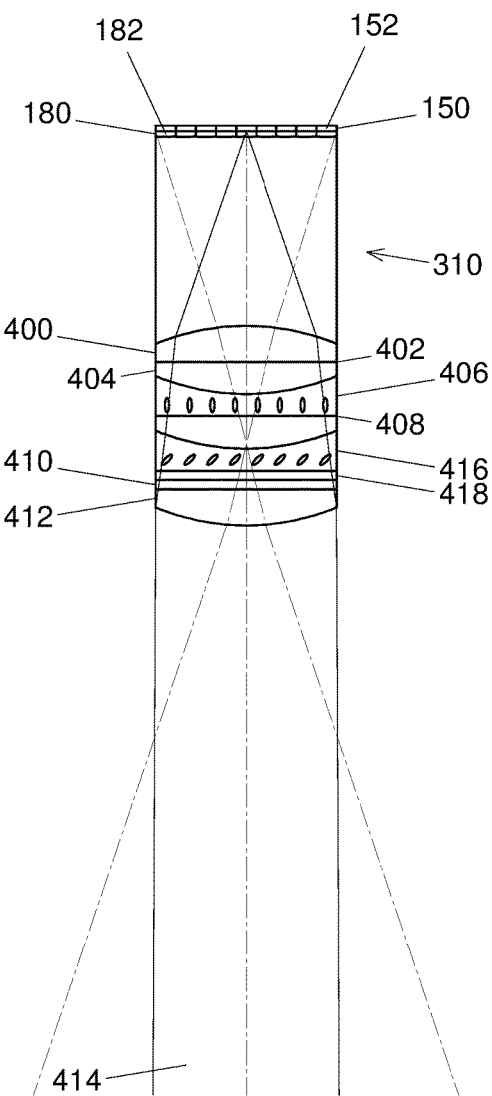
FIG. 14B shows a schematic diagram of the array-based two-way light field display element with dual liquid crystal lenses, with the second lens active.

As shown in FIGS. 14A and 14B, if the variable-focus lens 406 isn't fast enough to be refocused twice per frame then a pair of variable-focus lenses 406 and 416 with orthogonal rubbing directions can be used, one dedicated to display focus and the other dedicated to capture focus. In this case a fast switchable polarization rotator 418 [Sharp00] can be used to selectively rotate the light polarization zero or ninety degrees, and so select between display and capture focus.

FIG. 14A shows the first variable-focus lens 406 active to collimate the beam 414 for display. FIG. 14B shows the second variable-focus lens 416 active to collimate the beam 414 for capture. For clarity the figures show the unused variable-focus lens (406 or 416) made inoperative via an applied saturation voltage. In practice, however, the unused lens is actually made inoperative by the polarization rotator 418, making the voltage applied to it irrelevant.

Each light sensor 152 of the light sensor array 150 is preferably an active pixel sensor (APS) [Fossum04] so that the entire array can be exposed simultaneously during the capture interval and then subsequently read out.

For color applications, each light emitter 182 of the light emitter array 180 is preferably a full-color emitter such as a stack of red, green and blue OLEDs [Aziz10]; and each light sensor 152 may be a full-color sensor such as a sensor stack [Merrill05], or a sensor array with color filters. In addition, each light emitter 182 and light sensor 152 may utilise any of the implementation options discussed in relation to the scanning light field display element below.

Each light emitter 182 and/or light sensor 152 may also support time-of-flight range-finding, as discussed in relation to the scanning light field display element below.

The variable-focus lenses 406 and 416 are shown with inhomogeneous gaps, allowing the use of simple electrodes. Since the speed of liquid crystal rotation decreases with decreasing gap size, homogeneous gaps can be used to increase the speed of rotation, although this necessitates the use of multi-segment electrodes [Lin11].

There are several disadvantages to using an array-based light field display element. Since each light emitter 182 is typically a diffuse emitter, only a portion of the generated light is actually emitted through the exit pupil of the display element. Since the size of the emitter array 180 is constrained by the spatial sampling period 120 (since this constrains the width of the display element), the number of angular samples may be overly constrained. And given practical limits on the complexity of the lenses used to focus the output from the display element (and input to the two-way display element), it is difficult to achieve high off-axis beam quality.

These limitations are avoided in the scanning display element 210, scanning camera element 230, and scanning two-way display element 310 described next.

Scanning Light Field Display Element

Figure 15:
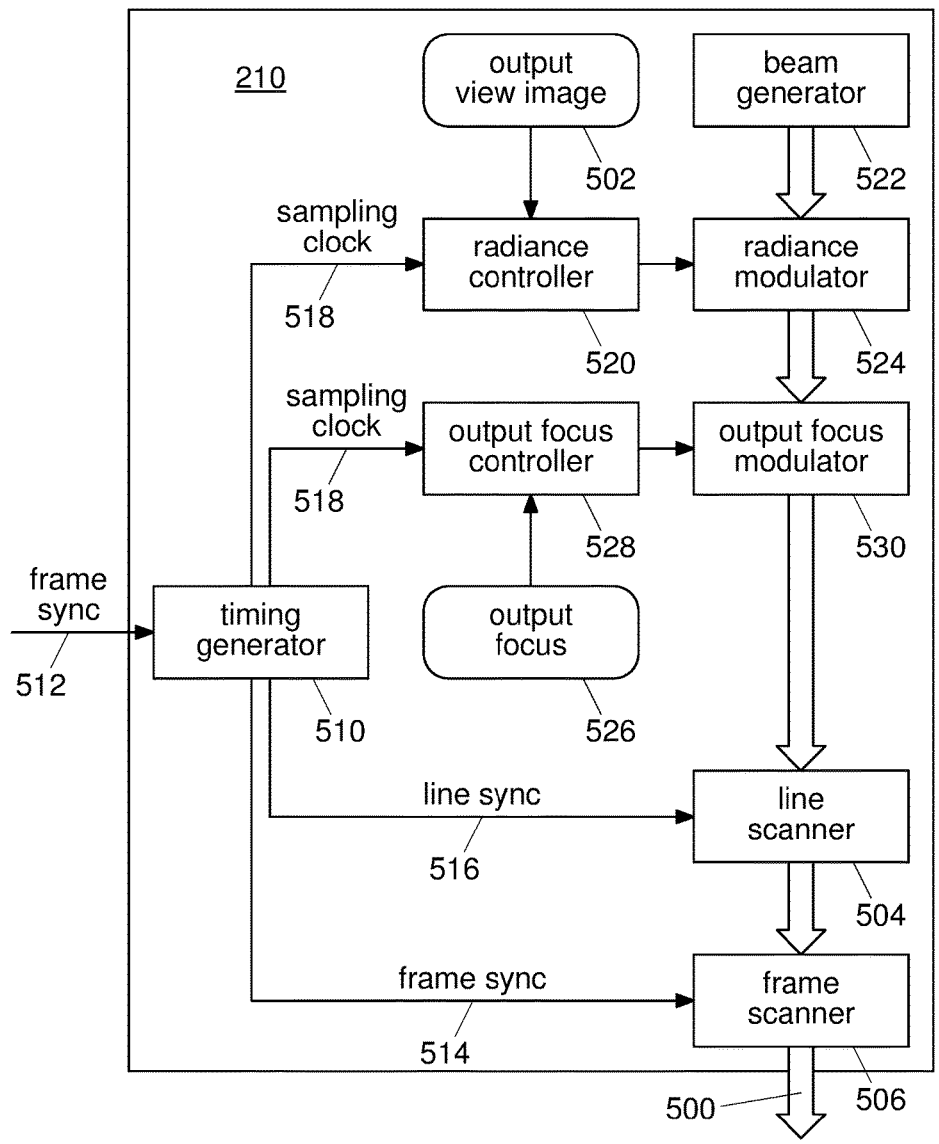
FIG. 15 shows a block diagram of a scanning light field display element.

FIG. 15 shows a block diagram of a scanning embodiment of the light field display element 210 of the light field display 200.

The display element 210 scans an output beam of light 500 in two-dimensional raster fashion across the 2D angular field 124, and for each direction (a, b) modulates the beam to produce the desired radiance 134 specified in the output light field view image 502, which is a view image 122 of a light field video 110.

Over the duration of a single pulse (described below) the beam 500 corresponds to a particular output beam 212 in FIG. 7B, and to the reconstruction beam 192 in FIG. 5B.

The scanning display element 210 relies on the persistence of vision to induce the perception of a continuous optical light field throughout the angular field of view 124.

The beam 500 is scanned in the line direction by fast line scanner 504 (with an illustrative line rate of 100 kHz), and in the orthogonal (frame) direction by slow frame scanner 506 (with an illustrative frame rate of 100 Hz).

The fast line scanner 504 and slow frame scanner 506 may be separate, or may be combined in a 2D (biaxial) scanner.

The scanners are controlled by timing generator 510, which itself is controlled by an external frame sync signal 512, which is shared with other display elements 210. The frame scanner 506 is controlled by a frame sync signal 514 derived from the external frame sync signal 512, while the line scanner 504 is controlled by a line sync signal 516.

The radiance controller 520 controls the radiance of the output beam. Under the control of a sampling clock 518 from the timing generator 510, it reads the next radiance value 134 from the output view image 502 and generates a signal to control the radiance of the output beam.

If the angular scan velocity of the fast scanner 504 is angle-dependent (e.g. because the fast scanner is resonant) then the timing generator 510 adjusts the sampling clock 518 accordingly to ensure a constant angular sampling period 126.

The beam generator 522 generates the light beam, and the radiance modulator 524 modulates the radiance of the beam, typically in response to a beam power signal from the radiance controller 520. Implementation choices are described below.

The pulse duration should be matched to the angular sampling period 126 to ensure proper reconstruction. If a shorter pulse (of correspondingly higher power) is used, then proper reconstruction can be effected optically, as described below in relation to FIG. 20.

As described earlier, the required beam power is obtained by multiplying the required radiance 134 by the 5D sampling period (i.e. the 1D temporal sampling period 114, the 2D spatial sampling period 120, and the 2D angular sampling period 126), and dividing it by the pulse duration.

The pulse duration is obtained by dividing the angular sampling period 126 by the angular scan velocity of the fast scanner 504. If the angular scan velocity is angle-dependent (e.g. because the fast scanner is resonant), then the pulse duration is also angle-dependent.

The scanned output beam 500 may be focused according to an output focus source 526. The output focus source 526 may comprise an array of focus values each associated with a beam direction, i.e. corresponding to the sampling focus 138 associated with the spectral radiance 128. Alternatively it may comprise a single focus value which may change from one frame to the next (or at some other rate). Output focus controller 528 retrieves the focus value (or the next focus value, controlled by the sampling clock 518 from the timing generator 510), and generates a signal to control the focus of the output beam.

The output focus modulator 530 modulates the focus of the beam according to the signal from the output focus controller 528. Implementation choices are described below. If the display 200 is only required to operate in the fixed-focus far-field regime then the output focus modulator 530 may impart fixed focus on the beam, i.e. it may consist of a simple fixed-focus lens.

The display element 210 optionally incorporates multiple beam generators 522 and radiance modulators 524 to generate multiple adjacent beams 500 simultaneously.

Beam Generator

Figure 16:
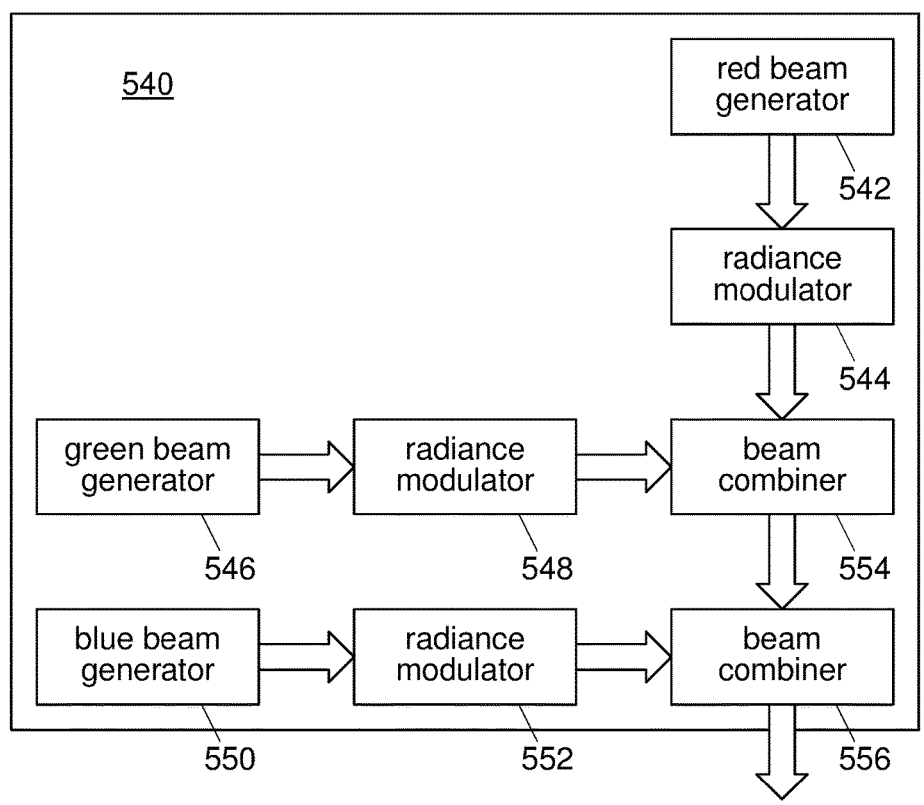
FIG. 16 shows a block diagram of an RGB laser beam generator with multiple intensity modulators.

The beam generator 522 may be monochromatic, but is more usefully polychromatic. FIG. 16 shows a block diagram of a polychromatic beam generator and radiance modulator assembly 540, which replaces the beam generator 522 and radiance modulator 524 of FIG. 15.

The polychromatic beam generator and radiance modulator assembly 540 includes a red beam generator 542 and radiance modulator 544, a green beam generator 546 and radiance modulator 548, and a blue beam generator 550 and radiance modulator 552. Each radiance modulator is responsive to respective signals from the radiance controller 520 shown in FIG. 15. The modulated red and green beams are combined via beam combiner 554. The resultant beam is combined with the modulated blue beam via beam combiner 556. The beam combiners may be dichroic beam combiners capable of combining beams of different wavelengths with high efficiency. To maximise the reproducible gamut the red, green and blue beam generators 542, 546 and 550 ideally have central wavelengths close to the prime color wavelengths of 450 nm, 540 nm and 605 nm respectively [Brill98].

The beam generator 522 (or beam generators 542, 546 and 550) may incorporate any suitable light emitter, including a laser [Svelto10], laser diode, light-emitting diode (LED), fluorescent lamp, and incandescent lamp. Unless the emitter is intrinsically narrowband (e.g. the emitter is a laser, laser diode, or LED), the beam generator may incorporate a color filter (not shown). Unless the emitted light is collimated, with adequately uniform power across the full beam width, the beam generator may include conventional collimating optics, beam expansion optics, and/or beam-shaping optics (not shown).

The radiance modulator 524 may be intrinsic to the beam generator 522 (or beam generators 542, 546 and 550). For example, the beam generator may be a semiconductor laser which allows its power and pulse duration to be modulated directly by modulating its drive current.

If the radiance modulator 524 is distinct from the beam generator then the beam generator (or its light emitter) may be shared between a number of display elements 310. For example, a number of display elements may share a lamp, or may share a single laser source via a holographic beam expander [Shechter02, Simmonds11].

Each color light emitter may be particularly effectively implemented using a semiconductor laser, such as a vertical-cavity surface-emitting laser (VCSEL) [Lu09, Higuchi10, Kasahara11]. A VCSEL produces a low-divergence circular beam that at a minimum only requires beam expansion.

Frequency-doubling via second harmonic generation (SHG) [Svelto10] provides an alternative to direct lasing at the target wavelength.

Radiance Modulator

If the radiance modulator 524 is distinct from the beam generator then it may consist of any suitable high-speed light valve or modulator, including an acousto-optic modulator [Chang96, Saleh07], and an electro-optic modulator [Maserjian89, Saleh07]. In the latter case it may exploit the Franz-Keldysh effect or the quantum-confined Stark effect to modulate absorption, or the Pockels effect or the Kerr effect to modulate refraction and hence deflection. The radiance modulator may include optics (not shown) to manipulate the beam before and/or after modulation, i.e. to optimise the coupling of the beam and the modulator (e.g. if there is a mismatch between the practical aperture of the modulator and the width of the beam before and/or after the modulator).

If the modulation is binary then intermediate radiances may be selected by temporally dithering the beam, i.e. pseudorandomly opening and closing the valve throughout the nominal pulse duration with a duty cycle proportional to the required power. Dithering reduces artifacts in the reconstructed light field.

For the illustrative display configuration the required radiance modulation rate is 100 MHz (or an order of magnitude more if the modulation is binary). Both acousto-optic and electro-optic modulators support this rate, as do modulators that are intrinsic to the beam generator.

Focus Modulator

The output focus modulator 530 may utilise any suitable variable-focus lens, including a liquid crystal lens [Berreman80, Kowel86, Naumov99, Lin11], a liquid lens [Berge07], a deformable membrane mirror [Nishio09], a deformable-membrane liquid-filled lens [Fang08], an addressable lens stack [Love09], and an electro-optic lens (e.g. exploiting the Pockels effect or Kerr effect to modulate refraction) [Shibaguchi92, Saleh07, Jacob07, Imai11].

An addressable lens stack [Love09] consists of a stack of N birefringent lenses, each with a different power (e.g. half the power of its predecessor), and each preceded by a fast polarization rotator (e.g. [Sharp00]). The $2^N$ possible settings of the binary rotators yield a corresponding number of focus settings. For example, 10 lenses yield 1024 focus settings.

Fast polarization rotators can also be used to select among a small number of variable-focus lenses (as described in relation to FIGS. 14A and 14B). Such a lens consists of a stack of N variable-focus birefringent lenses, each preceded by a fast polarization rotator. One pair of rotators is enabled at a time to select the variable-focus lens bracketed by the pair (the first rotator selects the lens; the second rotator deselects subsequent lenses). This allows fast switching between variable focus settings, even if the variable focus lenses themselves are relatively slow. Each variable-focus lens in the stack can then be dedicated to one display pass (which may be viewer-specific or scene-specific), and the rotators can be used to rapidly select the appropriate lens for each display pass in turn. The stack optionally includes an additional rotator after the final lens to allow the final polarization of the beam to be constant, e.g. if the optical path contains polarization-sensitive downstream components.

For the illustrative display configuration the required focus modulation rate is 100 MHz to support per-sample focus, a modest multiple of 100 Hz to support multiple single-focus display passes (e.g. for multiple viewers), and around 4 Hz to support single-viewer gaze-directed focus. All of the variable-focus lens technologies described above support a 4 Hz focus modulation rate. Lens stacks utilising polarization rotators support modulation rates in excess of 1 kHz. Electro-optic lenses support modulation rates in excess of 100 MHz.

Line and Frame Scanners

The fast line scanner 504 and slow frame scanner 506 may each utilise any suitable scanning or beam-steering mechanism, including a (micro-) electromechanical scanning mirror [Neukermans97, Gerhard00, Bernstein02, Yan06], an addressable deflector stack ('digital light deflector') [Titus99], an acousto-optic scanner [Vallese70, Kobayashi91, Saleh07], and an electro-optic scanner [Saleh07, Naganuma09, Nakamura10].

Most scanner technologies can support the 100 Hz illustrative frame rate. Fast scanner technologies such as resonant microelectromechanical scanners and electro-optic scanners can support the 100 kHz illustrative line rate.

If the fast line scanner 504 is resonant then it may monitor (or otherwise determine) its own angular position and provide the timing generator 510 with angular position information to assist the timing generator with generating an accurate sampling clock 518.

Microelectromechanical scanners provide a particularly good combination of scan frequency and angular field, and are described in more detail later in this specification.

Scanning Light Field Camera Element

Figure 17:
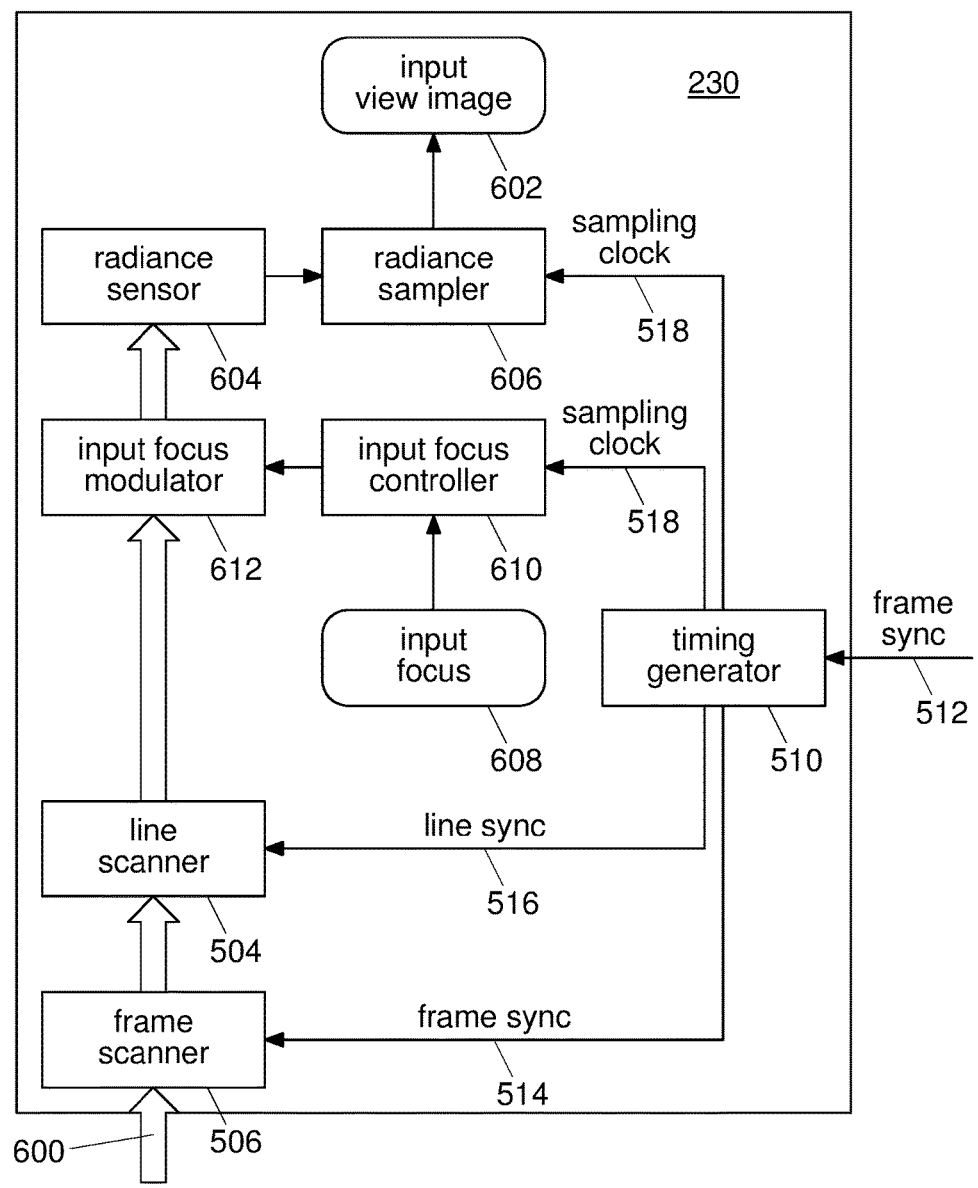
FIG. 17 shows a block diagram of a scanning light field camera element.

FIG. 17 shows a block diagram of a scanning embodiment of the light field camera element 230 of the light field camera 220.

The camera element 230 scans an input beam of light 600 in two-dimensional raster fashion across the 2D angular field 124, and for each direction (a, b) samples the beam to produce the desired radiance 134 in the input light field view image 602, which is a view image 122 of a light field video 110.

Over the duration of a single exposure (discussed below) the beam 600 corresponds to a particular input beam 232 in FIG. 8B, and to the sampling beam 166 in FIG. 3B.

The beam 600 is scanned in the line direction by fast line scanner 504 (with an illustrative line rate of 100 kHz), and in the orthogonal (frame) direction by slow frame scanner 506 (with an illustrative frame rate of 100 Hz). Implementation choices for the scanners are as described above in relation to the scanning display element 210.

The scanners are controlled by timing generator 510, which itself is controlled by an external frame sync signal 512, which is shared with other camera elements 230. The frame scanner 506 is controlled by a frame sync signal 514 derived from the external frame sync signal 512, while the line scanner 504 is controlled by a line sync signal 516.

The radiance sensor 604 senses the radiance of the beam, or, more typically, a quantity representative of the radiance, such as beam energy (i.e. beam power integrated over time). Implementation choices are described below.

The radiance sampler 606, controlled by a sampling clock 518 from the timing generator 510, samples the radiance-representative value (e.g. beam energy) from the radiance sensor 604, and converts it to a linear or non-linear (e.g. logarithmic) radiance value 134 which it writes to the input view image 602. Implementation choices are described below.

As described earlier, the radiance 134 may be obtained by dividing a sampled beam energy value by the 5D sample size (i.e. 1D exposure duration, 2D spatial sample size, and 2D angular sample size).

The nominal maximum sample exposure duration is obtained by dividing the angular sampling period 126 by the angular scan velocity of the fast scanner 504. If the angular scan velocity is angle-dependent (e.g. because the fast scanner is resonant), then the exposure duration is also angle-dependent.

To improve the signal to noise ratio of the captured radiance 134, the effective exposure duration can be increased beyond the nominal maximum exposure duration by using a sensor array as described below in relation to FIG. 23A and FIG. 23B.

To ensure proper band-limiting, the radiance sensor 604 nominally has an active spatial extent that matches the angular sampling period 126. However, when coupled with the maximum sample exposure duration this produces blur in the fast scan direction. To avoid such blur, either the exposure duration needs to be reduced or the spatial extent of the sensor 604 in the fast scan direction needs to be reduced. The latter approach can be realised by implementing the sensor 604 using a linear array of narrow photodetectors, as also described below in relation to FIG. 23A and FIG. 23B.

The scanned input beam 600 may be focused according to an input focus source 608. The input focus source 608 may comprise an array of focus values each associated with a beam direction, i.e. corresponding to the sampling focus 138 associated with the spectral radiance 128. Alternatively it may comprise a single focus value which may change from one frame to the next (or at some other rate). Input focus controller 610 retrieves the focus value (or the next focus value, controlled by the sampling clock 518 from the timing generator 510), and generates a signal to control the focus of the input beam.

The input focus modulator 612 modulates the focus of the beam according to the signal from the input focus controller 610. Implementation choices for the input focus modulator 612 are the same as for the output focus modulator 530, as discussed above. If the camera 220 is only required to operate in the fixed-focus far-field regime then the input focus modulator 612 may impart fixed focus on the beam, i.e. it may consist of a simple fixed-focus lens Radiance Sensor The radiance sensor 604 may be monochromatic, but is more usefully polychromatic. If polychromatic, it may utilize a stacked color sensor [Merrill05], or an array of sensors with color filters.

The sensor 604 may incorporate any suitable photodetector(s), including a photodiode operating in photoconductive or photovoltaic mode, a phototransistor, and a photoresistor.

The sensor 604 may incorporate analog storage and exposure control circuitry [Fossum04].

Radiance Sampler

The radiance sampler 606 may incorporate any analog-to-digital converter (ADC) with suitable sampling rate and precision, typically with a pipelined architecture [Levinson96, Bright00, Xiaobo10]. For the illustrative display configuration the sampling rate is 100 Msamples/s and the precision is 12 bits. The sampler 606 may incorporate multiple ADCs to convert multiple color channels in parallel, or it may time-multiplex conversion of multiple color channels through a single ADC. It may also utilise multiple ADCs to support a particular sampling rate.

The sampler 606 may incorporate a programmable gain amplifier (PGA) to allow the sensed value to be offset and scaled prior to conversion.

Conversion of the sensed value to a radiance 134 may be performed before or after analog-to-digital conversion.

Time-of-Flight Range Finding

The light field camera 220 is optionally configured to perform time-of-flight (ToF) range-finding [Kolb09]. The camera then includes one or more light emitters for illuminating the scene with ToF-coded light. The ToF-coded light is reflected by the scene and is detected and converted to a depth by each camera element 230 every sampling period.

The radiance sensor 604 and radiance sampler 606 may be configured to perform ToF range-finding by incorporating circuitry to measure the phase difference between the coding of the outgoing light and the coding of the incoming light [Kolb09, Oggier11].

When configured to perform ToF range-finding the sampler 606 writes an estimated depth 136 to the input view image 602 every sampling period.

The ToF-coded light is ideally invisible, e.g. near-infrared (NIR). The sensor 604 may sense the ToF-coded light using a photodetector that is also used for sensing visible light, or the sensor 604 may include a dedicated photodetector for ToF-coded light.

An alternative to the camera providing one or more ToF-coded light emitters, each camera element 230 may, if also configured as a display element 210 (see below), emit its own ToF-coded light. The beam generator 522 may incorporate a light emitter for ToF-coded light, such as an NIR light emitter.

If necessary, face detection can be used to disable ToF range-finding for any sample (x, y, a, b) that would transmit ToF light into an eye.

Scanning Two-Way Light Field Display Element

Figure 18:
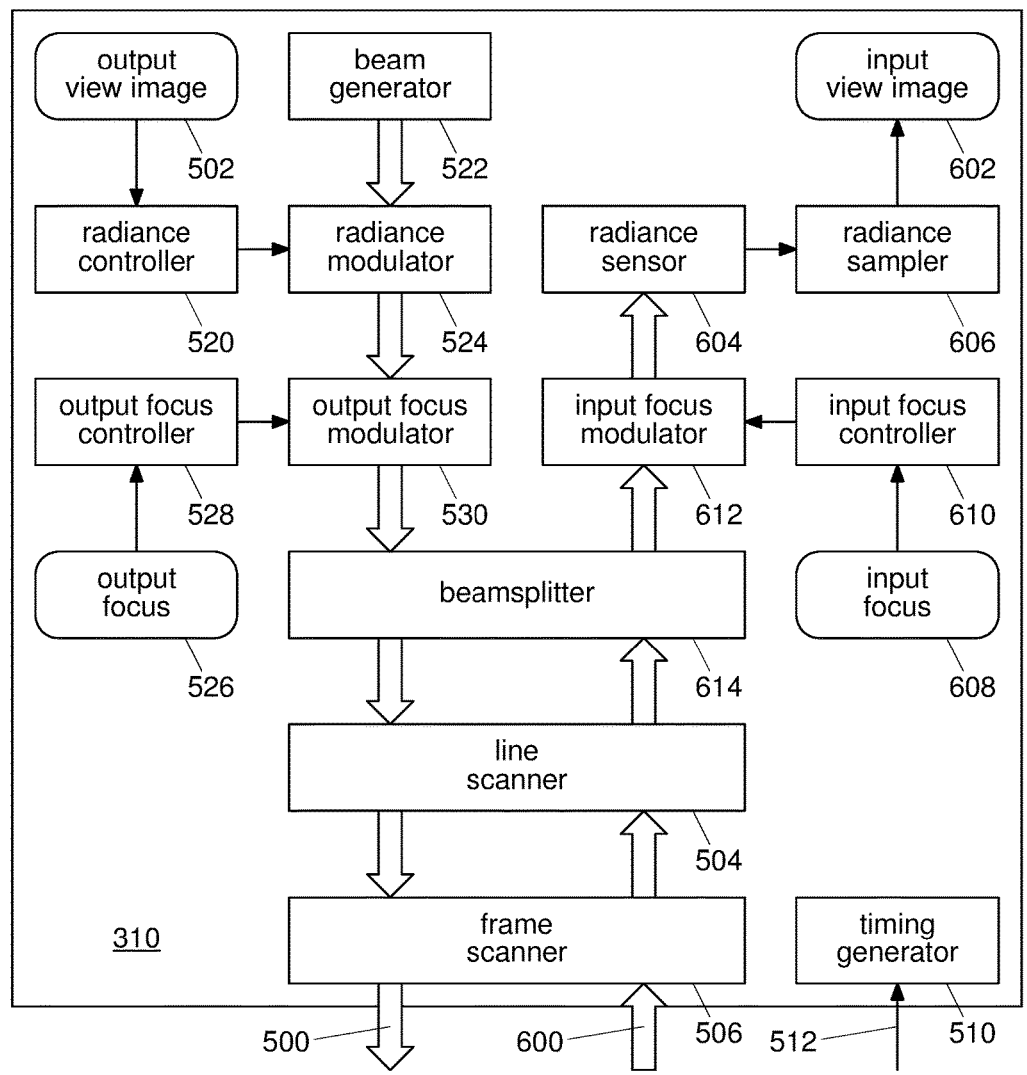
FIG. 18 shows a block diagram of a scanning two-way light field display element.

FIG. 18 shows a block diagram of a scanning two-way light field display element 310 of the two-way light field display 300. It combines the functions of the light field display element 210 and the light field camera element 230 shown in FIG. 15 and FIG. 17 respectively.

In the scanning two-way light field display element 310, the line scanner 504, frame scanner 506 and the timing generator 510 are shared between the display and camera functions of the element.

A beamsplitter 614 is used to separate the output and input optical paths. It may be any suitable beamsplitter, including a polarizing beamsplitter (discussed further below), and a half-silvered (or patterned) mirror.

In the scanning two-way light field display element 310 display and capture occur simultaneously, except when the angular field 124 is visibility-based (as discussed later in this specification) when it may vary significantly between display and capture.

Optical Design of Scanning Two-Way Light Field Display Element

Figure 19A:
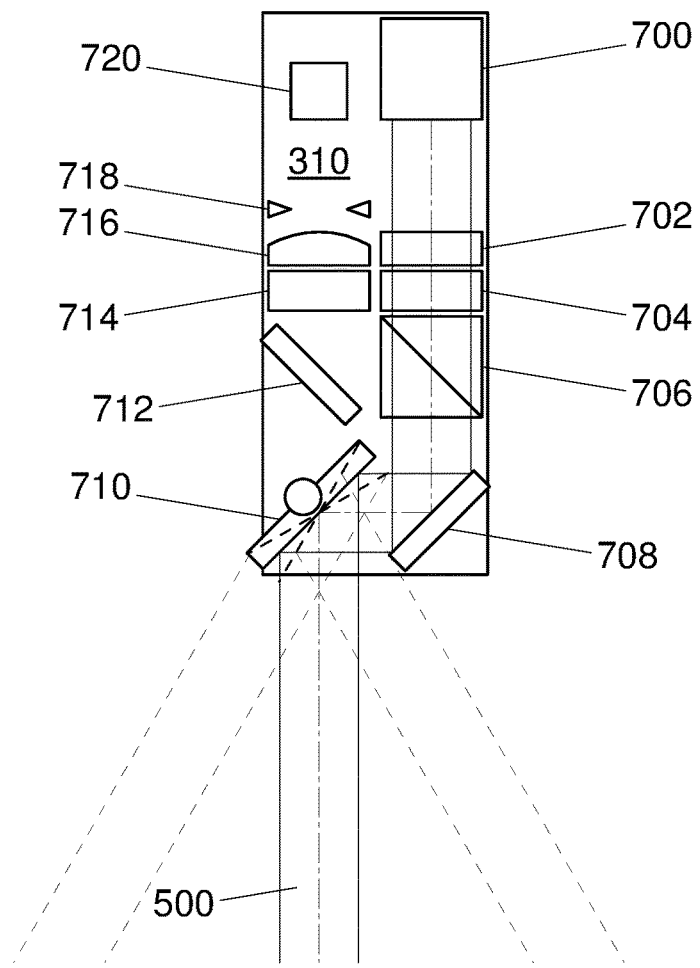
FIG. 19A shows a plan view of an optical design for the scanning two-way light field display element, with output rays.
Figure 19B:
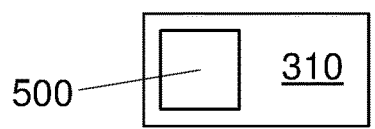
FIG. 19B shows a front elevation of the optical design for the scanning two-way light field display element, with output rays.

FIG. 19A shows a plan view of an optical design for the scanning two-way light field display element 310. The traced rays show the output optical path in operation, i.e. the element is generating output beam 500. FIG. 19B shows the corresponding front elevation.

The height of the two-way element is the spatial sampling period 120. The width of the two-way element 310 is approximately twice the spatial sampling period 120.

Where the optical design is illustrated with particular component choices, note that it could be implemented using other equivalent components, such as discussed in previous sections. This includes the use of reflecting components in place of transmitting components and vice versa.

The design goal for the output optical path is to generate the output beam 500 so that it properly reconstructs, for a given direction (a, b), the corresponding 4D slice of the (bandlimited) continuous light field.

A laser 700 is used to produce a collimated beam 500 with a width as close as possible to the spatial sampling period 120. The beam may be expanded and/or shaped (by additional components not shown) after being generated by the laser 700. The laser 700 implements the beam generator 522 described in previous sections.

An angular reconstruction filter 702 is used to induce spread in the output beam equal to the angular sampling period 126. The angular reconstruction filter 702 is discussed in more detail below, in relation to FIG. 20.

A variable-focus lens 704 is used to control the focus of the output beam. It implements the output focus modulator 530.

A beamsplitter 706 is used to split the output and input optical paths. It implements the beamsplitter 614.

A fixed mirror 708 deflects the output beam to a biaxial scanning mirror 710, described in the next section. The scanning mirror 710 scans the output beam 500 across the angular field 124. It implements both the line scanner 504 and the frame scanner 506.

As an alternative, the biaxial scanning function may be implemented using two separate uniaxial scanning mirrors. In this configuration the fixed mirror 708 is replaced by a fast uniaxial scanning mirror (which implements the line scanner 504), and biaxial scanning mirror 710 is replaced by a relatively slower uniaxial scanning mirror (which implements the frame scanner 506).

FIG. 19A shows the biaxial scanning mirror 710, and hence output beam 500, at three distinct angles, corresponding to the center and the two extremes of the angular field 124.

Figure 20:
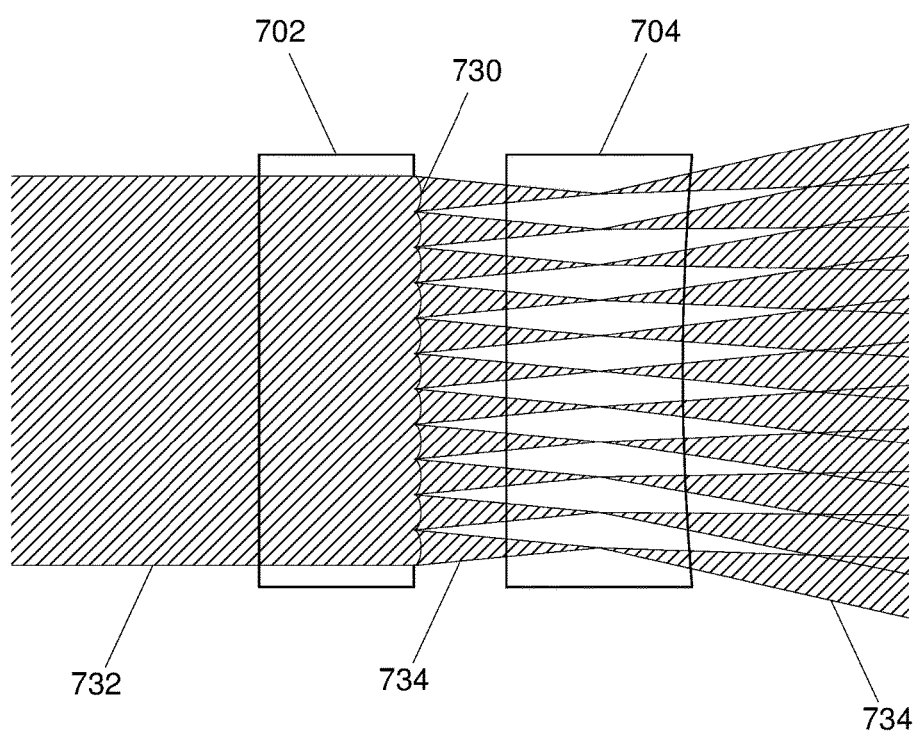
FIG. 20 shows the angular reconstruction filter of FIG. 19A implemented using an array of lenslets.

The angular reconstruction filter 702 can be implemented using a (possibly elliptical) diffuser [Qi05], or using an array of lenslets 730 as shown in FIG. 20. The purpose of the angular reconstruction filter is to induce spread in the output beam equal to the angular sampling period 126, and the use of lenslets 730 allows the spread angle to be precisely controlled. Each lenslet 730 acts on the input beam 732 to produce a focused output beam let 734. Since the input beam 732 is collimated, the induced spread angle is the angle subtended by the diameter of the lenslet 730 at the focal point of the lenslet. In order to decouple the induced spread from the beam focus induced by the downstream variable-focus lens 704, the focal point of the lenslet 730 is ideally placed on the first principal plane of the variable-focus lens 704 (at least approximately).

The larger the number of lenslets 730, the more uniform the overall output beam, which is the sum of the individual beamlets 734. The smaller the diameter of each lenslet 730, the shorter its focal length needs to be to induce the same spread angle, thus the smaller the gap between the angular reconstruction filter 702 and the variable-focus lens 704 needs to be. In practice the array of lenslets 730 may be molded into the face of the variable-focus lens 704.

If the output pulse duration matches the angular sampling period 126 (and scanning is continuous rather than discrete in the fast scan direction) then the output beam spread angle is already correct in the fast scan direction, and spread only needs to be induced in the slow scan direction. In this case each lenslet 730 may be a cylindrical lens oriented in a direction perpendicular to the slow scan direction.

Figure 21A:
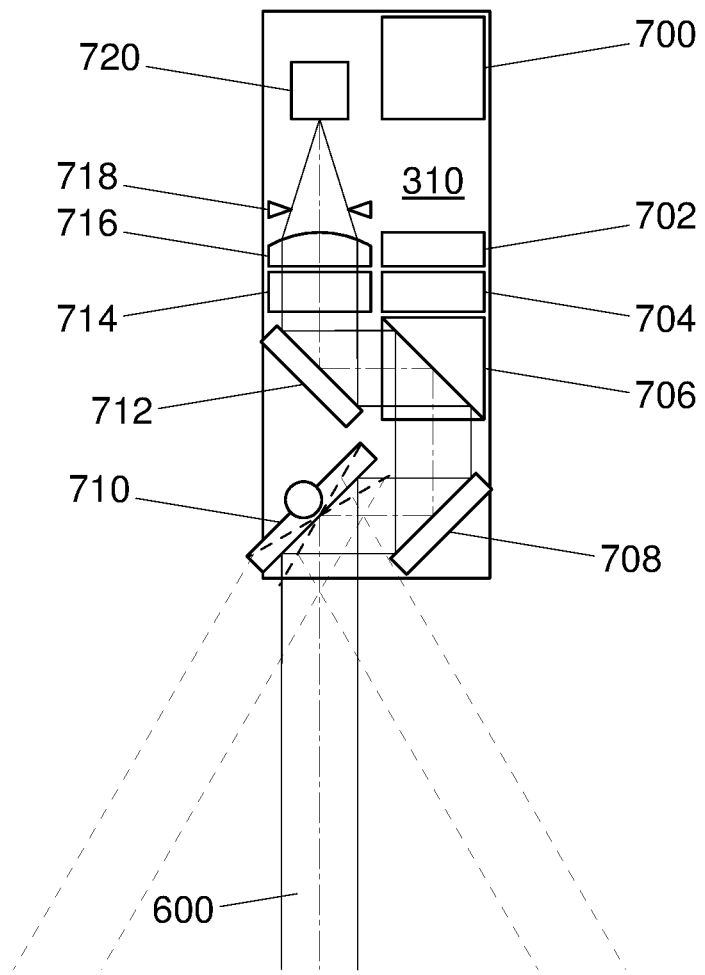
FIG. 21A shows a plan view of the optical design for the scanning two-way light field display element, with input beams.
Figure 21B:
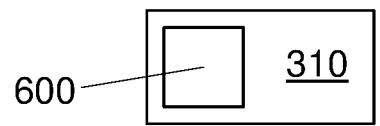
FIG. 21B shows a front elevation of the optical design for the scanning two-way light field display element, with input beams.

FIG. 21A shows a plan view of the optical design for the two-way light field display element 310. The traced rays show the input optical path in operation, i.e. the element is sampling input beam 600. FIG. 21B shows the corresponding front elevation.

The design goal for the input optical path is to sample the input beam 600 so that it properly filters, for a given direction (a, b), the corresponding 4D slice of the continuous light field.

The biaxial scanning mirror 710 (or pair of uniaxial scanning mirrors) scans the input beam 600 across the angular field 124, as described above for the output optical path.

The fixed mirror 708 and beamsplitter 706 deflect the input beam to fixed mirror 712, which deflects the beam through variable-focus lens 714.

The variable-focus lens 714 is used to control the focus of the input beam. It implements the input focus modulator 612.

The variable-focus lens 714 is followed by a fixed-focus lens 716, which focuses the (nominally collimated) input beam, via an aperture 718, onto a photodetector 720. The photodetector 720 implements the radiance sensor 604.

For color sensing, the photodetector 720 may consist of a photodetector stack [Merrill05], or a photodetector array with color filters.

The laser 700 may produce a substantially polarized beam (i.e. because it incorporates a polarizing Brewster window as its exit mirror), in which case it is efficient for the beamsplitter 706 to be polarizing, i.e. to split the outgoing and incoming beams based on polarization [vonGunten97]. Further, if the variable-focus lenses 704 and 714 are birefringent (e.g. they are liquid-crystal lenses), they then only need to act on their respective beam polarization and are thus simplified. Even if the laser 700 does not intrinsically produce a highly polarized beam, it may incorporate or be followed by a polarizer for this purpose (not shown).

Biaxial Scanning Mirror

A uniaxial microelectromechanical (MEMS) scanner typically consists of a mirror attached to a frame by a pair of perfectly elastic torsional hinges, and is driven to rotate about the hinges via an electrostatic, magnetic or capacitive coupling between the mirror and a driver. In a biaxial MEMS scanner [Neukermans97], the inner frame holding the mirror is attached to a fixed outer frame via a further pair of hinges arranged orthogonally to the mirror hinges, allowing the inner frame to be driven to rotate orthogonally to the mirror. The mirror is typically driven resonantly while the inner frame is not.

In a typical biaxial MEMS scanner the inner and outer frames surround the mirror, and so the area of the mirror is a fraction of the footprint of the device. This makes such a device non-optimal for use in a light field display where the relative aperture of the scanner is important. This can be ameliorated by elevating the mirror above the scanning mechanism, as is the practice in digital micromirror devices (DMDs) [Hornbeck96, DiCarlo06].

Figure 22A:
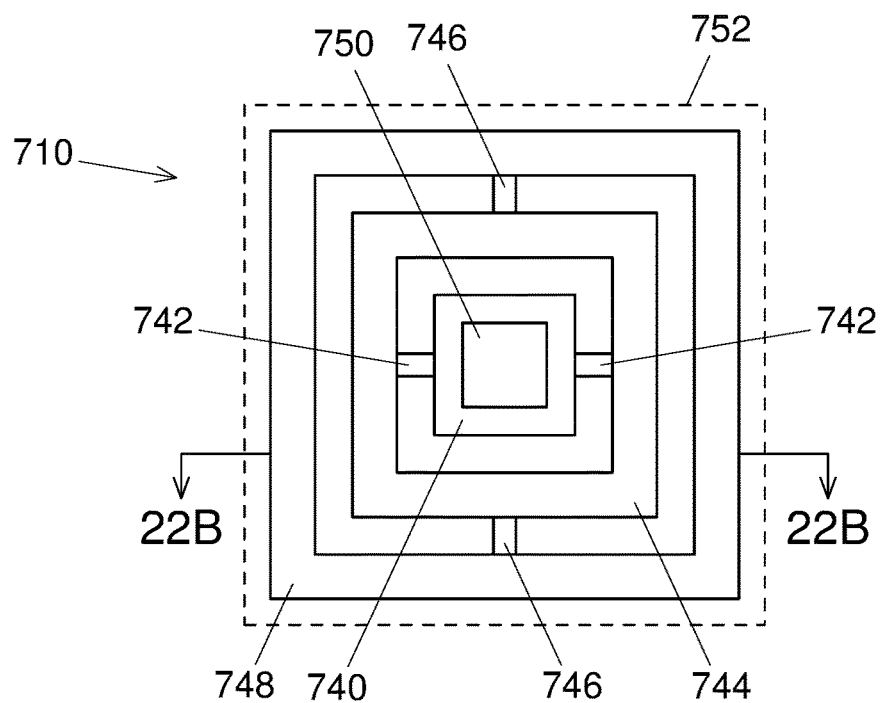
FIG. 22A shows a plan view of a biaxial MEMS scanner with an elevated mirror.

FIG. 22A shows a plan view of an example biaxial MEMS scanner 710 with an elevated mirror, but otherwise of conventional design [Neukermans97, Gerhard00, Bernstein02, Yan06]. A central platform 740 is attached by torsional hinges 742 to an inner frame 744. The inner frame 744 is attached by orthogonally-arranged torsional hinges 746 to a fixed outer frame 748. The central platform 740 is driven to rotate about the hinges 744, while the inner frame 744 is driven to rotate in the orthogonal direction about the hinges 746. A post 750, mounted on the platform 740, holds a mirror 752 (shown in outline) elevated above the scanning mechanism.

Figure 22B:
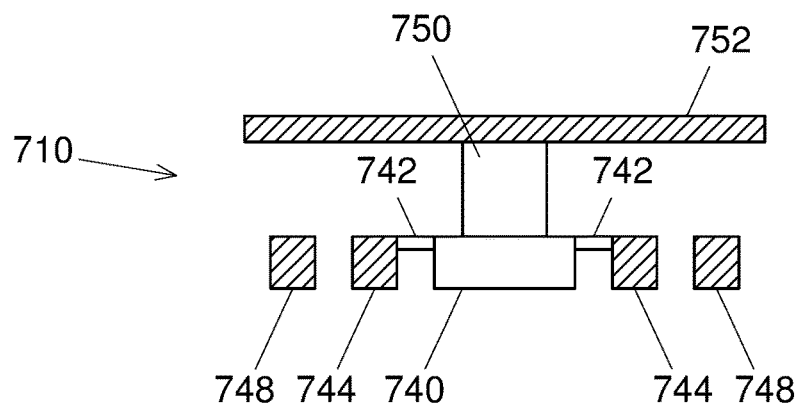
FIG. 22B shows a cross-sectional elevation of the biaxial MEMS scanner with an elevated mirror.

FIG. 22B shows a cross-sectional front elevation of the biaxial MEMS scanner 710, showing the mirror 752 elevated above the scanning mechanism by the post 750. The elevation of the mirror 752 above the scanning mechanism is chosen to accommodate the maximum scan angle.

FIG. 22B does not show the drive mechanisms, which may be of any conventional design as described above. By way of example, the central platform 740 may incorporate a coil for conducting an alternating current, thus producing a time-varying magnetic field which interacts with the field of a permanent magnet below the platform (not shown) to produce the required time-varying torque. Likewise, the inner frame 744 may incorporate a coil whose field interacts with the field of a permanent magnet.

For present purposes, to support the illustrative line rate, the central platform 740 is driven resonantly [Turner05] and implements the fast line scanner 504, while the inner frame 744 is driven directly and implements the slow frame scanner 506.

As previously mentioned, control logic associated with the scanner 710 may monitor (or otherwise determine) the angular position of the central platform 740 in the resonant scan direction [Melville97, Champion12] for the purposes of assisting the timing generator 510 with generating an accurate sampling clock 518.

Extending Exposure Duration Using a Photodetector Array

The nominal exposure duration of a single light field sample during a scan is limited by the angular sampling period 126, and may therefore be very short. However, it is possible to deploy a linear photodetector array parallel to the fast scan direction, in place of a single photodetector 720, to extend the exposure duration.

FIG. 21A, as described above, shows the scanning mirror 710 scanning the moving input beam 600 across the angular field 124. Equivalently, FIG. 23A shows, via a simplified configuration which excludes extraneous optical components, the scanning mirror 710 scanning a stationary beam 760 corresponding to a fixed point source 224 across the photodetector, here replaced by a linear photodetector array 762 consisting of M photodetectors.

If samples are taken from the linear photodetector array 762 at precisely the rate at which the stationary beam 760 is scanned across it, then M time-successive samples from the M photodetectors can be summed to yield a sample value with an effective exposure duration M times longer than the nominal exposure duration.

Figure 23A:
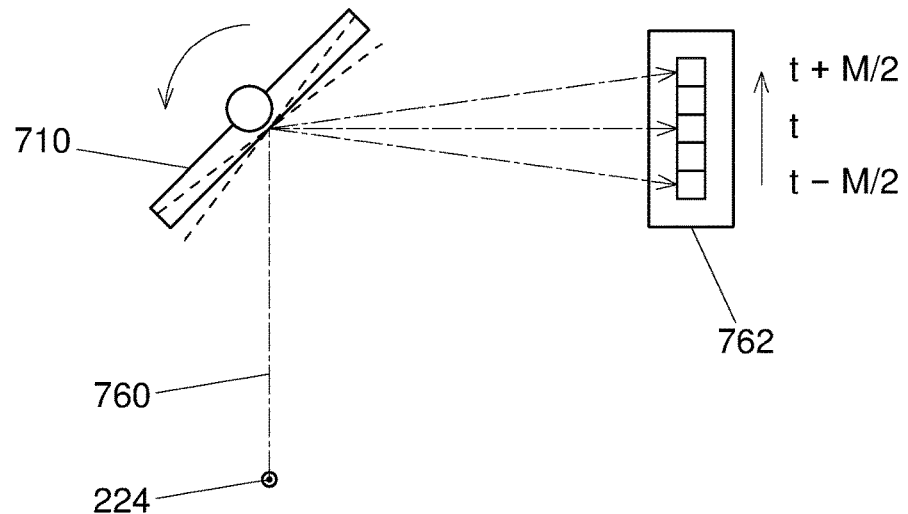
FIG. 23A shows the scanning mirror of FIG. 21A scanning a stationary beam corresponding to a fixed point source across a linear photodetector array.

As indicated in FIG. 23A, the linear photodetector array 762 covers an angular field M samples wide, representing M successive periods of the sampling clock 518. At a given time t these samples correspond to times ranging from t minus M/2 to t plus M/2, and M successive samples are being accumulated in parallel at any given time.

To avoid vignetting when using a linear photodetector array 762, the angular field 124 must be reduced by M times the angular sampling period 126.

While sample readout and summation can be carried out using digital logic, a relatively high sampling clock rate 518 (e.g. 100 MHz for the illustrative configuration) motivates an analog design.

Figure 23B:
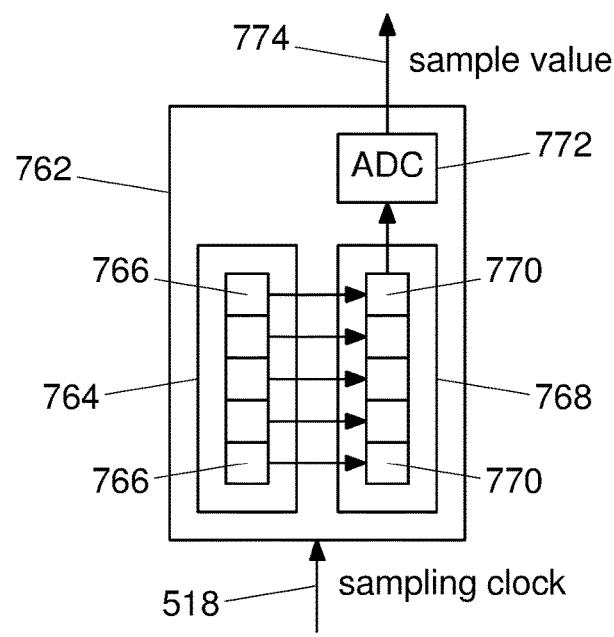
FIG. 23B shows the photodetector array consisting of an analog photodetector array coupled with an analog shift register.

To this end, FIG. 23B shows the photodetector array 762 consisting of an analog photodetector array 764 coupled with an analog shift register 768. Each period of the input sampling clock 518 the shift register 768 is shifted up, and the value from each photodetector 766 is added to the corresponding shift register stage 770. The value shifted into the first (bottom) shift register stage 770 is zero. The value shifted out of the last (top) shift register stage 770 is converted, via an analog-to-digital converter (ADC) 772, to a beam energy digital sample value 774. This in turn is converted to a radiance 134 as previously described. The ADC 772 may be any suitable ADC as previously described.

While the analog photodetector array 764 and the analog shift register 768 may be distinct, in some practical implementations they can be closely integrated. For example, if a bucket brigade device (BBD) [Sangster77, Patel78] is used as the analog shift register 768, then photodiodes 766 can be directly integrated into its storage nodes 770. And if a linear charge-coupled device (CCD) [Tompsett78] is used as the analog photodetector array 764, it can intrinsically also be operated as an analog shift register 768.

The analog photodetector array 764 can also be implemented separately from the analog shift register 768, for example as a standard array of active pixel sensors (APSs) [Fossum04], and the analog shift register can be implemented for example as a standard bucket brigade device (BBD), augmented with a third clock signal to control the transfer of charge from the photodetector array 764.

The effective exposure duration can be further increased by accumulating samples in the slow scan direction. This is achieved by deploying an array of M' linear photodetector arrays 762 to simultaneously capture M' adjacent lines of samples. During capture, M' sample values 774 are then produced every period of the sampling clock 518, rather than just one, and each such sample 774 is added (once converted to a radiance) to its corresponding radiance 134 in the input view image 602. The total radiance 134 is scaled to the longer exposure duration by dividing it by M'.

For the illustrative display configuration, setting M=M'=100 (i.e. each 1/10 of the angular field 124) yields an exposure duration of 100 us.

In addition to increasing the effective exposure duration, the linear photodetector array 742 can be used to capture sharper samples by incorporating a multiple K of narrower photodetectors 746 (and shift register stages 770) per angular sampling period 126, and clocking the entire device the multiple K of the sampling clock 518. An additional analog storage node, inserted between the last shift register stage 770 and the ADC 772, is then used to accumulate K successive analog samples, with the combined value being digitized and read out according to the sampling clock 518.

Just as the radiance sensor 604 (and hence the photodetector 720) may be configured for ToF range-finding, so may the photodetector array 762. For example, if ToF range-finding is based on phase measurement [Kolb09, Oggier11], then the photodetector array 762 may be configured to accumulate phase samples in parallel.

Arrays of Two-Way Light Field Display Elements

Figure 24:
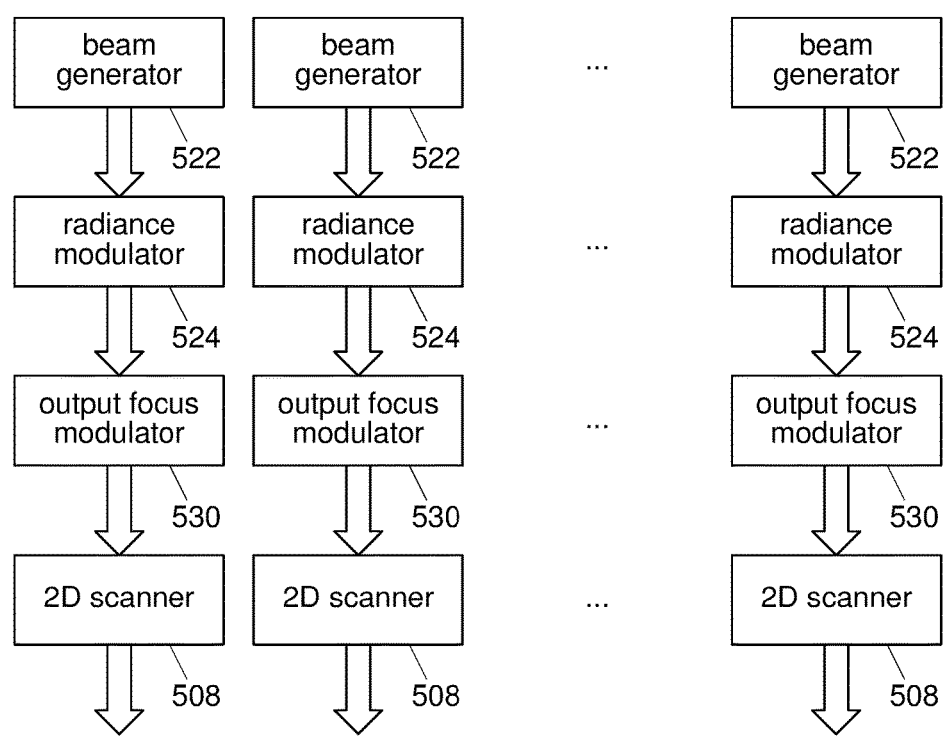
FIG. 24 shows a block diagram of a multi-element light field display.

FIG. 24 shows a simplified block diagram of an array of two-way light field display elements 310 operating in display mode. The 2D scanner 508 represents both the 1D line scanner 504 and the 1D frame scanner 506.

Figure 25A:
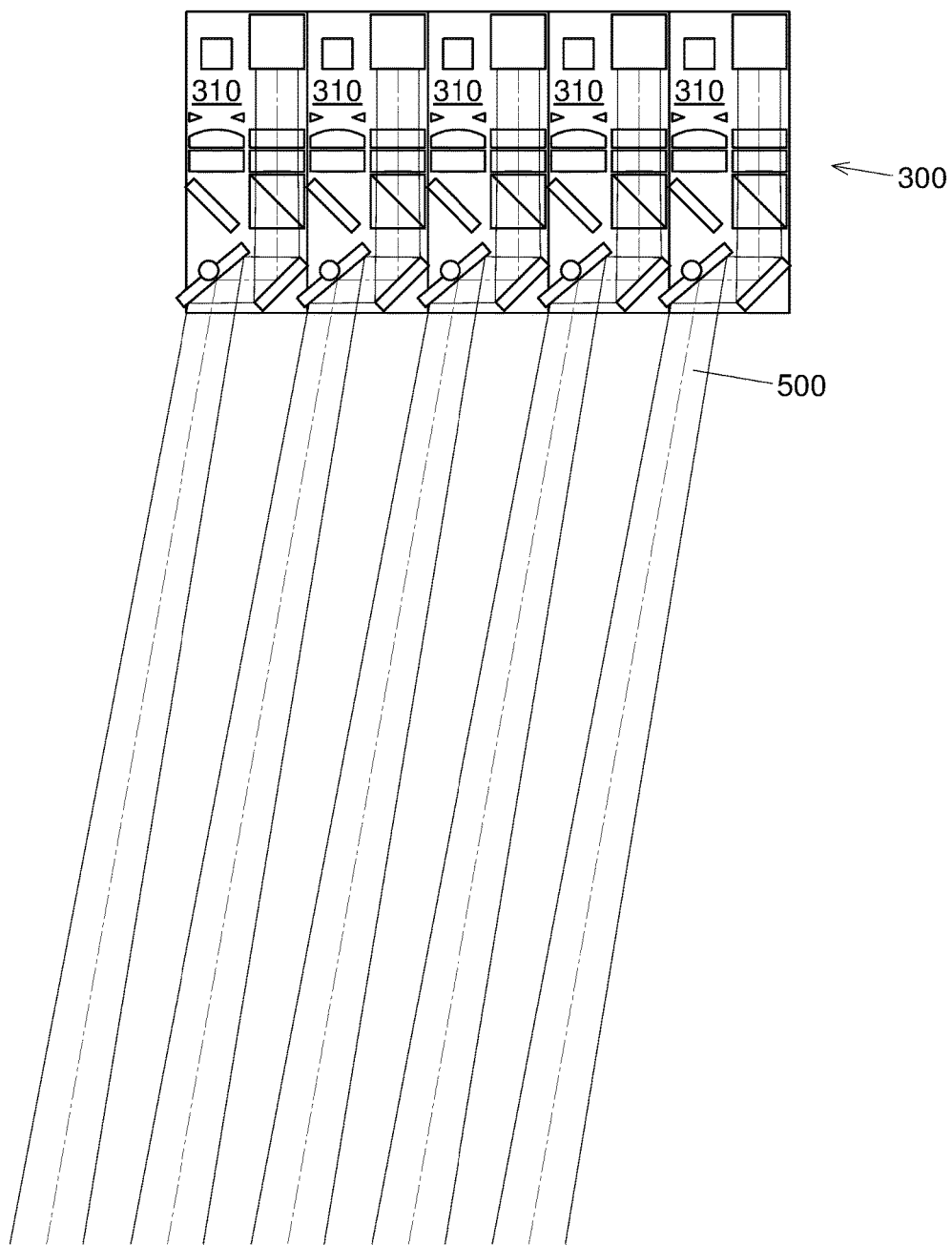
FIG. 25A shows a plan view of an optical design for a two-way light field display, 5 elements wide, with output rays.

FIG. 25A shows a plan view of the optical design of one row of a two-way light field display 300, operating in display mode. The display consists of an array of two-way light field display elements 310, each generating an output beam 500. The array is shown at a single instant in time, with each beam pointing in the same direction. Each beam has the same, slightly divergent, focus.

Figure 25B:
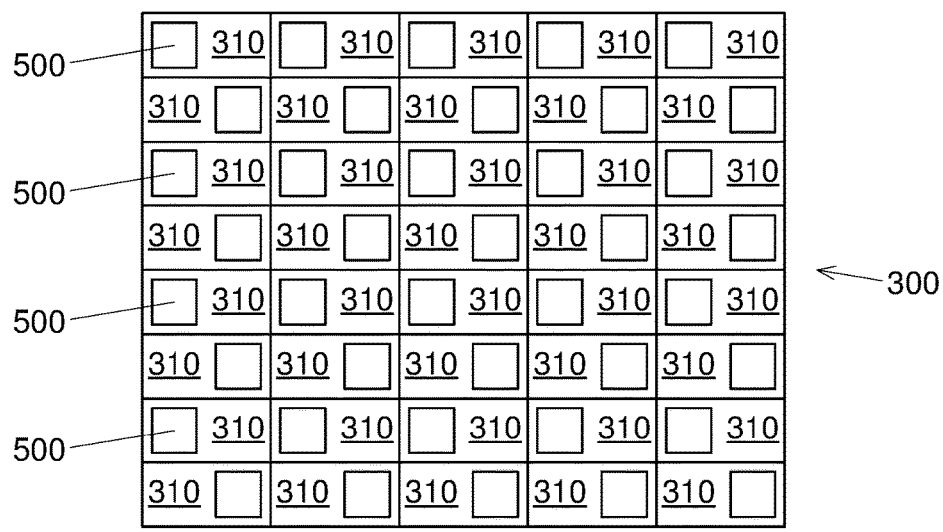
FIG. 25B shows a front elevation of the optical design for the two-way light field display, consisting of 10 rows of 5 elements, with output beams.

FIG. 25B shows a corresponding front elevation of the display 300. Successive display elements 310 are rotated 180 degrees to improve the uniformity of the output.

Figure 25C:
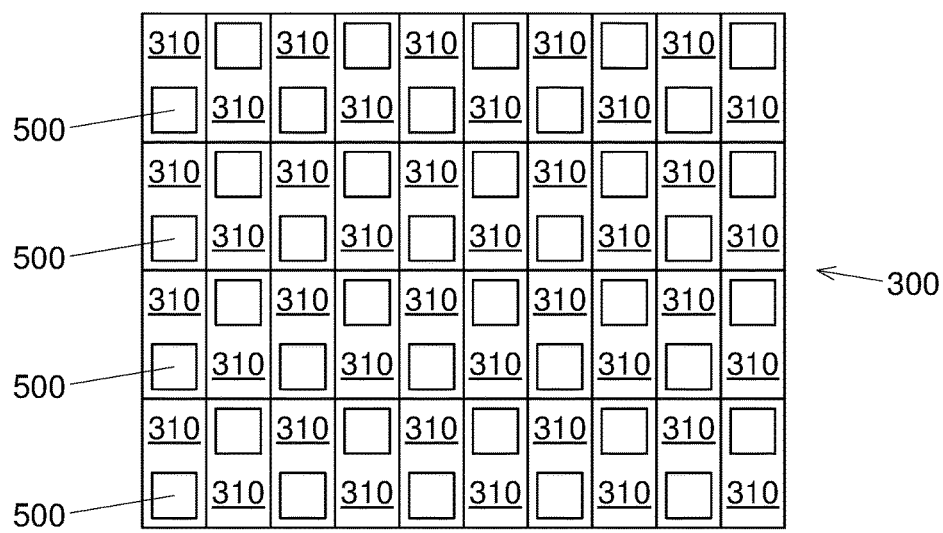
FIG. 25C shows a front elevation of the optical design for the two-way light field display, consisting of 5 rows of 10 rotated elements, with output beams.

FIG. 25C shows the front elevation rotated 90 degrees.

For clarity, FIGS. 25A, 25B and 25C only show a small number of two-way display elements 310. In practice a two-way light field display 300 can contain any number of elements 310, e.g. numbering in the thousands or millions. For the illustrative configuration it contains 125,000 display elements.

Figure 26:
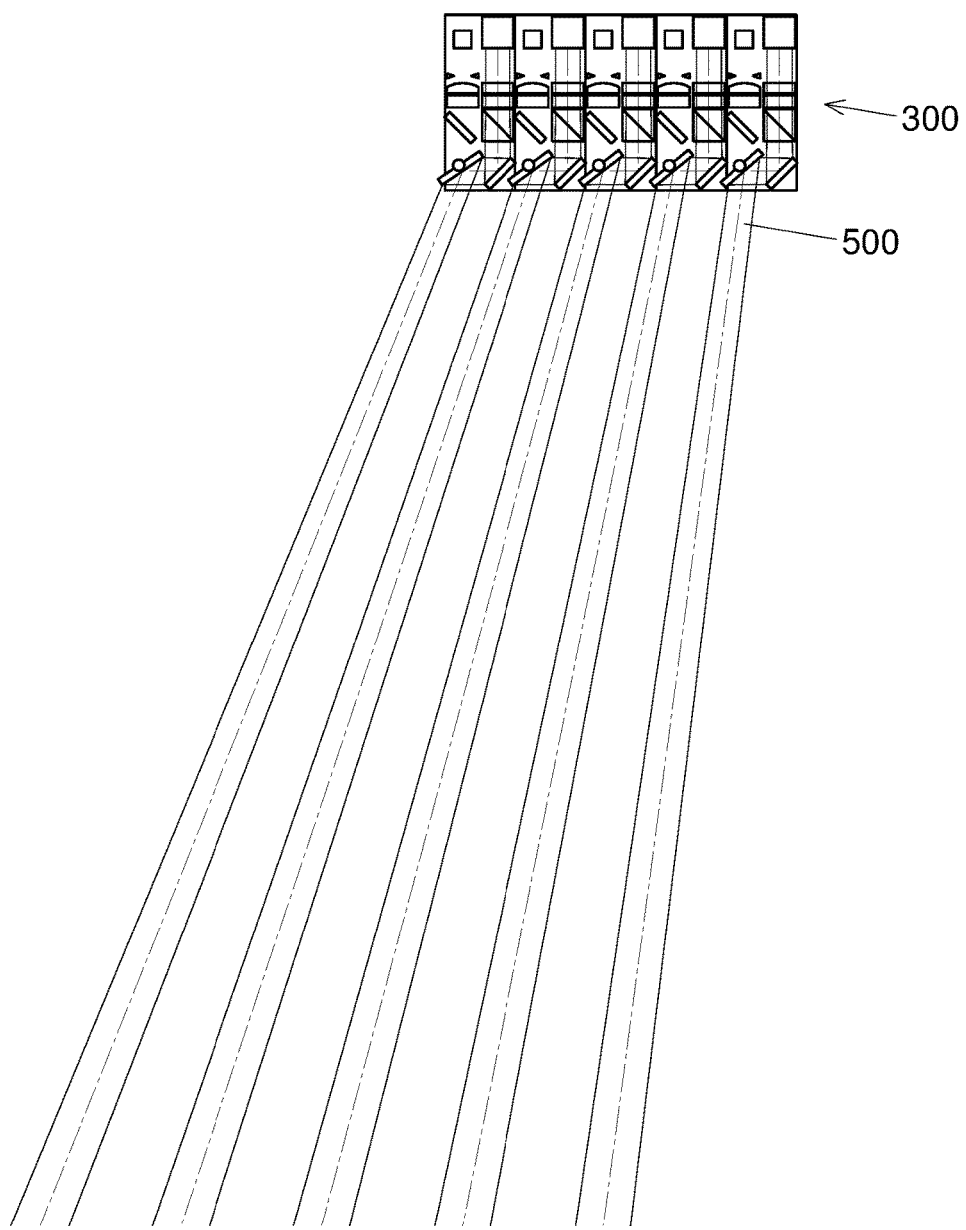
FIG. 26 shows a plan view of one row of the two-way light field display, rotated as shown in FIG. 25B, with each element generating a beam corresponding to a single point source behind the display.

FIG. 26 shows a plan view of one row of the display 300, rotated as shown in FIG. 25B, with each element 310 generating a beam 500 corresponding to a single point source behind the display, hence at different times during their scan cycles. The gaps in the output are due to the double width of the display element 310 relative to the spatial sampling period 120.

Figure 27:
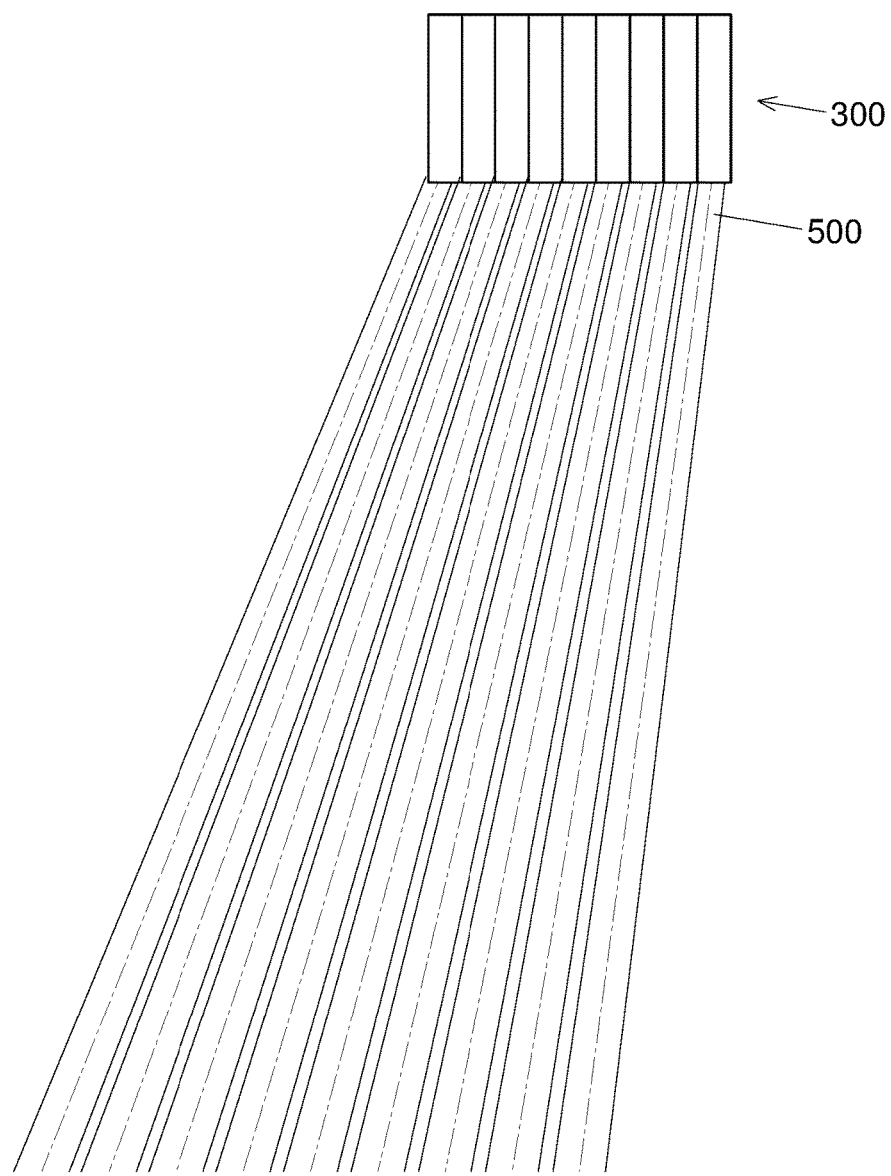
FIG. 27 shows a plan view of one row of the two-way light field display, rotated as shown in FIG. 25C, with each element generating a beam corresponding to a single point source behind the display.

FIG. 27 shows a plan view of one row of the display 300, rotated as shown in FIG. 25C, with each element 310 generating a beam 500 corresponding to a single point source behind the display, hence at different times during their scan cycles. The gaps in the output shown in FIG. 26 are now essentially eliminated because the display elements 310 are rotated so that their width matches the spatial sampling period 120.

Figure 28:
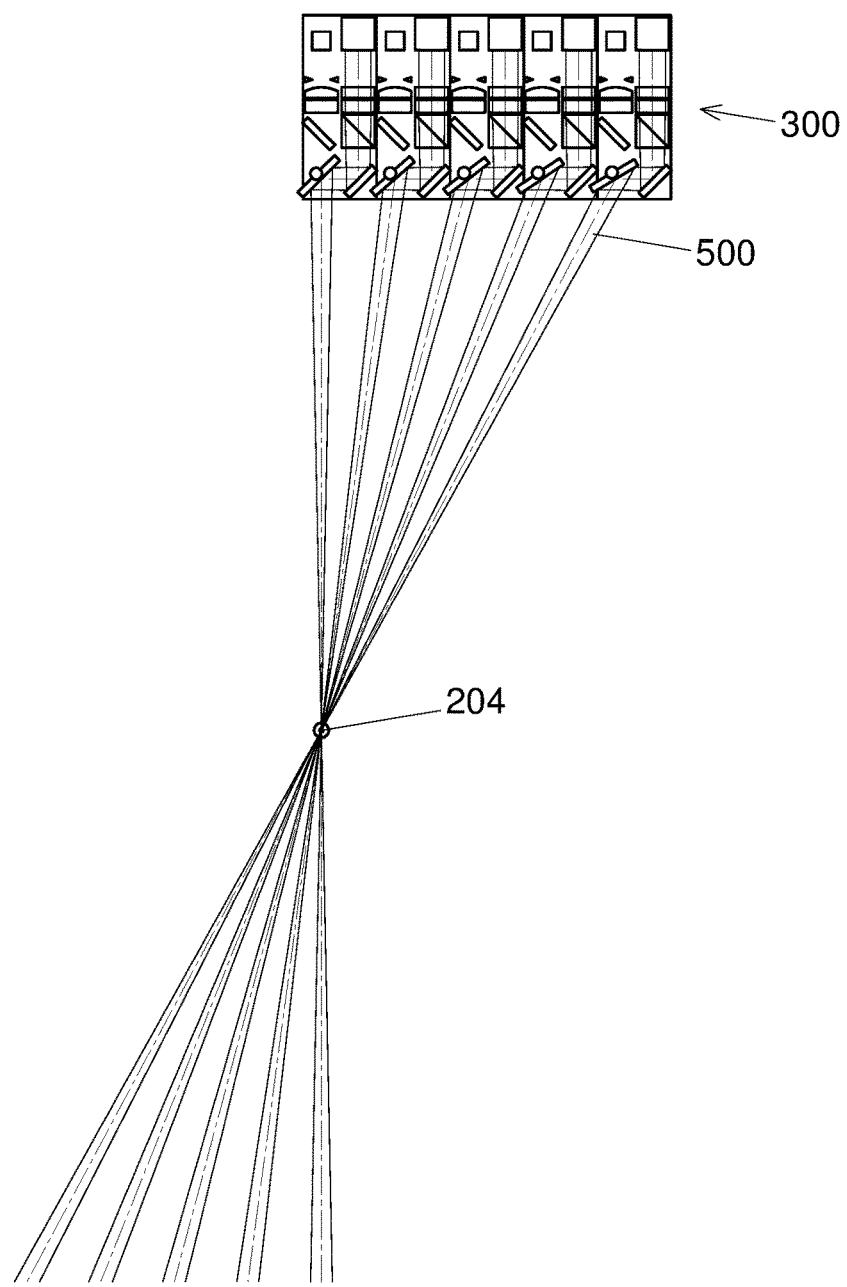
FIG. 28 shows a plan view of one row of the two-way light field display, rotated as shown in FIG. 25B, with each element generating a beam corresponding to a single point source in front of the display.

FIG. 28 shows a plan view of one row of the display 300, rotated as shown in FIG. 25B, with each element 310 generating a beam 500 corresponding to a single point source 204 in front of the display, hence at different times during their scan cycles. The gaps in the output are again due to the double width of the display element 310 relative to the spatial sampling period 120.

Figure 29:
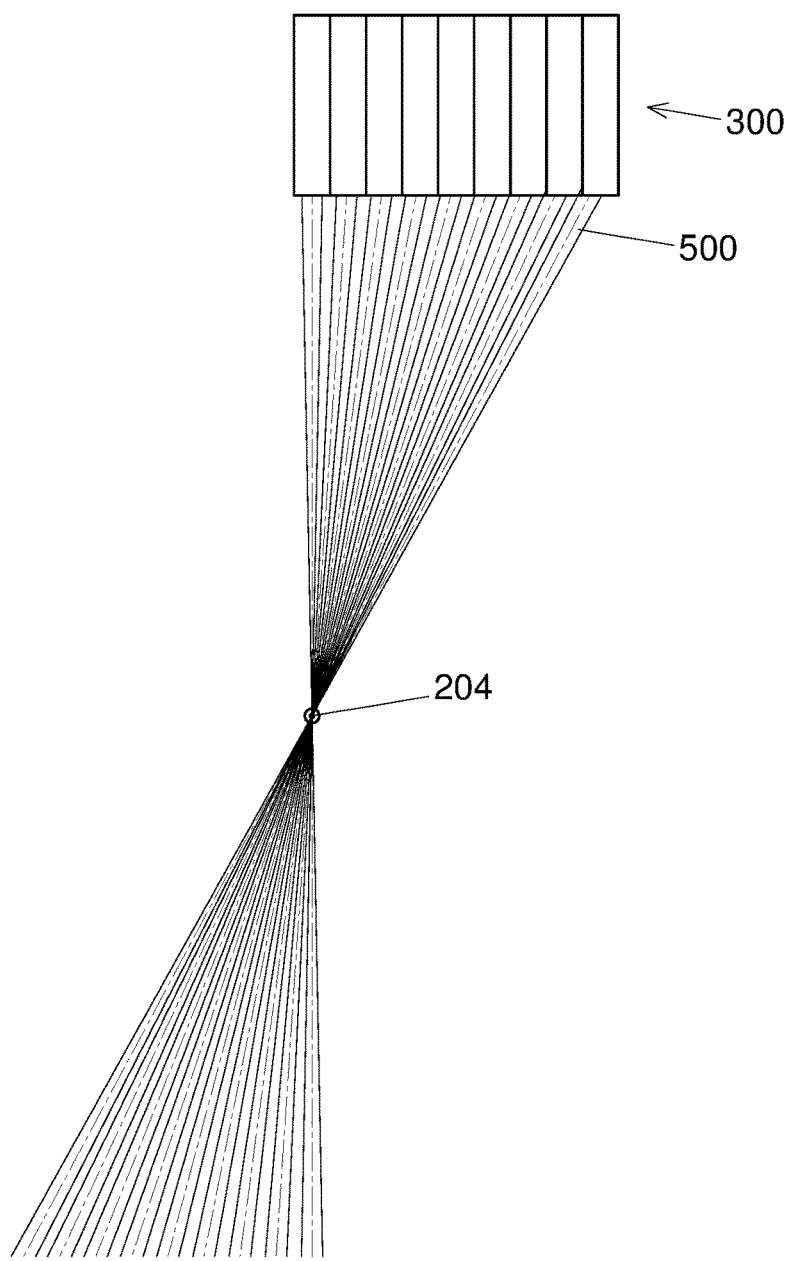
FIG. 29 shows a plan view of one row of the two-way light field display, rotated as shown in FIG. 25C, with each element generating a beam corresponding to a single point source in front of the display.

FIG. 29 shows a plan view of one row of the display 300, rotated as shown in FIG. 25C, with each element 310 generating a beam 500 corresponding to a single point source 204 in front of the display, hence at different times during their scan cycles. The gaps in the output shown in FIG. 28 are now essentially eliminated because the display elements 310 are rotated so that their width matches the spatial sampling period 120.

Figure 30:
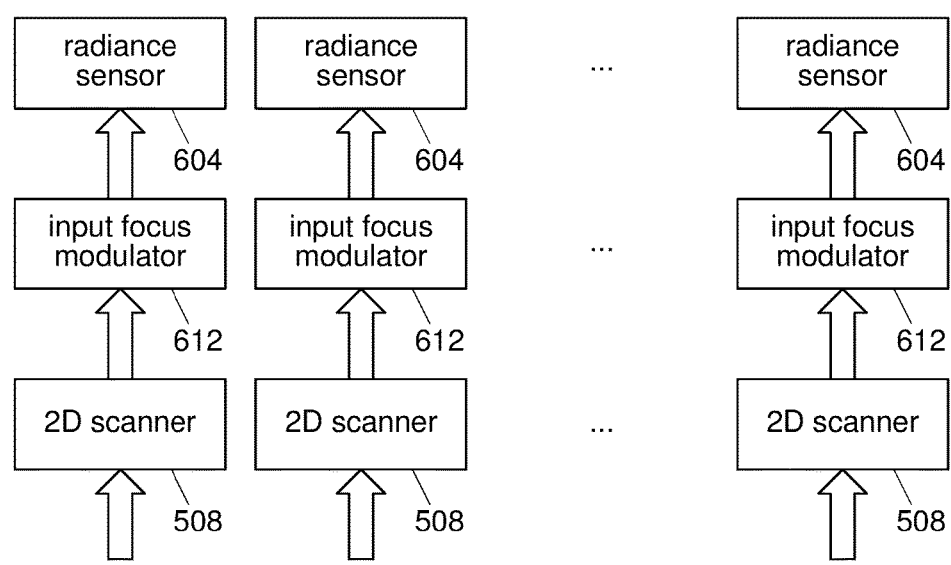
FIG. 30 shows a block diagram of a multi-element light field camera.

FIG. 30 shows a simplified block diagram of an array of two-way light field display elements 310 operating in camera mode.

Figure 31A:
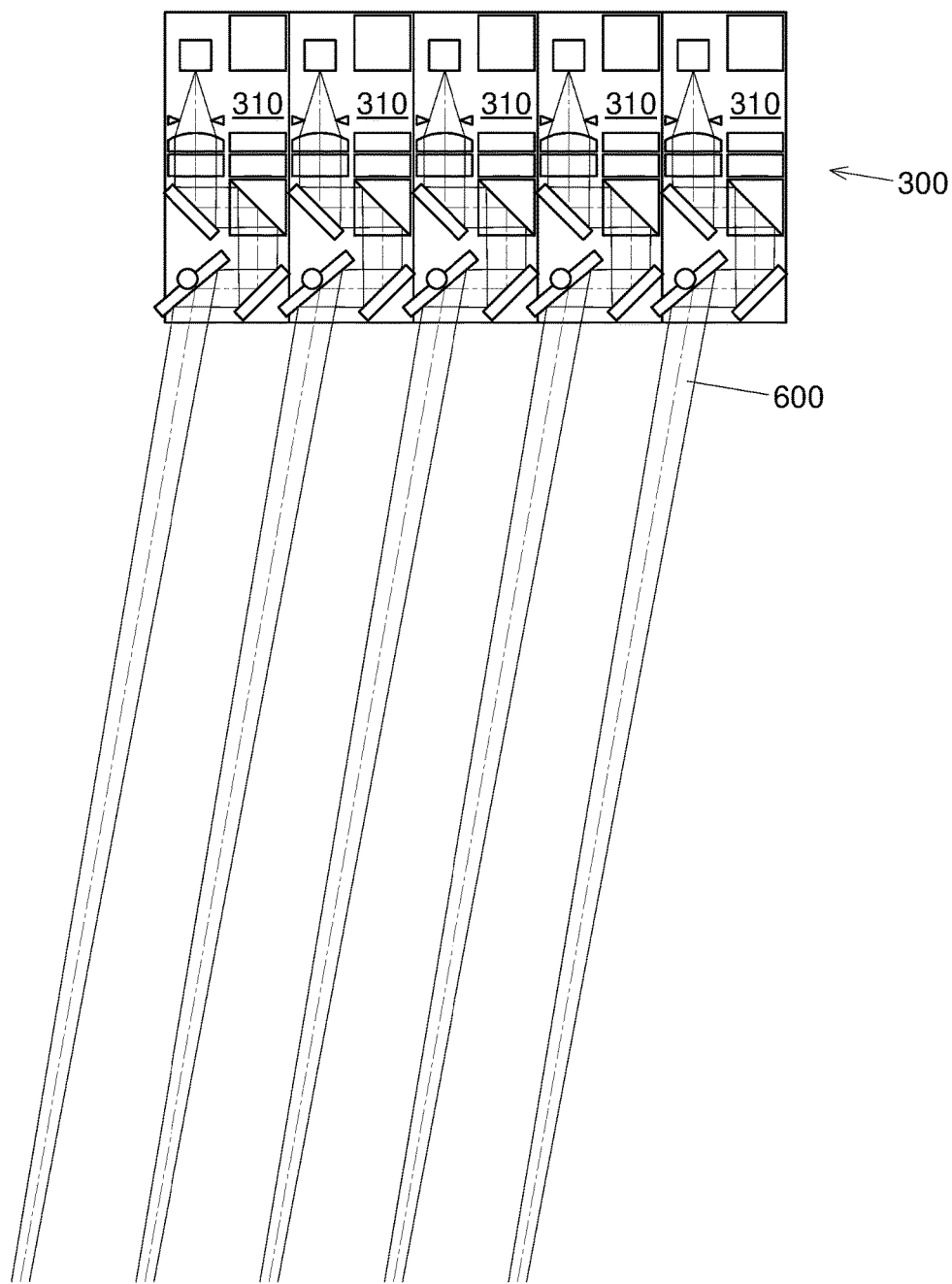
FIG. 31A shows a plan view of the optical design for a two-way light field display, 5 elements wide, with input beams.

FIG. 31A shows a plan view of the optical design of one row of a two-way light field display 300, operating in camera mode. The display consists of an array of two-way light field display elements 310, each capturing an input beam 600. The array is shown at a single instant in time, with each beam pointing in the same direction. Each beam has the same, slightly convergent, focus.

Figure 31B:
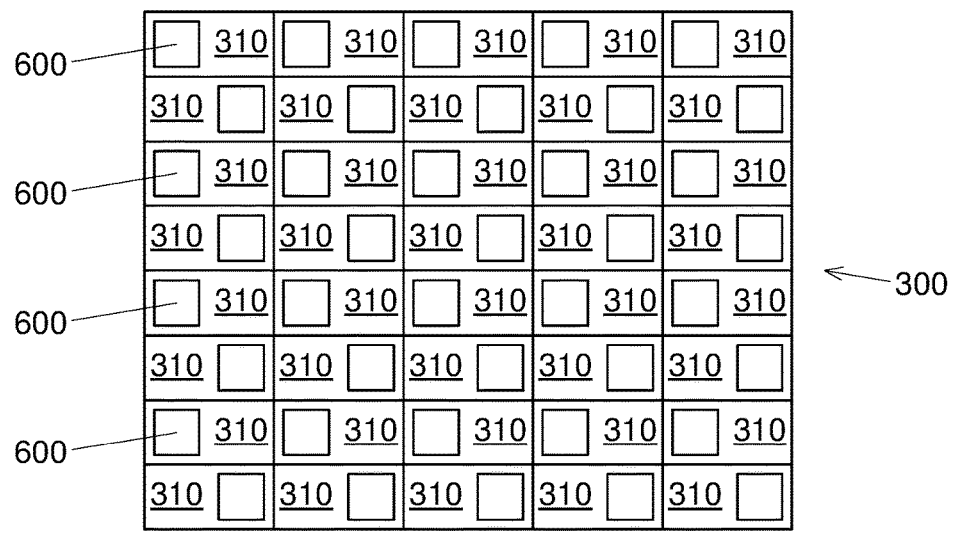
FIG. 31B shows a front elevation of the optical design for the two-way light field display, consisting of 10 rows of 5 elements, with input beams.

FIG. 31B shows a corresponding front elevation of the display 300. Successive display elements 310 are rotated 180 degrees to improve the uniformity of the input.

Figure 31C:
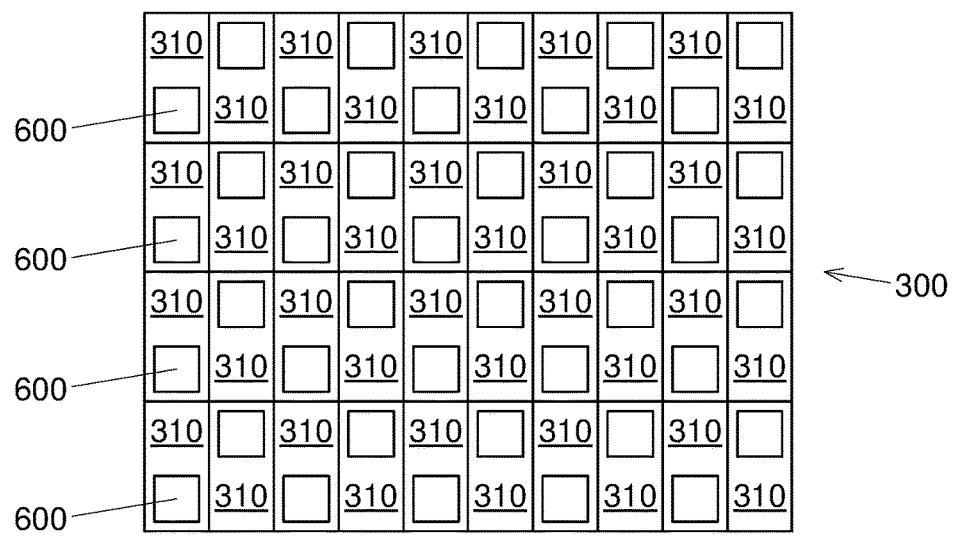
FIG. 31C shows a front elevation of the optical design for the two-way light field display, consisting of 5 rows of 10 rotated elements, with input beams.

FIG. 31C shows the front elevation rotated 90 degrees.

Figure 32:
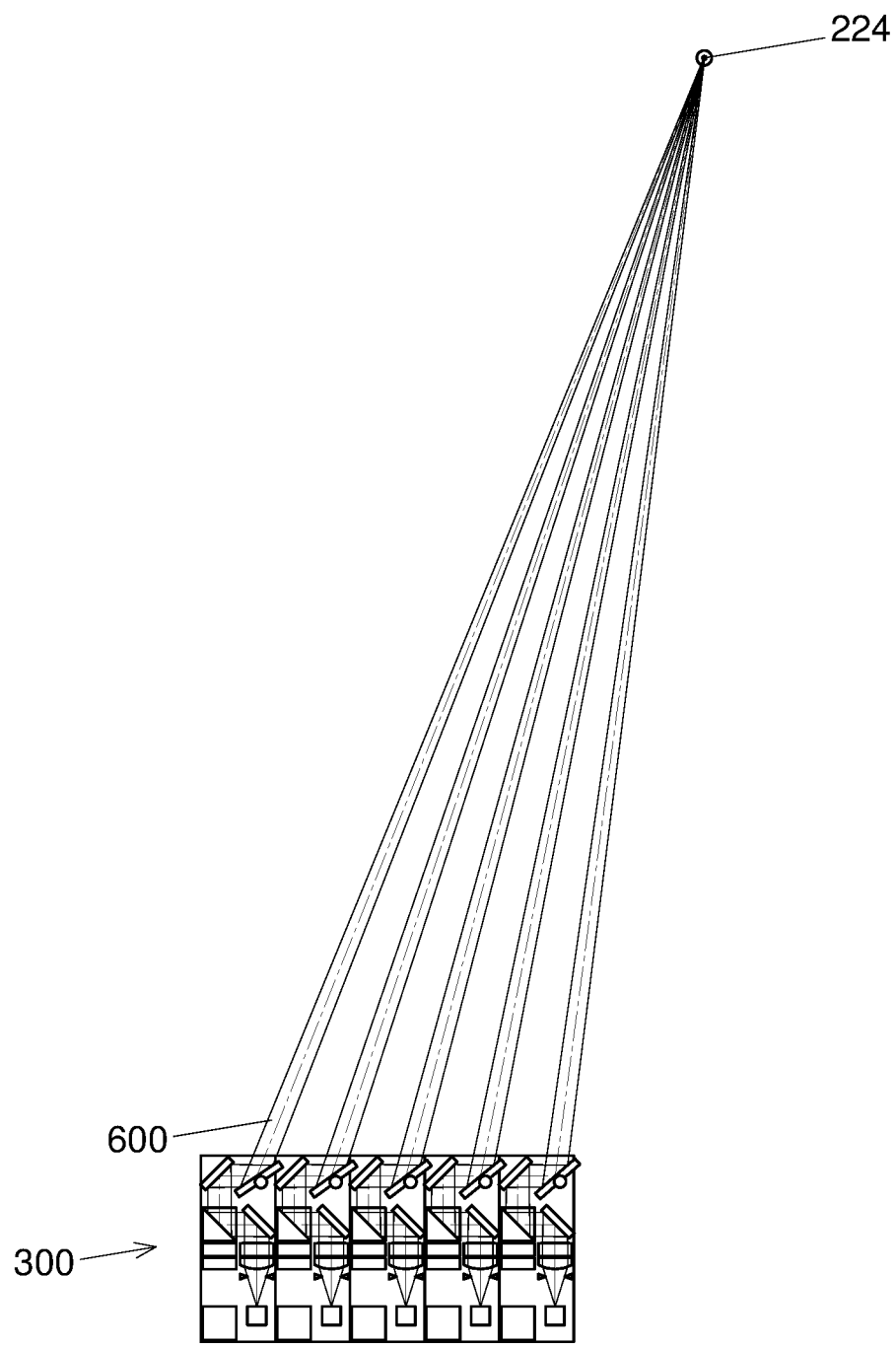
FIG. 32 shows a plan view of one row of the two-way light field display, rotated as shown in FIG. 31B, with each element capturing a beam corresponding to a single point source in front of the display.

FIG. 32 shows a plan view of one row of the display 300, rotated as shown in FIG. 31B, with each element 310 capturing a beam 600 corresponding to a single point source 224 in front of the display, hence at different times during their scan cycles. The gaps in the input are due to the double width of the display element 310 relative to the spatial sampling period 120.

Figure 33:
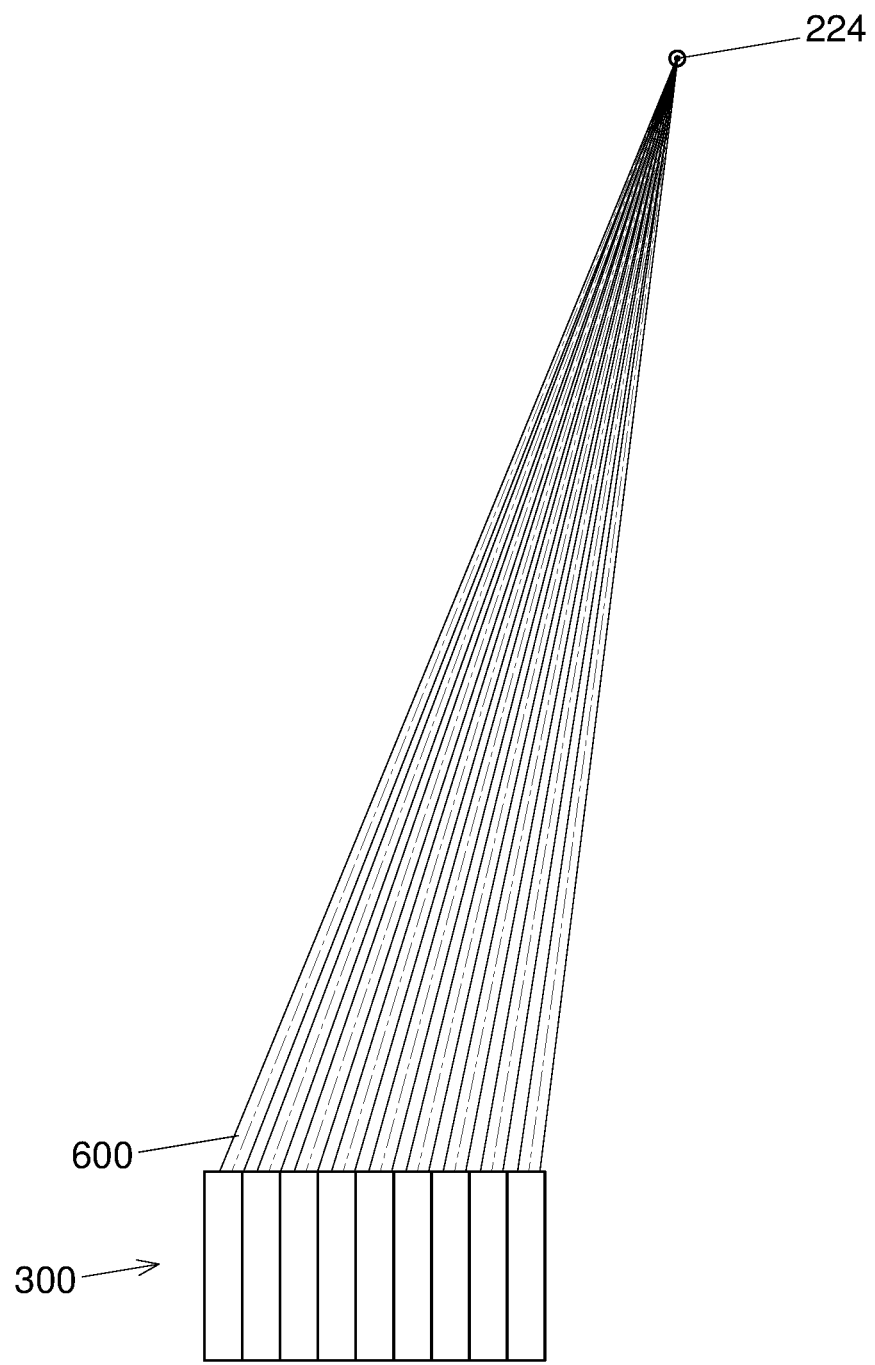
FIG. 33 shows a plan view of one row of the two-way light field display, rotated as shown in FIG. 31C, with each element capturing a beam corresponding to a single point source in front of the display.

FIG. 33 shows an plan view of one row of the display 300, rotated as shown in FIG. 31C, with each element 310 capturing a beam 600 corresponding to a single point source 224 in front of the display, hence at different times during their scan cycles. The gaps in the input shown in FIG. 32 are now essentially eliminated because the display elements 310 are rotated so that their width matches the spatial sampling period 120.

Oscillating Display

As described in relation to FIG. 26, FIG. 28 and FIG. 32, the gaps in the output and input are due to the double width of the display element 310 relative to the spatial sampling period 120. This can be ameliorated by oscillating the array of two-way display elements 310 between two positions that are a distance of one spatial sampling period 120 apart, and displaying and/or capturing half of a light field frame 116 at each position.

More generally, beyond displaying (or capturing) one half frame in one of two positions, it is possible to display (or capture) 1/N frame in one of N positions, in either one spatial dimension or both spatial dimensions.

The angular field 124 of the display element 310 is, in general, constrained by the ratio of the beam width to the element width. Reducing the beam width relative to the element width allows for a greater angular field 124, but requires a higher value of N.

Figure 34A:
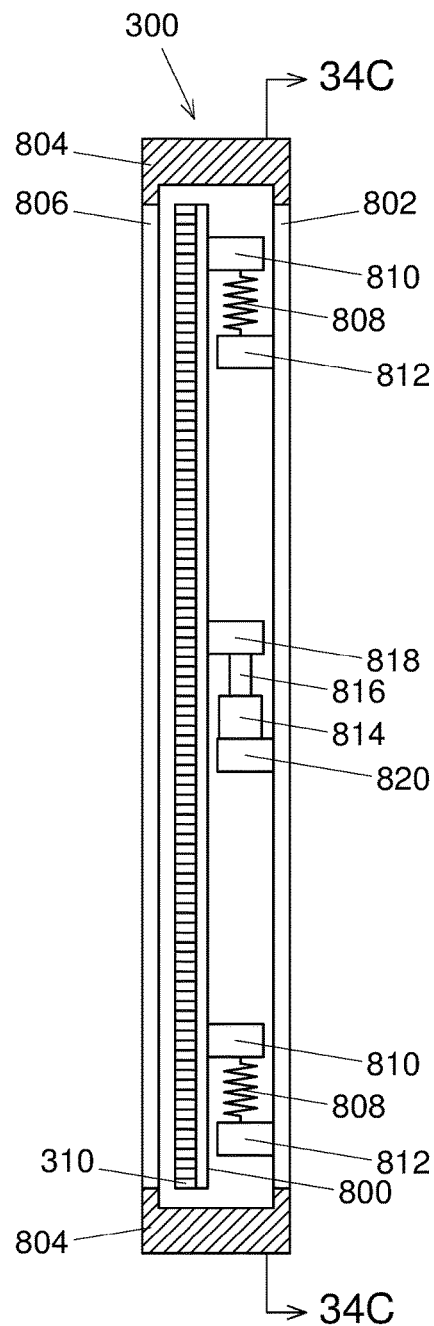
FIG. 34A shows a cross-sectional side elevation of an oscillating two-way light field display.

FIG. 34A shows a cross-sectional side elevation of a two-way light field display 300, adapted to oscillate the array of two-way display elements 310 vertically.

The display 300 consists of a display panel 800, movably attached to a chassis 802. The display panel 800 incorporates the array of two-way display elements 310. A frame 804 is attached to the chassis 802, surrounding the panel 800 and holding a transparent cover glass 806 that protects the panel 800.

The display panel 800 is movably attached to the chassis 802 via a set springs 808, each attached to a bracket 810 on the back of the panel 800 and a matching bracket 812 on the chassis 802.

The display panel 800 is moved vertically via an actuator 814 driving a rod 816. The rod is attached to a bracket 818 on the back of the panel 800 and the actuator is attached to a matching bracket 820 on the chassis 802.

The actuator 814 may be any actuator suitable for displacing the weight of the panel 800 by the desired amount (e.g. 2 mm) at the desired rate (e.g. 100 Hz). For example, it may consist of current-carrying coils acting on magnets embedded in the rod 816 [Petersen82, Hirabayashi95].

Figure 34B:
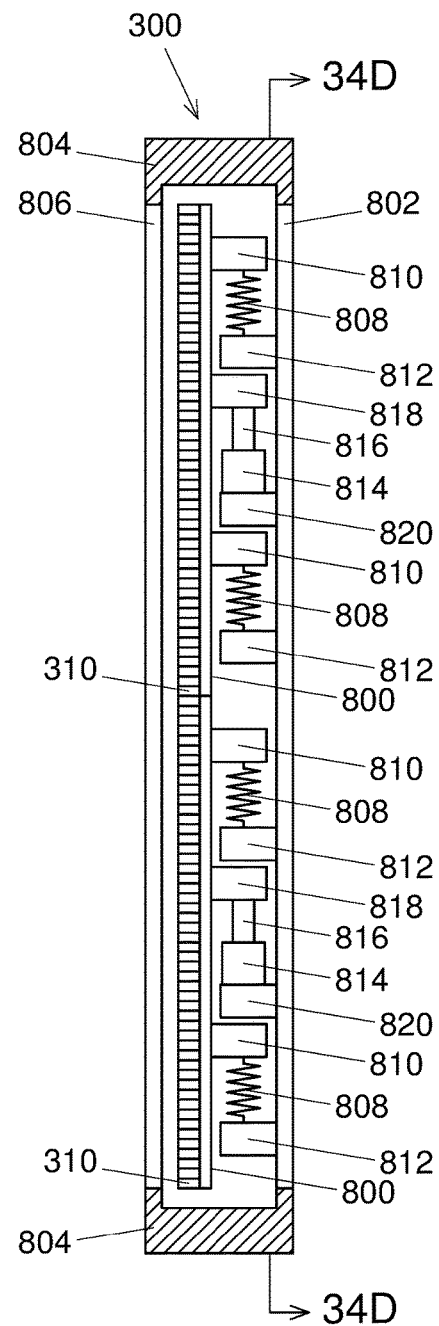
FIG. 34B shows a cross-sectional side elevation of the oscillating two-way light field display, two display panels high.

FIG. 34B shows the same cross-sectional side elevation of a two-way light field display 300, but incorporating two contiguous display panels 800 in the vertical dimension rather than just one.

Figure 34C:
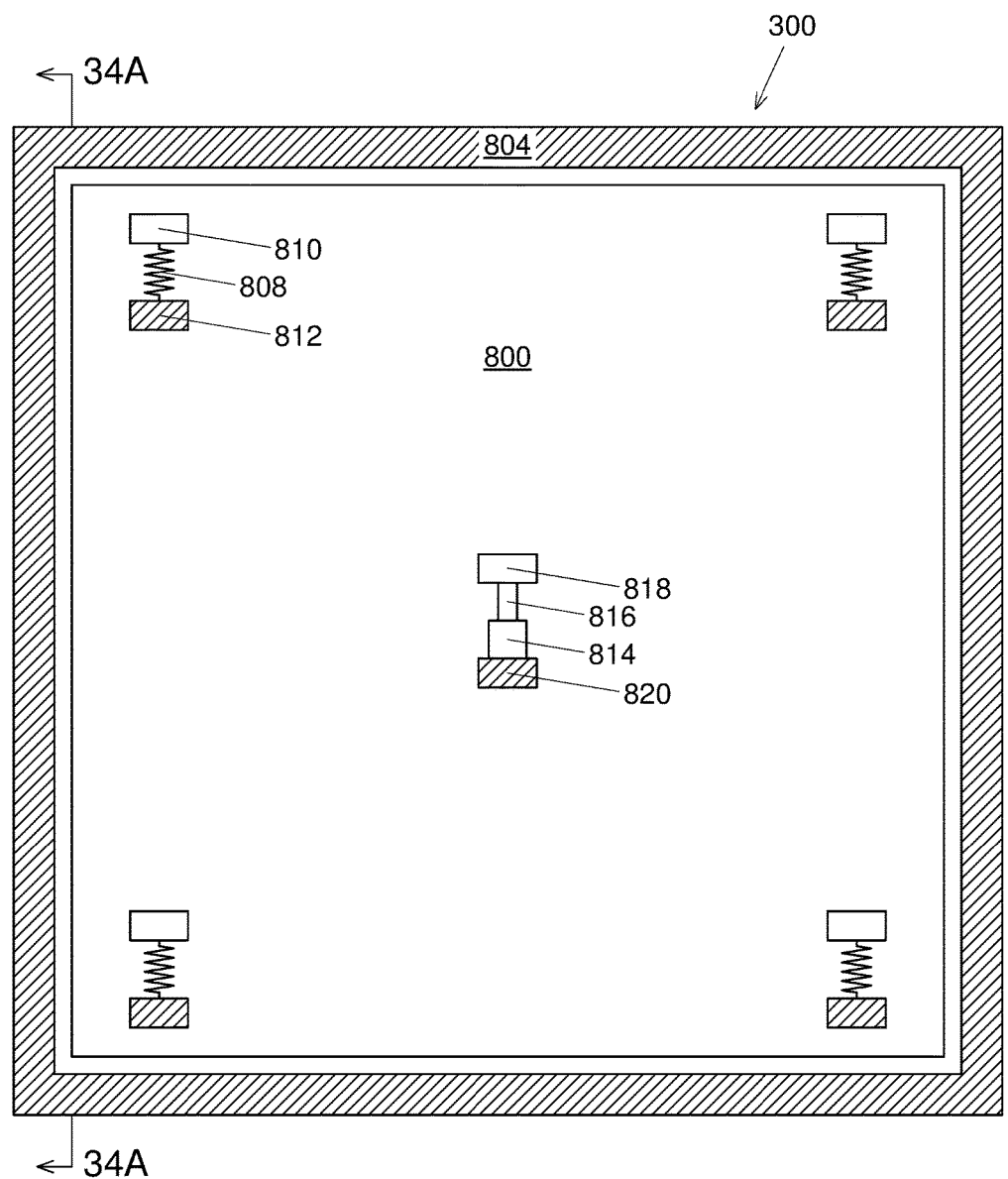
FIG. 34C shows a cross-sectional back elevation of the oscillating two-way light field display.
Figure 34D:
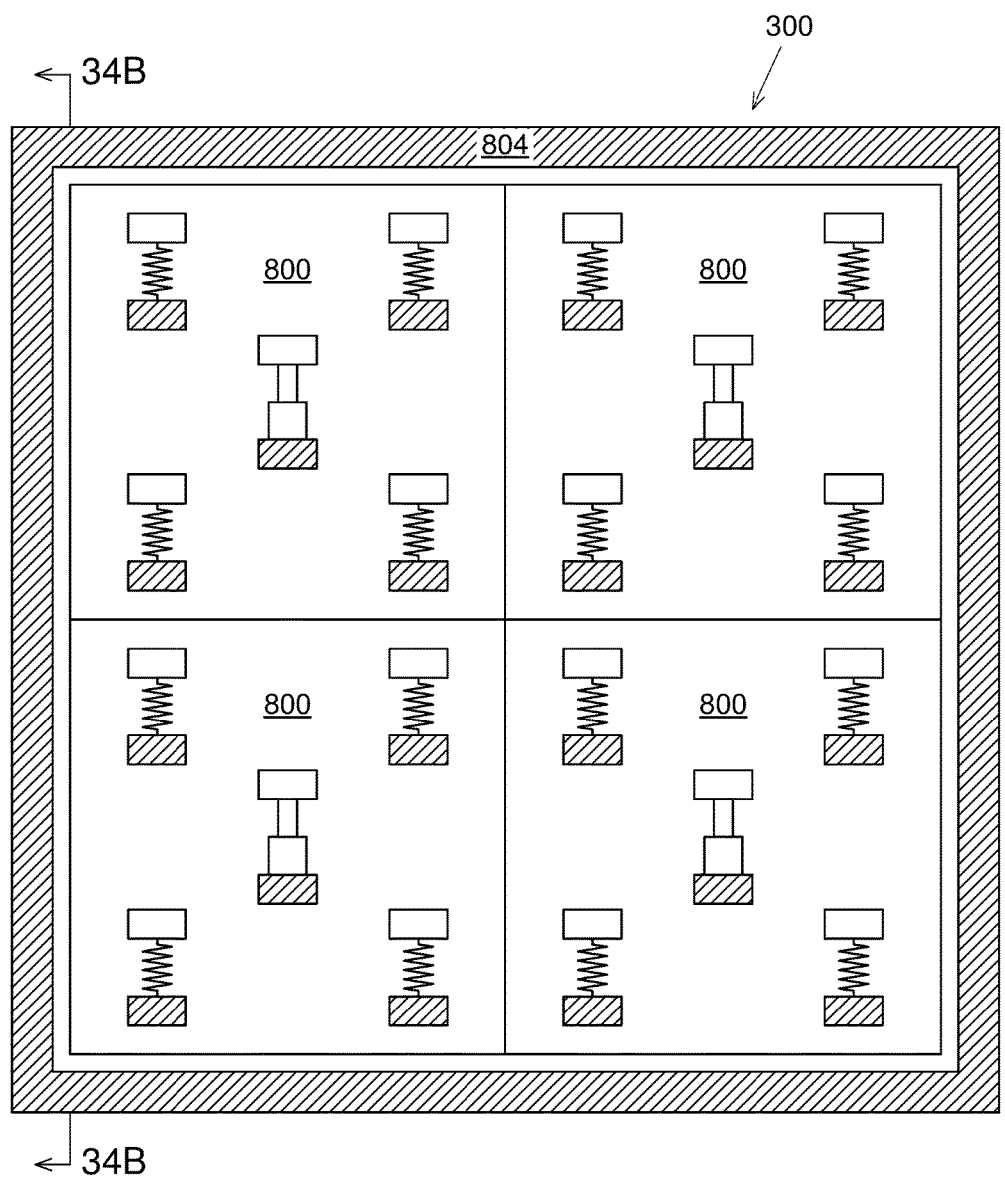
FIG. 34D shows a cross-sectional back elevation of the oscillating two-way light field display, two display panels high and wide.

FIG. 34C and FIG. 34D show the cross-sectional back elevations corresponding to FIG. 34A and FIG. 34B respectively. FIG. 34D shows the display 300 incorporating four contiguous display panels 800, two in each dimension. This illustrates how a larger display 300 can be constructed, in a modular fashion, from multiple smaller panels 800.

The oscillating display 300 is designed to oscillate its panel(s) 800, within one frame period (i.e. one temporal sampling period 114), between two vertical positions that are a distance of one spatial sampling period 120 apart.

Figure 35A:
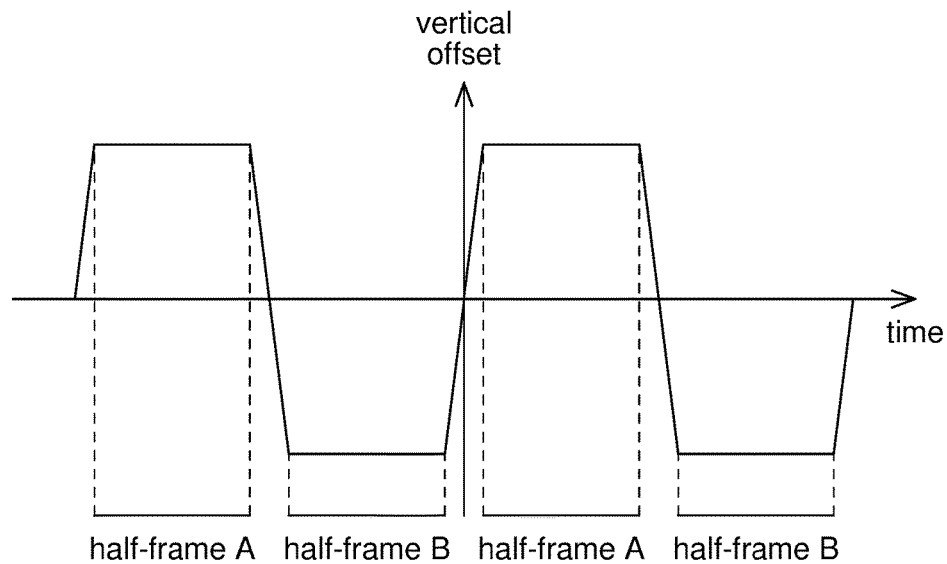
FIG. 35A shows a graph of vertical offset versus time for the oscillating display when directly driven.

In one mode of operation the actuator 814 is used to directly determine the vertical offset of the panel 800. The panel 800 is then moved as quickly as possible from one extreme vertical offset to the other, and the next half-frame is displayed (or captured) as soon as the panel 800 is in position. The display duty cycle is then a function of the speed of the actuator. The faster the actuator the higher the duty cycle. This mode is illustrated by the graph of vertical offset versus time in FIG. 35A.

In an alternative mode of operation the spring constants of the springs 808 are chosen so that they and the panel 800 form a harmonic oscillator with the desired frequency. The actuator 814 is then used to drive the oscillator with the desired amplitude. This requires a less powerful actuator than direct driving, and consumes less power during operation.

Figure 35B:
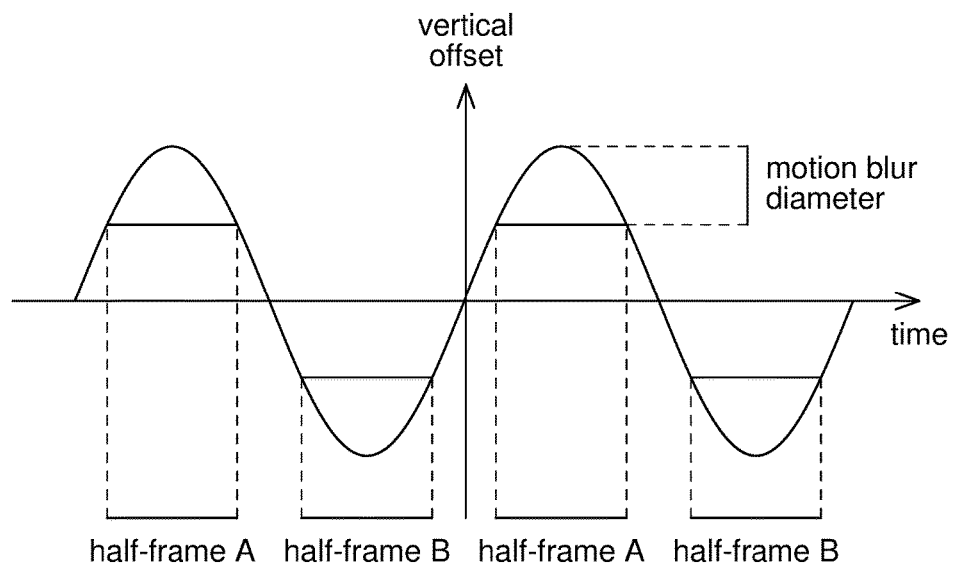
FIG. 35B shows a graph of vertical offset versus time for the oscillating display when resonantly driven.

The disadvantage of harmonic oscillation is that the display 800 follows the sinusoidal path shown in FIG. 35B and is therefore only momentarily stationary at the extreme vertical offsets. A compromise then needs to be made between duty cycle and vertical motion blur. The lower the duty cycle the lower the blur, although, beneficially, the blur decreases more rapidly than the duty cycle due to the sinusoid. By way of example, FIG. 35B shows a duty cycle of 67%, corresponding to vertical motion of 50%, i.e. a motion blur diameter of 25%.

If the oscillation is harmonic and the display element 310 is scanning then the fast scan direction is ideally aligned with the oscillation axis to minimise interaction between the oscillation and the scan.

The frequency of the harmonic oscillator is proportional to the square root of the ratio of the spring constant of the springs 808 to the mass of the panel 800. Since both spring constants and masses are additive, the frequency is independent of the number of panels 800 used to create the display 300.

As an alternative to using oscillation to merge two half-frame light fields produced by a single display, the light fields produced by two displays can be combined via a beam combiner (e.g. a half-silvered glass plate).

Real-Time Capture and Display of a Light Field

In one important use-case, as illustrated in FIG. 11 and FIG. 12 and described above, a light field display 200 receives and displays a light field from a (possibly remote) light field camera 220 in real time.

As discussed above, how capture focus is managed depends in part on the available focus modulation rate.

Figure 36:
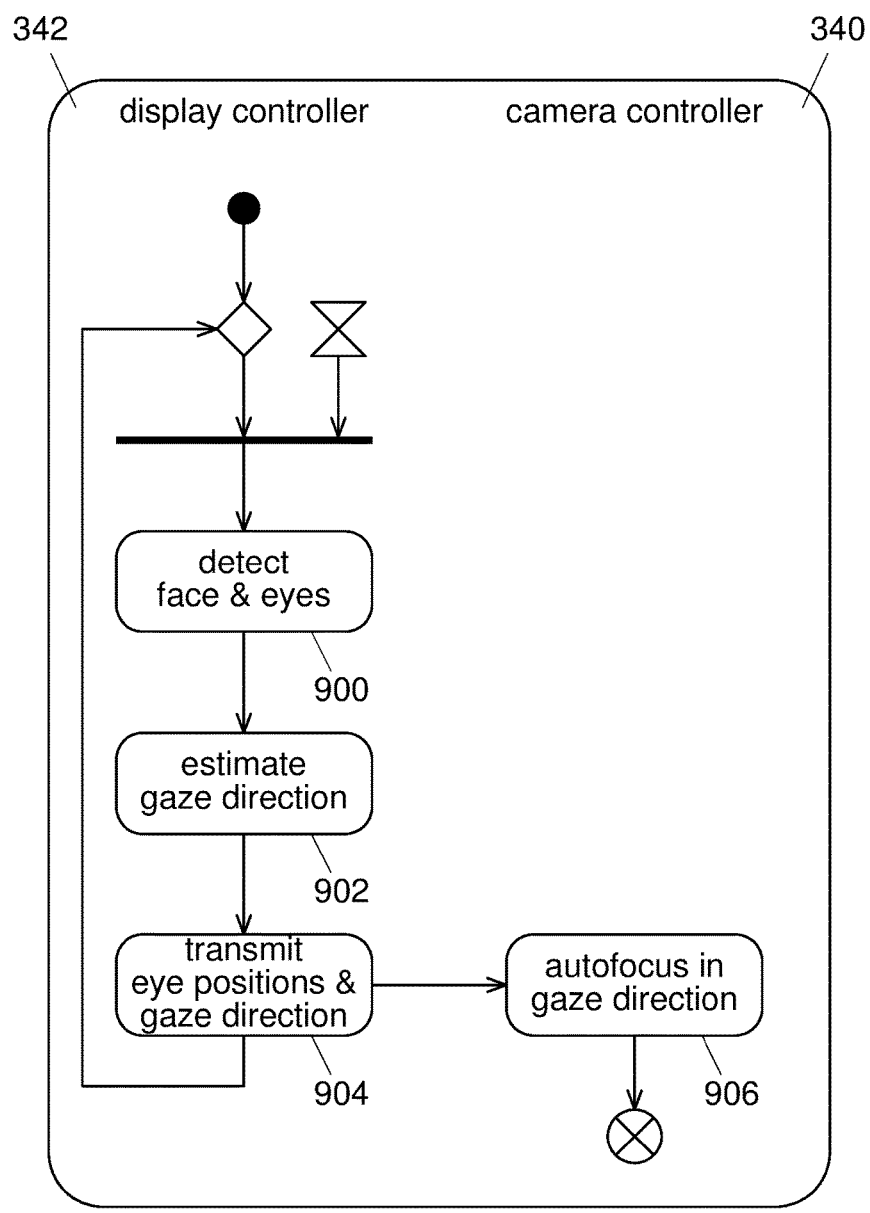
FIG. 36 shows an activity diagram for controlling the focus of a light field camera according to the viewer's gaze.

FIG. 36 shows an activity diagram for the display controller 342 and the camera controller 340 cooperatively controlling focus based on the position of the viewer (and optionally the viewer's gaze direction).

The display controller 342 periodically detects the face and eyes of the viewer (at 900) (or of each of several viewers), optionally also estimates the viewer's gaze direction (at 902), and transmits (at 904) the positions of the eyes (and optionally the gaze direction) to the camera controller 340.

The camera controller 340 receives the eye positions (and optionally the gaze direction), and autofocuses accordingly (at 906). Autofocus may rely on explicitly setting focus based on a depth obtained by range-finding (discussed above), or on a traditional autofocus technique such as phase detection between images from adjacent camera elements 230, adaptively adjusting focus to maximise image sharpness in the desired direction, or a combination of the two.

If the camera controller 340 only receives eye positions then it may infer a pair of possible gaze directions for each camera element 230 based on the positions of the eyes. This implements the position-based viewer-specific focus mode described earlier in relation to FIG. 10B. If the camera controller 340 receives an estimate of the gaze direction then it may use this directly. This implements the gaze-directed viewer-specific focus mode described earlier in relation to FIG. 10C and FIG. 10D.

If the camera supports per-sample autofocus then this is most naturally based on the per-sample depth 136, and neither the eye positions nor the estimated gaze direction are required. If the camera supports per-frame (or per-subframe) focus modulation then autofocus can be based on the estimated or inferred gaze directions.

As previously discussed, if the positions of the eyes are used to infer possible gaze directions for each camera element 230, then a separate display pass (and hence capture pass) is ideally used for each eye.

In general, since autofocus may span multiple frames, when there are multiple capture passes (e.g. corresponding to multiple viewers or eyes), autofocus context must be preserved over several frames for each pass.

Figure 37:
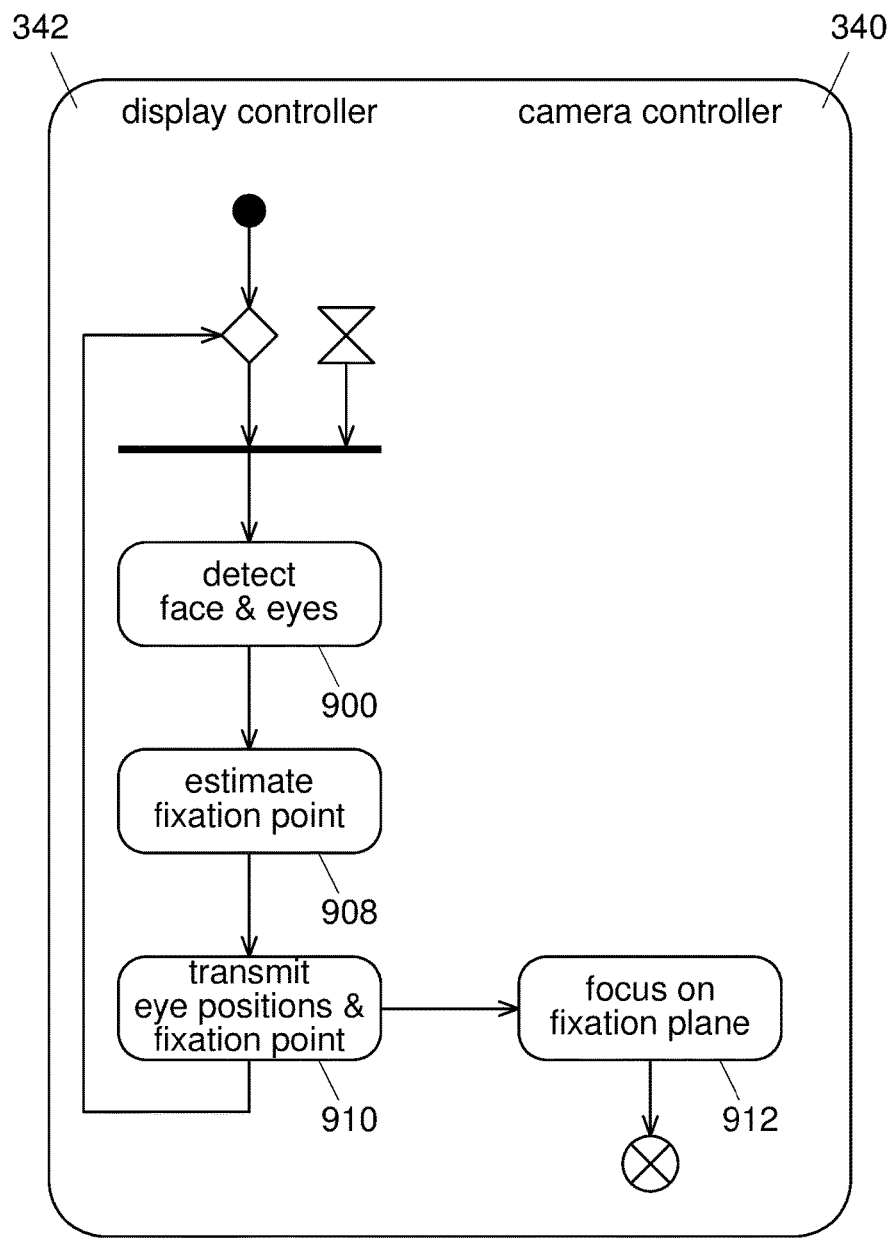
FIG. 37 shows an activity diagram for controlling the focus of a light field camera according to the viewer's fixation point.

FIG. 37 shows an activity diagram for the display controller 342 and the camera controller 340 cooperatively controlling focus based on the fixation point (or fixation depth) of the viewer. This again implements the gaze-directed viewer-specific focus mode described earlier in relation to FIG. 10C and FIG. 10D.

The display controller 342 periodically detects the face and eyes of the viewer (at 900) (or of each of several viewers), estimates the viewer's fixation point (or depth) (at 908), and transmits (at 910) the positions of the eyes and the fixation point (or depth) to the camera controller 340. The display controller 342 may estimate the fixation point (or depth) based on the viewer's gaze direction in conjunction with the sample depth 136 in the incoming light field video 110, or on the vergence of the user's eyes, or on a combination of the two.

Figure 38:
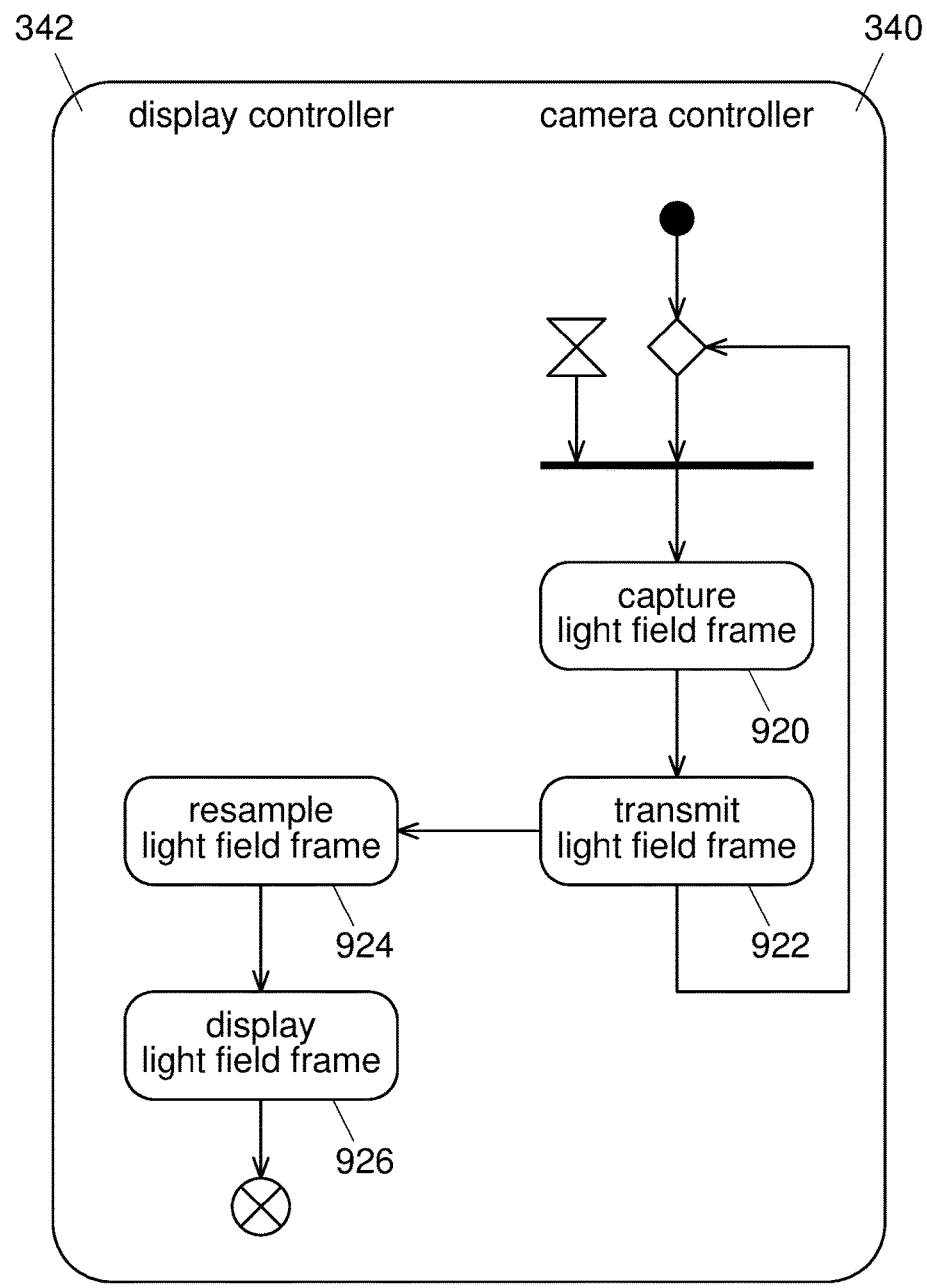
FIG. 38 shows an activity diagram for displaying a light field stream from a light field camera.

FIG. 38 shows an activity diagram for camera controller 340 and display controller 342 cooperatively capturing and displaying a sequence of light field frames 116 in real time.

The camera controller 340 periodically captures a light field frame (at 920) and transmits it (at 922) to the display controller 342. The display controller 342 receives and optionally resamples the light field frame (at 924), and finally displays the light field frame (at 926). Resampling is discussed further below.

The resampling step 924 optionally uses a locally-captured light field frame to virtually illuminate the scene represented by the remotely-captured light field frame. This is straightforward via ray tracing (discussed below) if the remotely-captured light field frame 116 contains depth 136.

Display of a Previously-Captured Light Field Video

In another important use-case, a two-way light field display 300 displays a previously-captured light field video.

Figure 39:
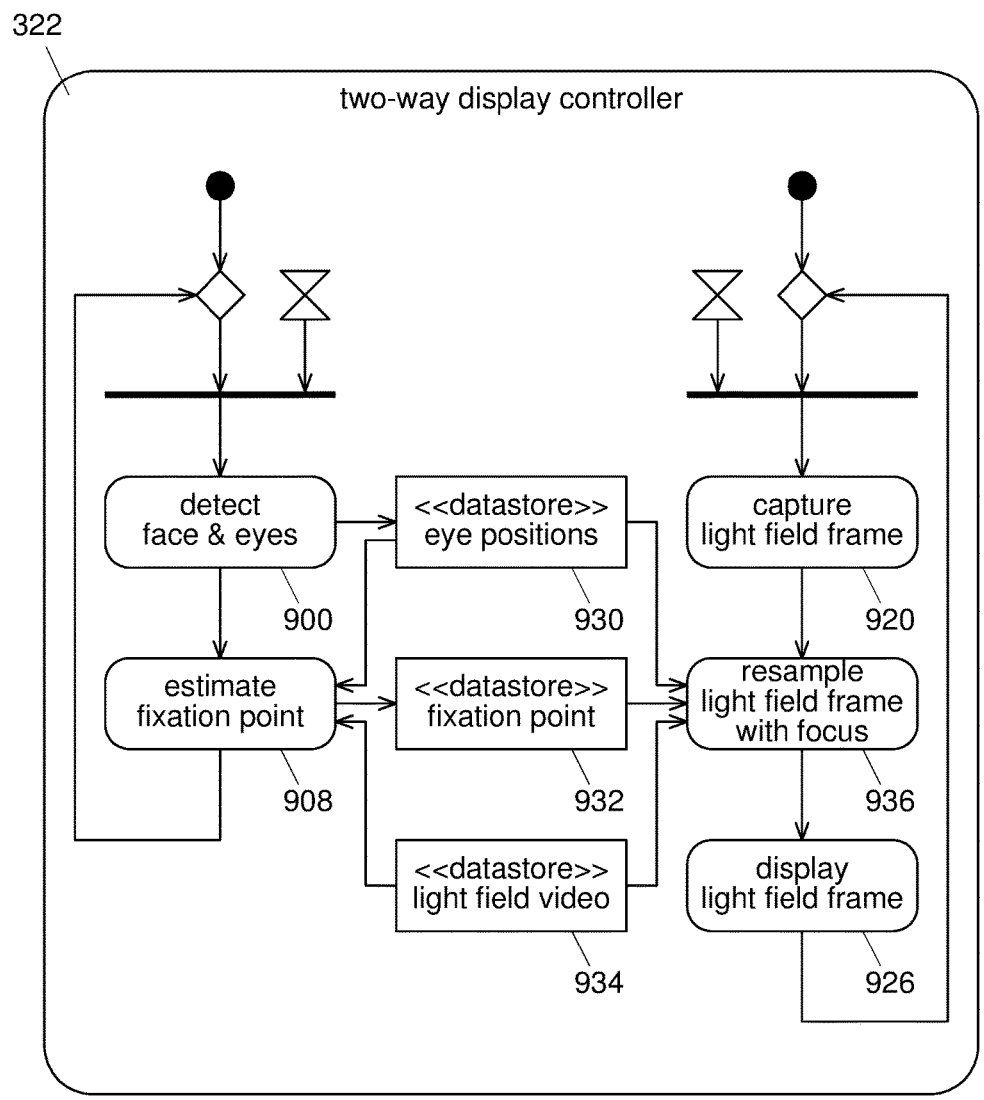
FIG. 39 shows an activity diagram for displaying a captured light field.

FIG. 39 shows an activity diagram for two-way display controller 322 displaying a light field video 110.

The diagram shows two parallel activities: a face-detection activity on the left and a display activity on the right.

The face detection activity periodically detects the face and eyes of the viewer (at 900) (or of each of several viewers), stores the eye positions in a datastore 930, estimates the viewer's fixation point (or depth) (at 908), and stores the fixation point (or depth) in a datastore 932. The controller estimates the fixation point (or depth) based on the viewer's gaze direction in conjunction with the sample depth 136 in the source light field video 110 (stored in a datastore 934), or on the vergence of the user's eyes, or on a combination of the two.

The display activity periodically displays (at 926) the next light field frame 116 of the light field video 110. It optionally resamples (at 936) the light field prior to display, in particular to match the focus to the estimated fixation plane. This again implements the gaze-directed viewer-specific focus mode described earlier in relation to FIG. 10C and FIG. 10D.

The display activity optionally captures (at 920) a light field frame 116, allowing the subsequent resampling step (at 936) to use the captured light field frame to virtually illuminate the scene represented by the light field video. This is straightforward via ray tracing (discussed below) if the light field video 110 contains depth 136. It allows real ambient lighting incident on the display 300 to light the scene in the video, and it allows the real objects visible to the two-way display (including the viewer) to be reflected by virtual objects in the virtual scene.

The two parallel activities are asynchronous and typically have different periods. For example, the face-detection activity may run at 10 Hz while the display activity may run at 100 Hz. The two activities communicate via the shared datastores.

Display of Light Field Video from a 3D Animation Model

In yet another important use-case, a two-way light field display 300 generates and displays light field video from a 3D animation model.

Figure 40:
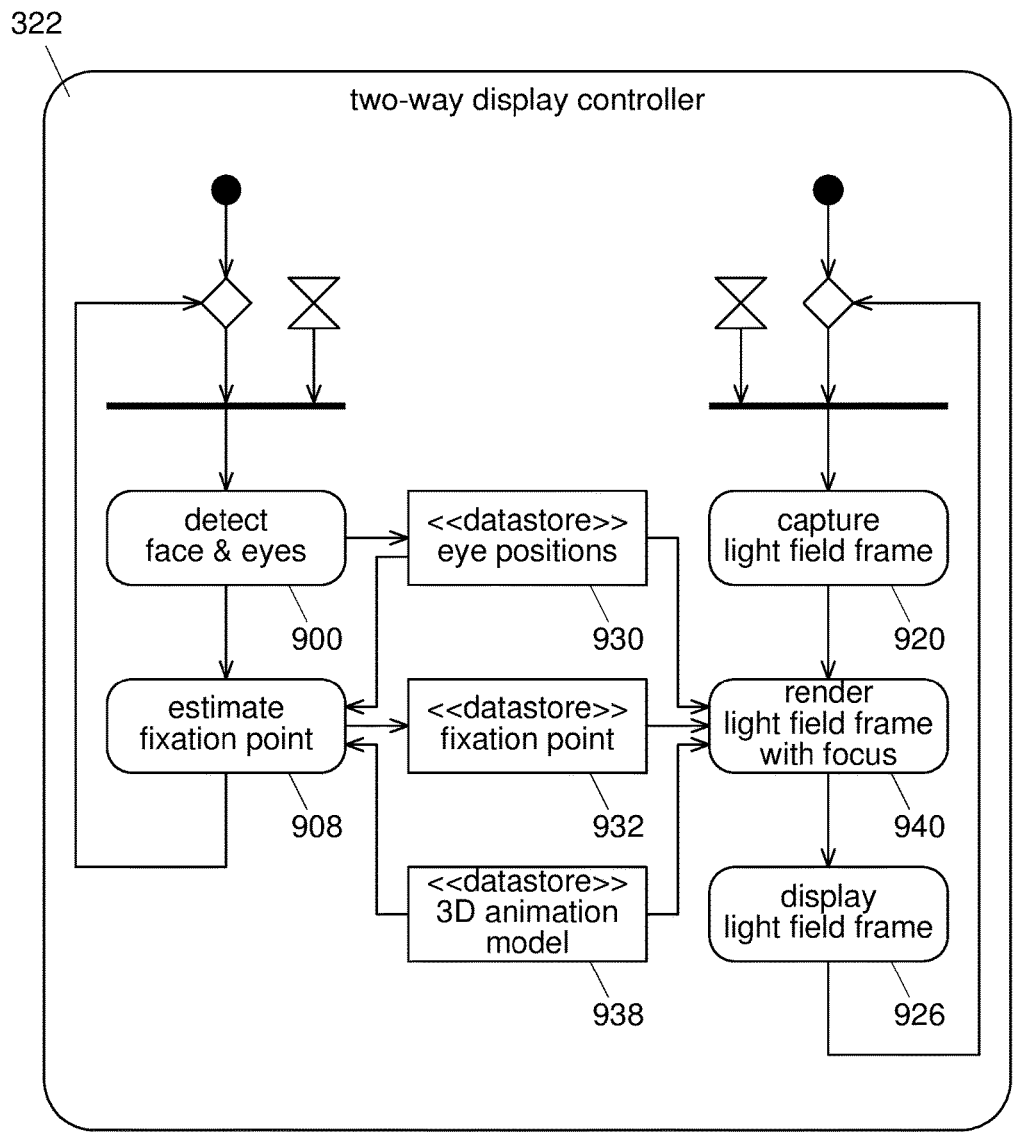
FIG. 40 shows an activity diagram for displaying a synthetic light field.

FIG. 40 shows an activity diagram for two-way display controller 322 generating and displaying light field video 110 from a 3D animation model.

The diagram shows two parallel activities: a face-detection activity on the left and a display activity on the right.

The face detection activity periodically detects the face and eyes of the viewer (at 900) (or of each of several viewers), stores the eye positions in a datastore 930, estimates the viewer's fixation point (or depth) (at 908), and stores the fixation point (or depth) in a datastore 932. The controller estimates the fixation point (or depth) based on the viewer's gaze direction in conjunction with depth information determined from the 3D animation model (stored in a datastore 938), or on the vergence of the user's eyes, or on a combination of the two.

The display activity periodically renders (at 940) and displays (at 926) the next light field frame 116 from the 3D animation model. During rendering it matches the focus to the estimated fixation plane. This again implements the gaze-directed viewer-specific focus mode described earlier in relation to FIG. 10C and FIG. 10D.

Rendering a light field frame 116 is straightforward via ray tracing [Levoy96, Levoy00]. As illustrated in FIG. 3B, each spectral radiance 128 may be generated by tracing, from a corresponding (now virtual) light sensor 152, a set of rays that sample the sampling beam 166, and determining the interaction of each ray with the 3D model [Glassner89]. The rays are ideally chosen to sample the 4D sampling beam 166 stochastically, to avoid low-frequency artifacts associated with regular sampling. Ray density may also be matched adaptively to scene complexity to reduce aliasing.

The two parallel activities are asynchronous and typically have different periods. For example, the face-detection activity may run at 10 Hz while the display activity may run at 100 Hz. The two activities communicate via the shared datastores.

Although the rendering step 940 is shown performed by the two-way display controller 322, it may also be performed by a separate computing device in communication with the two-way display controller 322.

The display activity optionally captures (at 920) a light field frame 116, allowing the subsequent rendering step (at 940) to use the captured light field frame to virtually illuminate the scene represented by the 3D animation model. This is again straightforward during ray tracing. It allows real ambient lighting incident on the display 300 to light the virtual scene, and it allows the real objects visible to the two-way display (including the viewer) to be reflected by virtual objects in the virtual scene.

The viewer's gaze can be reflected at each virtual surface it encounters to obtain the actual fixation point 262 (as shown in FIG. 10C). The fixation point can then either be virtual or real, i.e. behind the display or in front of the display respectively. If the fixation point is virtual then the depth of the fixation point is determined by tracing the gaze, via further reflections (if any), to an element 310. If the fixation point is virtual then the capture beam is diverging; if real then the capture beam is converging. This allows the viewer to fixate on a real object via a reflection in a virtual object.

In addition to including light field video 110 captured by the two-way display 300, the 3D animation model can include already-captured or live light field video from other sources. This includes light field video 110 from another two-way light field display 300 mounted back-to-back with the present two-way light field display 300, allowing virtual objects to overlay (and refract, when transparent) real objects visible to the back-facing two-way display 300.

Distribution of Functions

The functions of the display controller 342 may be performed by a dedicated controller associated with or embedded in the display 200, or by a separate device (or devices) in communication with the display 200.

Likewise, the functions of the camera controller 340 may be performed by a dedicated controller associated with or embedded in the camera 220, or by a separate device (or devices) in communication with the camera 220.

Light Field Resampling

Prior to display, a light field 110 may need to be resampled. This is necessary if the temporal sampling period 114, spatial sampling period 120 or angular sampling period 126 of the target display 200 differs from the corresponding sampling period of the source light field 110; if their respective spectral sampling bases 132 differ; if their respective sampling focuses 138 differ; or if their respective light field boundaries 102 differ, e.g. one is rotated or translated relative to the other, or they have different curved shapes.

Translation may include translation in the z direction, e.g. to display virtual objects in front of the display.

In addition to spectral resampling, spectral remapping may be used to map non-visible wavelengths (such as ultraviolet and near infrared) to visible wavelengths.

Resampling is not required if the captured (or synthesised) light field 110 being displayed matches the characteristics of the target light field display 200. For example, no resampling is required, by default, when pairs of identical two-way displays 300 are used together, e.g. each displaying the light field 110 captured by the other as shown in FIG. 11.

However, resampling to translate the light field boundary of a light field video 110 to compensate for the spatial separation of a pair of back-to-back displays 300 can be used to implement practical invisibility for the region between the two displays.

Light field resampling involves generating, from an input light field video 110, a resampled output light field video 110. If the temporal sampling regime is unchanged, then it involves generating, from an input light field frame 116, a resampled output light field frame 116, i.e. a set of output light field view images 122, each corresponding to a position (xy) on the spatial sampling grid of the output light field frame 116. One of the most common uses of light fields is to generate novel 2D views [Levoy96, Levoy00, Isaksen00, Ng05a]. Resampling a light field equates to generating a set of novel 2D views.

As illustrated in FIG. 3B, each spectral radiance 128 has a corresponding (virtual) light sensor 152 and sampling beam 166. Computing a resampled output spectral radiance 128 involves identifying all sampling beams 166 associated with the input light field frame 116 that impinge on the light sensor 152 corresponding to the output spectral radiance, and computing the weighted sum of each beam's corresponding input spectral radiance 128. Each weigh is chosen to be (at least approximately) proportional to the overlap between the beam and the light sensor 152.

Additional Display Modes

The primary display mode of the light field display 200 is to reconstruct a continuous light field from a discrete light field 110 representing a scene containing objects at arbitrary depths.

In addition to this primary display mode it is useful to support a display mode in which the display 200 emulates a conventional 2D display. Given a 2D image, this can be achieved in two ways. In the first approach the 2D source image is simply embedded at a convenient virtual location in 3D, and the corresponding discrete light field is rendered and displayed. In this case the 2D image is limited to lying in front of or behind the display 200, subject to the minimum (negative or positive) focal length and angular field 124 of the display elements 210. The sample count of the 2D source image is then limited by the angular sample count of the display 200.

In the second approach the entire light field view image 122 of each display element 210 is set to a constant value equal to the value of the spatially-corresponding pixel in the 2D source image, and the display element focus is set to its minimum (negative or positive). The sample count of the 2D source image is then limited by the spatial sample count of the display 200.

It is also useful to support a display mode where the scene is located at infinity. In this case the output of the display 200 is collimated, the view image 122 displayed by each display element 210 is identical, and the output focus is set to infinity. The required sample count of the collimated source image equals the angular sample count of the display 200.

A collimated source image can be captured using a light field camera 220 by focusing its camera elements 230 at infinity and either choosing one view image 122 as the collimated image, or, for a superior image, averaging a number of view images 122 from a number of camera elements 230 (and in the limit, from all of the camera elements 230). The averaged image is superior because it has a better signal-to-noise ratio, and because it better suppresses scene content not located at infinity. This averaging approach represents a specific example of a more general synthetic aperture approach.

Synthetic Aperture

During capture, the light field view images 122 captured by any number of adjacent camera elements 230 can be averaged to simulate the effect of a larger camera aperture [Wilburn05]. In this process, spectral radiances 128 that correspond to the same virtual point source 224 (as shown in FIG. 8B) are averaged. This may require view image resampling to ensure alignment with the 4D sampling grid of the combined view image.

The use of a synthetic aperture results in a greater effective exposure, and therefore an improved signal to noise ratio, but shallower depth of field.

Staggered Element Timing

During capture (and subsequent display), the timing of the frame sync signal used by different camera elements 230 (and display elements 210) can be stochastically staggered to provide more uniform sampling in the time domain [Wilburn11]. This results in a smoother perception of movement when the light field video 110 is displayed, but with increased motion blur if a synthetic aperture is used.

Mirror Mode

The two-way light field display 300 can also be configured to act as a mirror, i.e. where the captured light field is re-displayed in real time. Capture and display focus is managed as described above.

In the simplest mirror mode each two-way element re-displays its own captured view image. This can operate via a sample buffer, a line buffer or a full view image buffer per element.

Image processing can also be performed on the light field between capture and re-display, e.g. image enhancement, relighting, and spectral remapping.

Audio

The light field display 200 can be configured to reproduce multiple channels of digital audio associated with a light field video 110 by including digital-to-analog converters (DACs), amplifiers, and electro-acoustic transducers (speakers) mounted along the periphery of (or otherwise in the vicinity of) the display.

The light field camera 220 can be configured to capture multiple channels of digital audio as part of a light field video 110 by including a set acoustic sensors (microphones) mounted along the periphery (or otherwise in the vicinity of) of the display, and analog-to-digital converters (ADCs). A microphone may also be incorporated in each camera element 230.

Each audio channel may be tagged with the physical offset of the microphone used to capture it to allow phased-array processing of the audio [VanVeen88, Tashev08], e.g. for reducing ambient noise or isolating individual remote speakers [Anguera07] (e.g. after selection via gaze).

Phased-array techniques may also be used to focus the reproduction of a selected audio source (such as a remote speaker) at the local viewer who has selected the source [Mizoguchi04] (e.g. after selection via gaze). This allows multiple viewers to attend to different audio sources with reduced interference.

A sufficiently dense array of speakers (e.g. with a period of 5 cm or less) may be used to reproduce an acoustic wave field [deVries99, Spors08, Vetterli09], allowing audio to be virtually localised to its various sources, independent of the position of the viewer (i.e. listener). This ensures that aural perception of a displayed scene is consistent with its visual perception. A correspondingly dense array of microphones can be used to capture a real acoustic wave field, and an acoustic wave field is readily synthesized from a 3D animation model containing audio sources.

The light field video 110 can thus be extended to include a time-varying discrete acoustic wave field, i.e. consisting of a dense array of audio channels.

A one-dimensional speaker array may be used to reproduce an acoustic wave field in one dimension, e.g. corresponding to the horizontal plane occupied by viewers of the display 200. A two-dimensional speaker array may be used to reproduce an acoustic wave field in two dimensions.

Two-Way Display Controller Architecture

Figure 41:
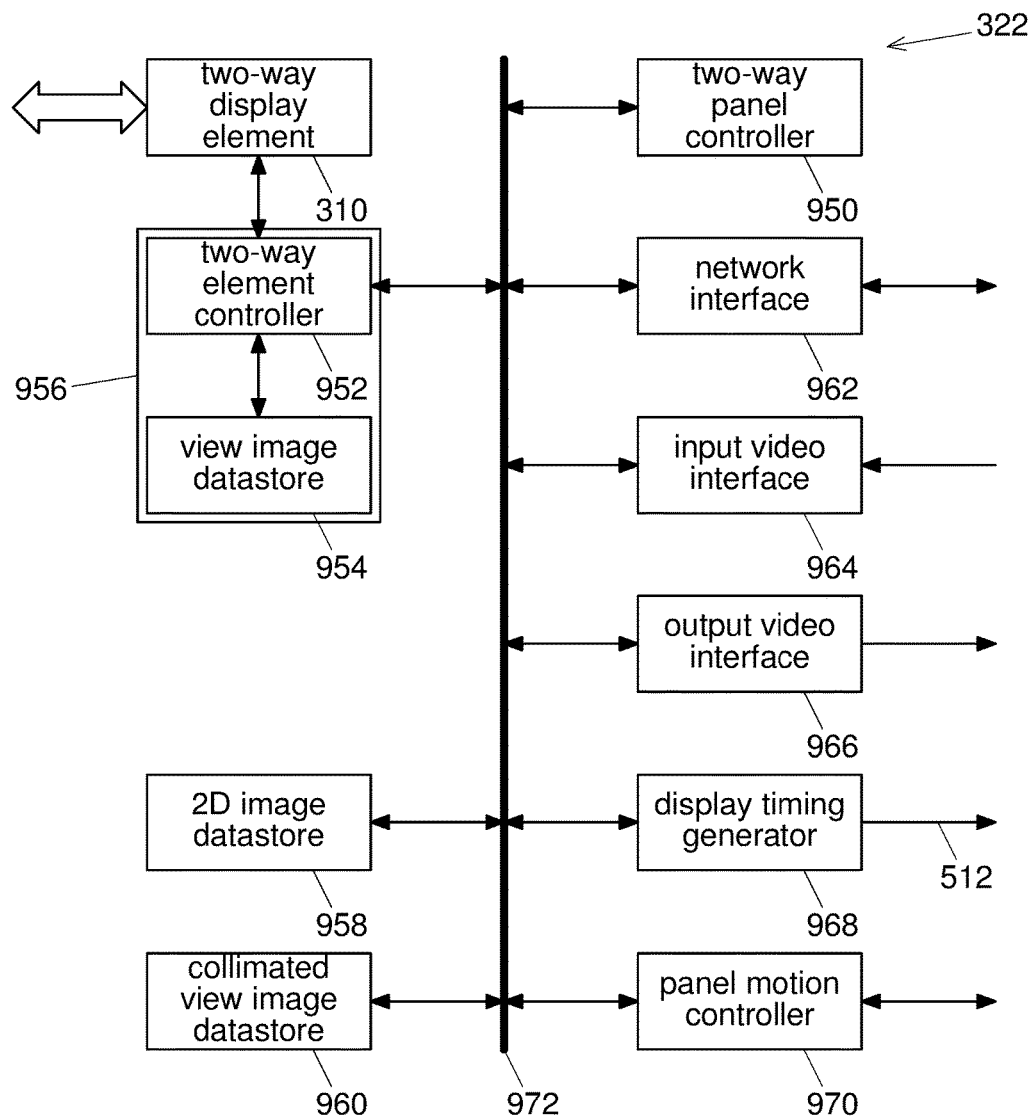
FIG. 41 shows a block diagram of a two-way light field display controller.

FIG. 41 shows a block diagram of the two-way display controller 322, discussed earlier in relation to FIG. 11 and FIG. 12.

The display controller 342 should be considered equivalent to the two-way display controller 322 operating in display mode, and vice versa. The camera controller 340 should be considered equivalent to the two-way display controller operating in camera mode, and vice versa.

The two-way display controller 322 includes a two-way panel controller 950 which coordinates the display and capture functions of a single two-way display panel 800. When a two-way display 300 incorporates multiple panels 800 they can be controlled in modular fashion by multiple panel controllers 950.

The display and capture functions of each individual two-way display element 310 is controlled by a corresponding two-way element controller 952. The element controller 952 utilises a view image datastore 954, which holds an output view image 502 for display and a captured input view image 602 (as described earlier in relation to FIG. 15, FIG. 17 and FIG. 18).

During display, the display element 310 reads successive radiance samples 134 from the output view image 502, while at the same time the panel controller 950 writes new radiance samples 134 to the output view image 502. The view image datastore 954 only needs to accommodate a fractional output view image 502 if reading and writing are well synchronised.

During capture, the panel controller 950 reads successive radiance samples 134 from the input view image 602, while at the same time the display element 310 writes new radiance samples 134 to the input view image 602. The view image datastore 954 only needs to accommodate a fractional input view image 602 if reading and writing are well synchronised.

For the illustrative display configuration, the display has a total memory requirement of 6E11 bytes (600 GB) each for display and capture, assuming full (rather than fractional) view images.

The element controller 952 supports two display modes: standard light field display (from the output view image 502 in the view image datastore 954), and constant-color display (from a constant-color register).

The two-way display element controller block 956, consisting of the two-way element controller 952 and its view image datastore 954, is replicated for each two-way display element 310.

The panel controller 950 and/or element controllers 952 may be configured to perform light field decompression prior to or during display and light field compression during or after capture. Light field interchange formats and compression are discussed further below.

Each of the panel controller 950 and element controllers 952 may comprise one or more general-purpose programmable processing units with associated instruction and data memory, one or more graphics processing units with associated instruction and data memory [Moreton05], and purpose-specific logic such as audio processing, image/video processing and compression/decompression logic [Hamadani98], all with sufficient processing power and throughput to support a particular two-way display configuration.

Although FIG. 41 shows one element controller 952 per display element 310, an element controller 952 may be configured to control multiple display elements 310.

The panel controller 950 utilises a 2D image datastore 958 to hold a 2D image for display. As described earlier, the 2D image may be displayed by configuring each display element 310 to display a constant color. In this mode the panel controller 950 writes each pixel of the 2D image to the constant-color register of the corresponding element controller 952. Alternatively, the 2D image may be displayed by synthesising a light field frame 116. In this mode the panel controller 950 synthesises a light frame 116, using a specified 3D location and orientation for the 2D image, and writes each resultant output view image 122 to its corresponding view image datastore 954.

The panel controller 950 utilises a collimated view image datastore 960 when operating in collimated mode, holding a collimated output view image and a collimated input view image. As described earlier, in collimated display mode each display element 310 displays the same output view image 122. The panel controller 950 can either broadcast the collimated output view image to the element controllers 952 during display, or the collimated output view image can be written to the individual view image datastores 954 prior to display.

As also described earlier, in collimated capture mode the collimated output view image may be obtained by averaging a number of input view images 602. The panel controller 950 can perform this averaging during or after capture.

A network interface 962 allows the panel controller 950 to exchange configuration data and light field video 110 with external devices, and may comprise a number of conventional network interfaces to provide the necessary throughput to support light field video 110. For example, it may comprise multiple 10 Gbps or 100 Gbps Gigabit Ethernet (GbE) interfaces, coupled to fiber or wire.

An input video interface 964 allows an external device to write standard-format video to the display 300 for 2D display via the 2D datastore 958, allowing the display 300 to be used as a conventional 2D display.

When the display 300 is operating in collimated display mode, the input video interface 964 also allows an external device to write collimated light field video 110 as standard-format video to the display for display via the collimated view image datastore 960.

When the display 300 is operating in collimated capture mode, an output video interface 966 allows other devices to read collimated light field video 110 from the display as standard-format video. This allows collimated light field video 110 to be easily exchanged between a pair of two-way light field displays 300 using a pair of standard video interconnections.

A display timing generator 968 generates the global frame sync signal 512 used to control both display and capture (as described in relation to FIG. 15 and FIG. 17 respectively).

If the display is designed to oscillate, as described in relation to FIGS. 24A through 24D, a panel motion controller 970 drives the actuator 814 and monitors the position of the piston 816.

The various components of the two-way display controller 322 communicate via a high-speed data bus 972. Although various data transfers are described above as being performed by the panel controller 950, in practice they may be initiated by the panel controller (or other components) but performed by DMA logic (not shown). The data bus 972 may comprise multiple buses.

Although the various datastores are shown as distinct, they may be implemented as fixed-size or variable-size regions of one or more memory arrays.

Light Field Interchange Formats and Compression

While light field video 110 may be exchanged between compatible devices (including light field cameras 220, light field displays 200, and other devices) in uncompressed form, the throughput (and memory) requirements of light field video typically motivate the use of compression. The illustrative display configuration has a throughput of 4E13 samples/s (5E14 bits/s; 500×100 GbE links), and requires a frame memory of 6E11 bytes (600 GB).

Compression may exploit the full 5D redundancy within time intervals of a light field video 110 (i.e. including inter-view redundancy [Chang06]), or 4D redundancy within a light field frame 116 [Levoy96, Levoy00, Girod03]. It may also utilise conventional image or video compression techniques on each (time-varying) light field view image 122, such as embodied in the various JPEG and MPEG standards. 100:1 compression based on 4D redundancy is typical [Levoy96, Levoy00].

Stereoscopic and multiview video utilised by 3D TV and video (3DV) systems contains a small number of sparse views, and H.264/MPEG-4 (via its multiview video coding (MVC) profiles) supports 5D compression with the addition of inter-view prediction to the usual spatial and temporal prediction of traditional single-view video [Vetro11]. MVC 5D compression can be applied to a dense light field video 110.

When the optional light field depth 136 is available, depth-based compression techniques can be used. Depth-based representations used in 3DV systems include multi-view video plus depth (MVD), surface-based geometric representations (e.g. textured meshes), and volumetric representations (e.g. point clouds) [Alatan07, Muller11].

With MVD, the use of depth information allows effective inter-view prediction from a sparser set of views than standard inter-view prediction (i.e. MVC without depth), thus MVD allows a dense set of views to be more effectively synthesized from a sparse set of views, thus at least partly decoupling the view density of the interchange format from the view density of the display [Muller11].

By supporting 3DV formats the display 300 also becomes capable of exchanging 3D video streams with other 3DV devices and systems.

Visibility-Based Two-Way Display Controller Architecture

Figure 42A:
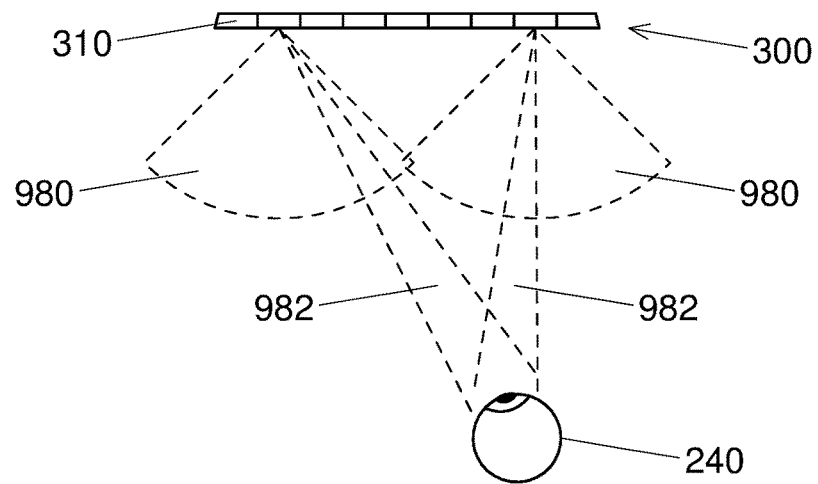
FIG. 42A shows eye-directed fields of display elements of a light field display.

As shown in FIG. 42A, each two-way display element 310 has an angular field 980 (corresponding to the light field angular field 124), only a small subset 982 of which is seen by the eye 240 of a viewer.

It is therefore efficient to only capture, transmit, resample, render and display the subset 982 of each element's field (suitably expanded to allow for eye movement between frames), as this reduces the required communication and processing bandwidth, as well as the required power. This selective capture, processing and display relies on face detection.

If the two-way display element 310 is a scanning element, then the scanning time in one or both scanning directions can be reduced if the scan is limited to the visible field 982.

Assuming a minimum viewing distance of 200 mm and a visible field 982 10 mm wide at the eye, the (one-way) throughput of the illustrative display configuration (per viewer) is reduced by two orders of magnitude to 4E11 samples/s (5E12 bits/s; 46×100 GbE links uncompressed;

1×100 GbE link with 46:1 compression), and the memory requirements to 6E9 bytes (6 GB).

Figure 42B:
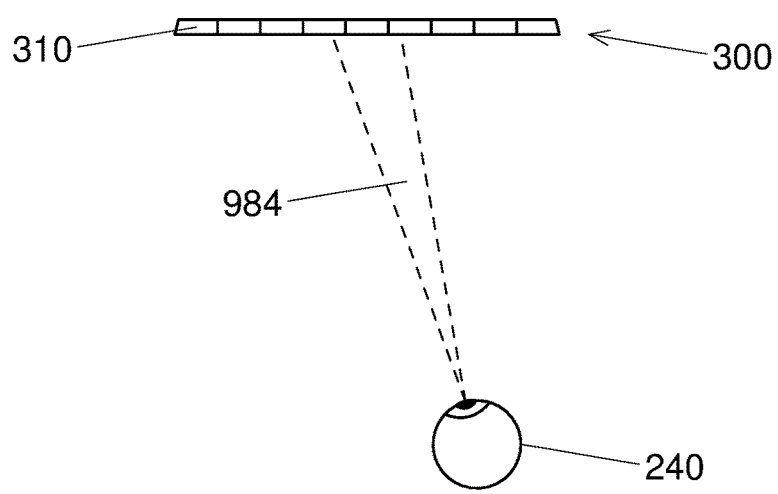
FIG. 42B shows the foveal field of an eye on a light field display.

As further shown in FIG. 42B, only a small number of display elements 210 intersect a projection 984 of the foveal region of the retina of the eye 240. It is therefore efficient to capture, transmit, resample, render and display the light field using a reduced angular sampling rate outside this region (suitably expanded to allow for eye movement between frames). This selective capture, processing and display relies on gaze estimation.

Figure 43:
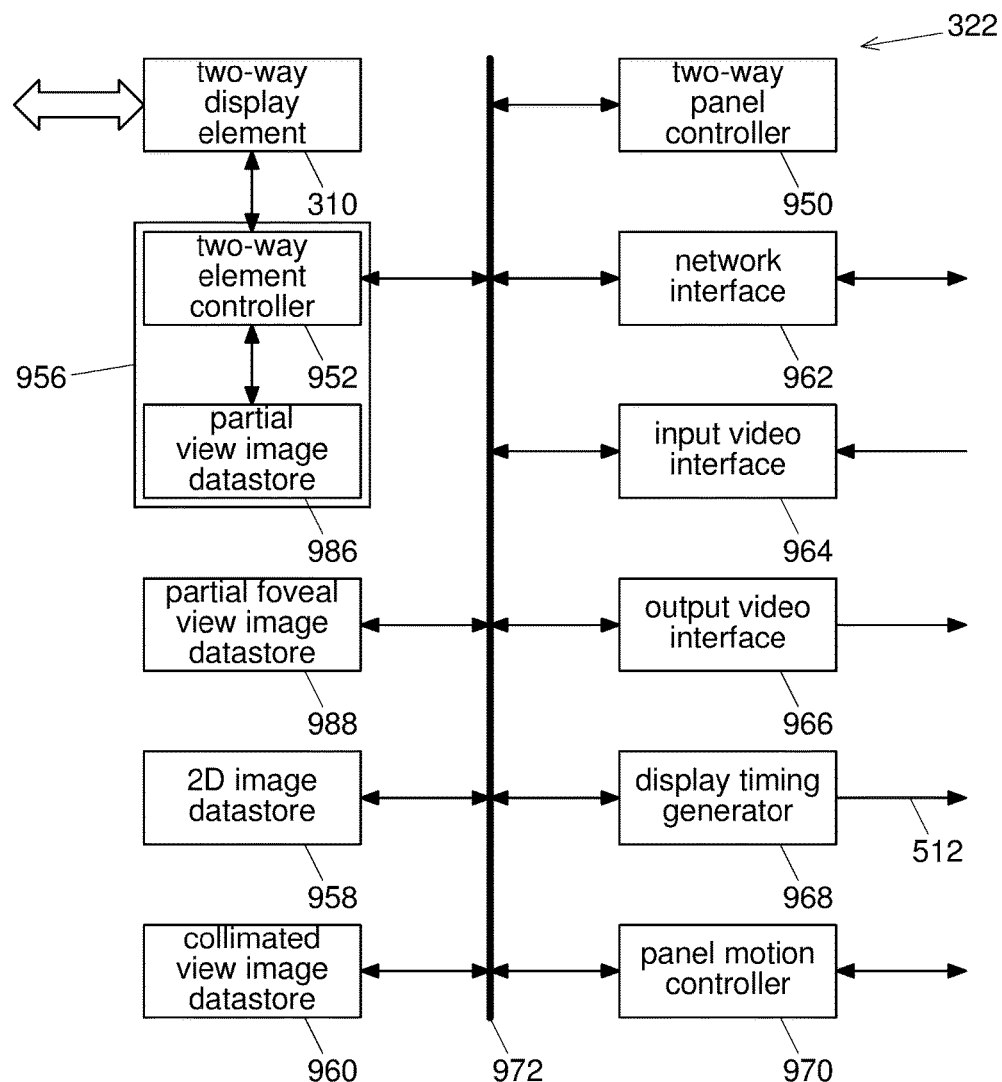
FIG. 43 shows a block diagram of a two-way light field display controller optimised for viewer-specific operation.

FIG. 43 shows a block diagram of the two-way display controller 322 optimised for visibility-based display and capture.

Each full-field view image 122 (stored in the view image datastore 954 of FIG. 41) is replaced by a smaller partial view image 122 (stored in the partial view image datastore 986 in FIG. 43). Each partial view image only covers the corresponding element's eye-specific partial angular field 982 (shown in FIG. 41A).

The maximum required size of a partial view image is a function of the minimum supported viewing distance.

If the display 300 supports multiple viewers in viewer-specific mode (e.g. via multiple display passes), then the capacity of the partial view image datastore 986 can be increased accordingly. At a minimum, to support a single viewer during display and a single viewer during capture, the partial view image datastore 986 has a capacity of four partial view images, i.e. one per viewer eye 240.

Further, as discussed above in relation to FIG. 42B, each partial view image may be subsampled, and then replaced by a non-subsampled partial view image when the corresponding display element 310 falls within the projection of the fovea. This can allow a further order of magnitude reduction in the size of each partial view image. In this approach a number of non-subsampled partial view images are stored in a partial foveal view image datastore 988, and each display element 310 within the projection of the fovea is configured to use a designated partial foveal view image (in the datastore 988) in place of its own subsampled partial view image (in the datastore 986).

The maximum required number of foveal view images is a function of the maximum viewing distance at which foveal display is supported.

Assuming a maximum viewing distance of 5000 mm for foveal viewing, and a foveal field 984 of 2 degrees, the (one-way) throughput of the illustrative display configuration (per viewer) is reduced by a further factor of six to 7E10 samples/s (8E11 bits/s; 8×100 GbE links uncompressed; 1×100 GbE link with 8:1 compression; 1×10 GbE link with 80:1 compression), and the memory requirements to 1E9 bytes (1 GB).

When the foveal regions of multiple viewers are non-overlapping, it is possible to support viewer-specific focus within each viewer's foveal region during a single display pass.

Visibility-based capture works in the same way, with the distinction that while visibility-based display is responsive to the position or gaze of one or more local viewers of the display, visibility-based capture is responsive to the position or gaze of one or more viewers viewing the captured light field on a remote display.

With visibility-based subsampling the element controller 952 supports two additional display modes: display with interpolation of radiance samples 134 (from the subsampled output view image in the partial view image datastore 986), and foveal display (from the designated partial foveal output view image in the partial foveal image datastore 988).

Shuttered Waveguide Light Field Display

Figure 44:
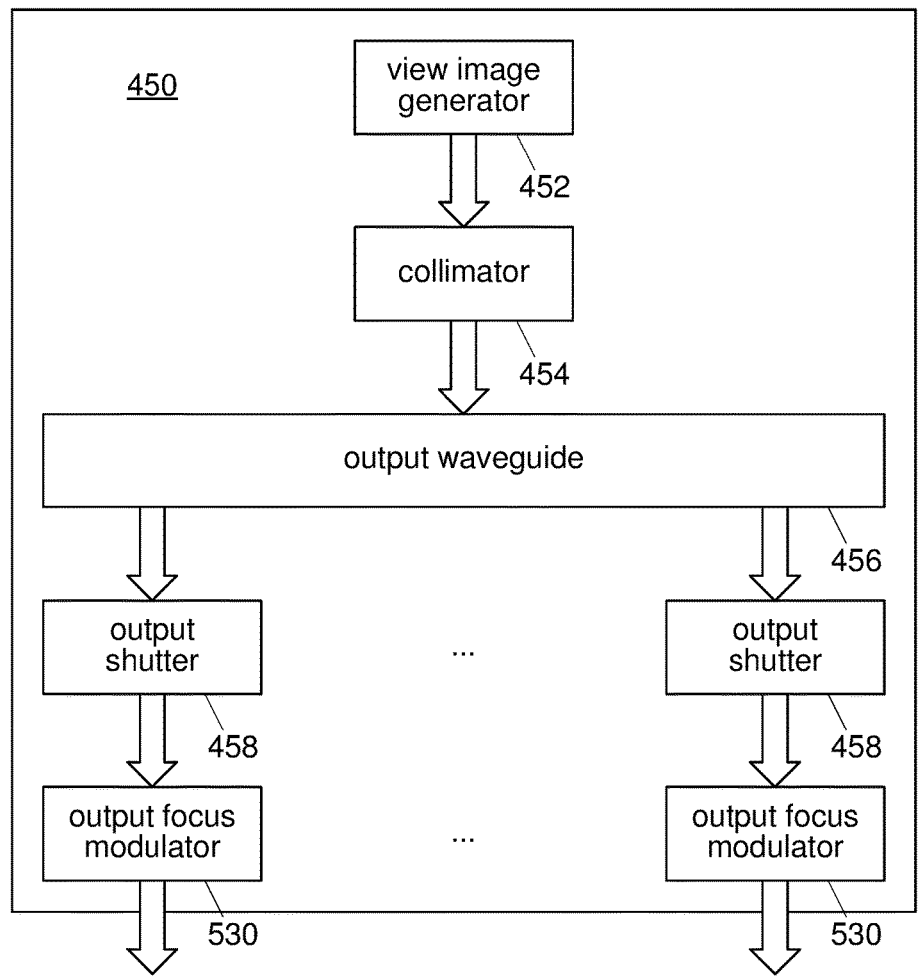
FIG. 44 shows a block diagram of a multiplexed light field display module.

FIG. 44 shows a block diagram of a multiplexed light field display module 450. The view image 122 generated by the view image generator 452 is time-multiplexed to multiple display elements via an output waveguide 456 and a set of output shutters 458, thereby allowing a single image generator to be efficiently shared by multiple display elements. Each output shutter 458 is opened in turn, allowing the corresponding display element to emit a view image that is specific to its position.

Any number of display modules 450 can be used to make a light field display 200, and each display module 450 can be any useful shape or size. For example, a display 200 can be constructed using a set of one-dimensional modules 450, i.e. each consisting of a single row or column of display elements. Or a display 200 can be constructed from a tiling of two-dimensional display modules 450, i.e. each consisting of a two-dimensional array of display elements.

An output focus modulator 530 is used to provide variable focus modulation of outgoing beams so that they are focused at the required virtual depth, typically (but not necessarily) behind the display. Because the waveguide 456 transmits collimated beams, the focus modulator 530 accepts collimated beams. A collimator 454, positioned between the image generator 452 and the waveguide 456, collimates the beams generated by the image generator.

The view image generator 452 may be any suitable view image generator, including the array-based and scanning view image generators described previously in this specification. The collimator 454 may be any suitable refractive, reflective or diffractive device. The output focus modulator 530 may be any suitable variable-focus refractive, reflective or diffractive device, including as previously described in this specification.

Within a light field display 200 comprising one or more multiplexed light field display modules 450, each light field display element 210 comprises an output focus modulator 530, an output shutter 458, and a section of the output waveguide 456 corresponding to the spatial extent of the display element 210. All of the display elements 210 of a single display module 450 share a single view image generator 452 and collimator 454.

Figure 45:
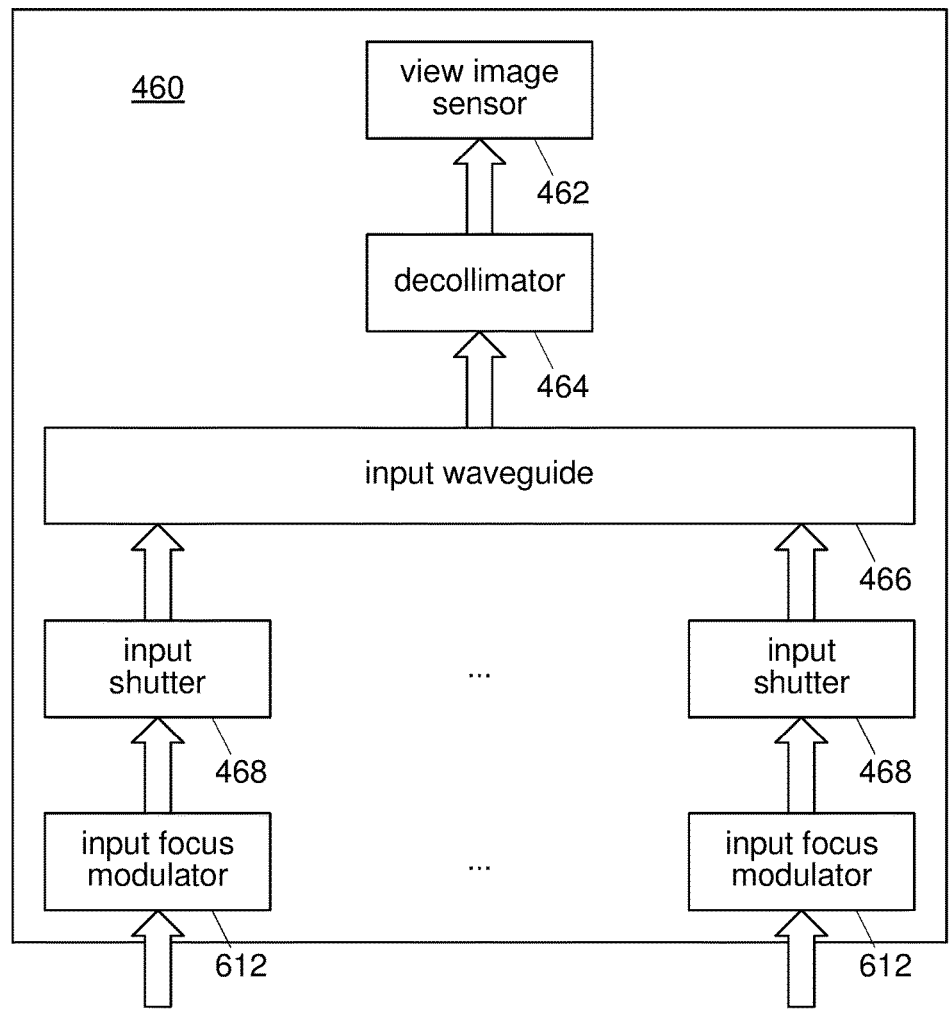
FIG. 45 shows a block diagram of a multiplexed light field camera module.

FIG. 45 shows a block diagram of a multiplexed light field camera module 460. The view image 122 captured by the view image sensor 462 is time-multiplexed from multiple camera elements via a set of input shutters 468 and an input waveguide 466, thereby allowing a single image sensor to be efficiently shared by multiple camera elements. Each input shutter 468 is opened in turn, allowing the corresponding camera element to collect a view image that is specific to its position.

Any number of camera modules 460 can be used to make a light field camera 220, and each camera module 460 can be any useful shape or size. For example, a camera 220 can be constructed using a set of one-dimensional modules 460, i.e. each consisting of a single row or column of camera elements. Or a camera 220 can be constructed from a tiling of two-dimensional camera modules 460, i.e. each consisting of a two-dimensional array of camera elements.

An input focus modulator 612 is used to provide variable focus modulation of incoming beams so that they are focused at the required real depth in front of the camera. Because the waveguide 466 transmits collimated beams, the focus modulator 612 produces collimated beams. A decollimator 464, positioned between the waveguide 466 and the image sensor 462, decollimates the beams, focusing them onto the image sensor.

The view image sensor 462 may be any suitable view image sensor, including the array-based and scanning view image sensors described previously in this specification. The decollimator 464 may be any suitable refractive, reflective or diffractive device. The input focus modulator 612 may be any suitable variable-focus refractive, reflective or diffractive device, including as previously described in this specification.

Within a light field camera 220 comprising one or more multiplexed light field camera modules 460, each light field camera element 230 comprises an input focus modulator 612, an input shutter 468, and a section of the input waveguide 466 corresponding to the spatial extent of the camera element 230. All of the camera elements 230 of a single camera module 460 share a single view image sensor 462 and decollimator 464.

Figure 46:
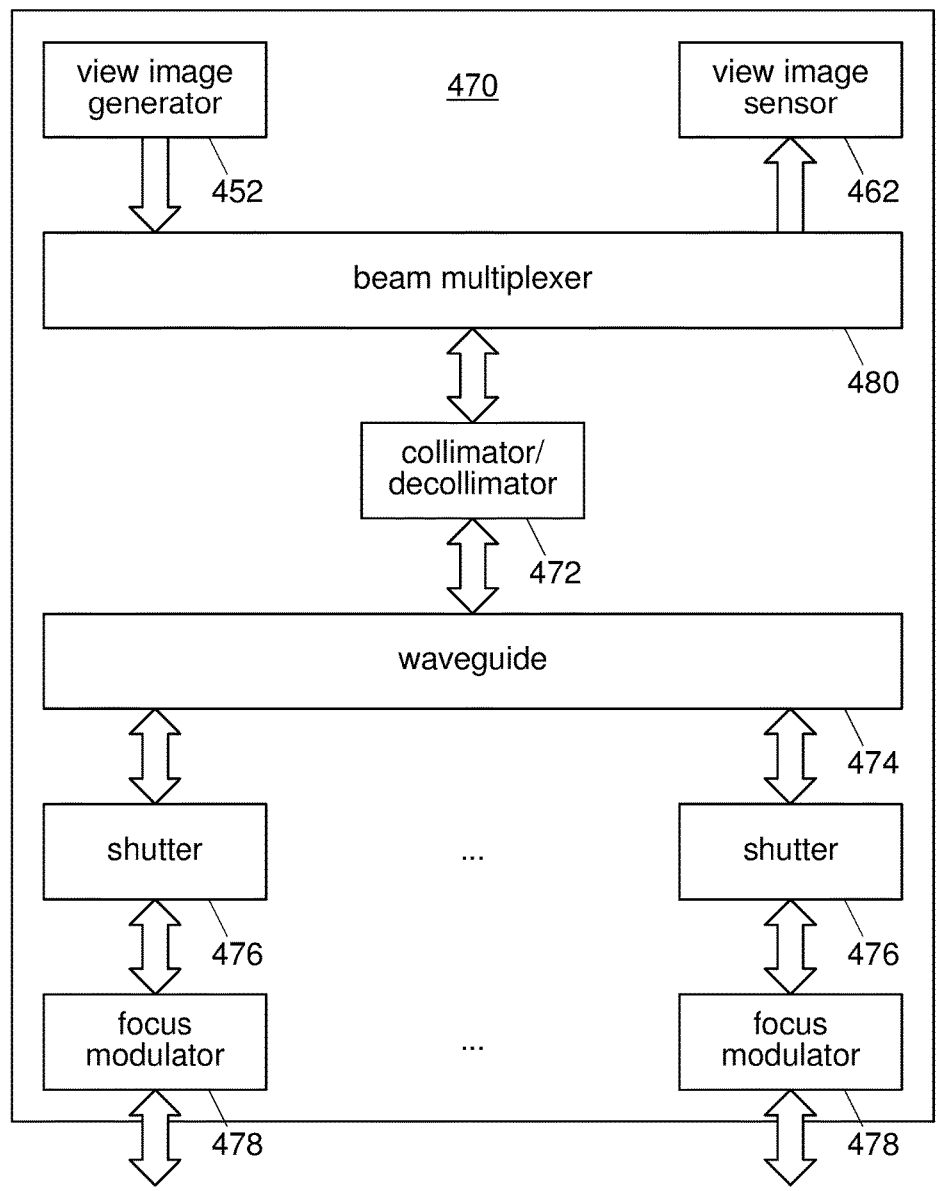
FIG. 46 shows a block diagram of a multiplexed two-way light field display module.

FIG. 46 shows a block diagram of a multiplexed two-way light field display module 470. The view image 122 generated by the view image generator 452 is time-multiplexed to multiple display elements via a waveguide 474 and a set of shutters 476, acting in the same way as the output shutters 458. The view image 122 captured by the view image sensor 462 is time-multiplexed from multiple camera elements via the set of shutters 476, acting in the same way as the input shutters 468, and the waveguide 474. The two-way display module 470 may be time-multiplexed between display and camera modes every frame, or as otherwise required. A beam multiplexer 480 mutiplexes the optical path between the view image generator 452 and the view image sensor 462. It may consist of any suitable multiplexer, including any suitable beamsplitter, including as previously discussed in this specification.

Any number of two-way display modules 470 can be used to make a two-way light field display 300, and each two-way display module 470 can be any useful shape or size. For example, a two-way display 300 can be constructed using a set of one-dimensional modules 470, i.e. each consisting of a single row or column of display elements. Or a display 300 can be constructed from a tiling of two-dimensional display modules 470, i.e. each consisting of a two-dimensional array of display elements.

A focus modulator 478 is used to provide variable focus modulation of both outgoing incoming beams, i.e. acting in the same way as the output focus modulators 530 in display mode, and the input focus modulators 612 in camera mode. A collimator/decollimator 472, positioned between the beam multiplexer 480 and the waveguide 474, collimates outgoing beams and decollimates incoming beams.

Within a two-way light field display 300 comprising one or more multiplexed two-way light field display modules 470, each two-way light field display element 310 comprises a focus modulator 478, a shutter 476, and a section of the waveguide 474 corresponding to the spatial extent of the two-way display element 310. All of the two-way display elements 310 of a single two-way display module 470 share a single view image generator 452, view image sensor 462, beam multiplexer 480, and collimator/decollimator 472.

Figure 47A:
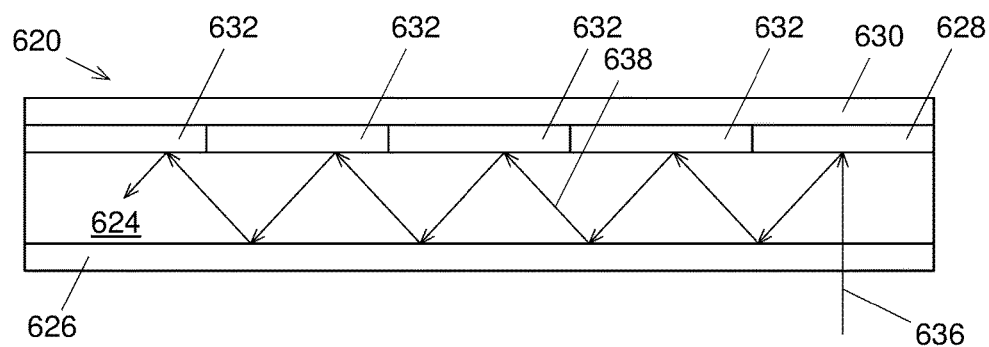
FIG. 47A shows a diagram of a shuttered waveguide in display mode with all shutters closed.

FIG. 47A shows a diagram of a shuttered waveguide 620 suitable for use in any of the multiplexed modules 450, 460 and 470. The waveguide consists of a core 624, a lower cladding 626, and a set of internal shutters 632. A first grating or hologram 628 is used to couple rays into the waveguide, and a second grating or hologram 630 is used to couple rays out of the waveguide. An angled mirror can be used in place of either grating, or light can be allowed to enter and/or exit the waveguide at an angle.

The waveguide is shown operating in display mode, with all shutters closed. A generated display ray 636 is coupled into the core 624 via the first grating 628. The core 624 has a higher refractive index than the cladding 626 and the shutters 632, so the ray experiences total internal reflection (TIR) and progresses through the core as a set of internally-reflected rays 638. The cladding 626 is also present on the sides of the waveguide (not shown), ensuring TIR of all rays.

Figure 47B:
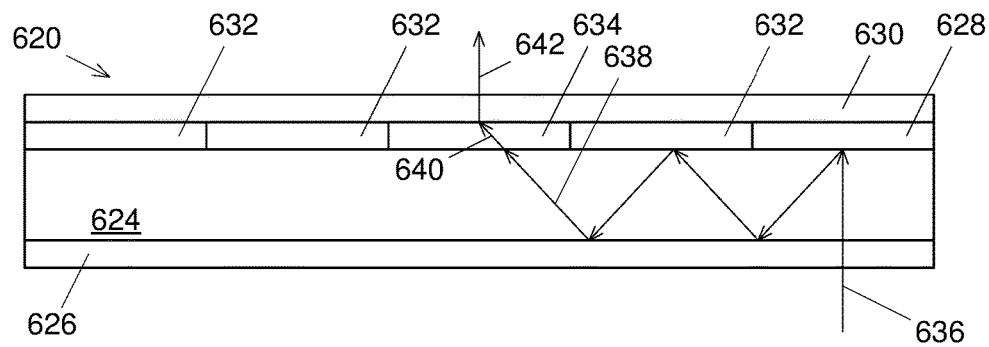
FIG. 47B shows a diagram of a shuttered waveguide in display mode with one transmissive shutter open.

FIG. 47B shows a diagram of the waveguide 620 with one shutter 634 open. Each shutter 632 has a refractive index switchable from matching the index of the cladding 626 to matching the index of the core 624. When the index of the shutter matches the index of the cladding then the shutter supports TIR and the shutter 632 is closed. When the index of the shutter matches the index of the core then TIR is overcome and the shutter 634 is open. The ray 640 is then transmitted by the shutter rather than being reflected at the core-shutter interface, and is coupled out of the waveguide by the second grating 630, as exiting display ray 642.

TIR occurs so long as the angle of incidence of a ray with the core-cladding (or core-shutter) interface exceeds the critical angle of the interface, calculated as the arcsine of the ratio of the cladding index (or shutter ordinary index) to the core index. As an illustrative example, for a core index of 1.8 and a cladding index of 1.5, matched by a liquid crystal with an ordinary index of 1.5 and an extraordinary index of 1.8, the critical angle is 56.4 degrees, allowing the waveguide 620 to transmit a field of view up to 33.6 degrees. Smaller index ratios yield smaller critical angles and hence larger fields of view.

TIR is only overcome by rays whose linear polarization allows them to experience the extraordinary refractive index of the shutter. Rays with the orthogonal polarization are unaffected and continue to propagate via TIR. Light injected into the waveguide may be appropriately linearly polarized (e.g. by utilizing a linear polarizer, or by utilizing an intrinsically polarized view image generator), and the waveguide itself may be polarization-preserving, e.g. by utilizing a suitably birefringent core 624, so that only suitably-polarized light is transmitted through the waveguide.

The number of rays 640 transmitted by an open shutter 634 varies with field angle, with fewer shallow rays than steep rays being transmitted. This can be compensated for by increasing the intensity of the corresponding generated display rays 636. The uniformity of the field transmitted by a waveguide can also be improved by embedding a partial reflector in the center of the waveguide, serving to multiply rays.

Figure 47C:
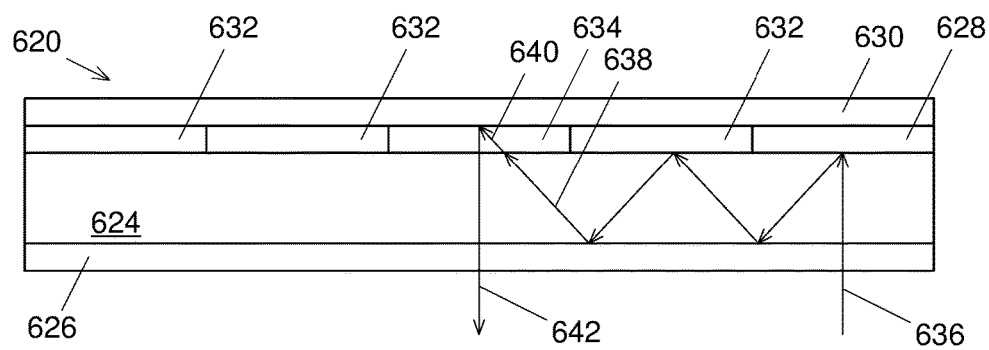
FIG. 47C shows a diagram of a shuttered waveguide in display mode with one reflective shutter open.

The second grating 630 may be transmissive or reflective. A transmissive grating has a relatively wide spectral bandwidth but a relatively narrow angular bandwidth, while a reflective grating has a relatively wide angular bandwidth but a relatively narrow spectral bandwidth. In FIG. 47B the second grating is shown as transmissive, producing a transmissive open shutter 634. In FIG. 47C the second grating is shown as reflective, producing a reflective open shutter 634. Multiple waveguides with reflective gratings, each optimised for a particular spectral peak (e.g. corresponding to red, green or blue light sources), can be stacked to achieve wide spectral and angular bandwidth simultaneously. Multispectral holograms, i.e. produced via multiple exposures each optimised for a different spectral peak, can also be used for achieve wider effective spectral bandwidth.

Figure 48A:
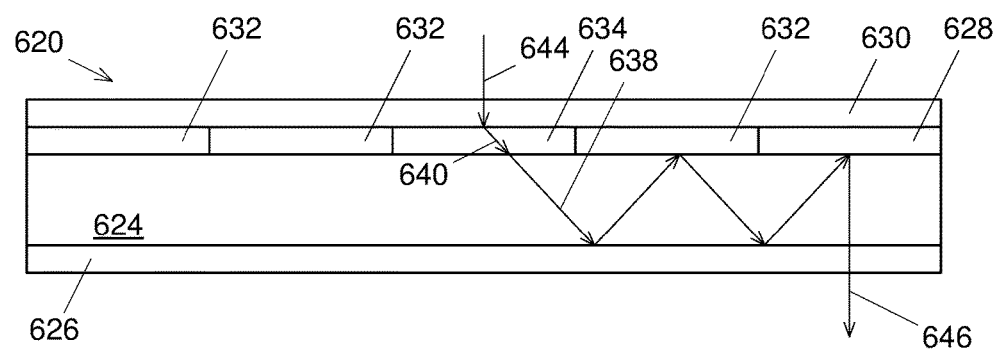
FIG. 48A shows a diagram of a shuttered waveguide in camera mode with one transmissive shutter open.
Figure 48B:
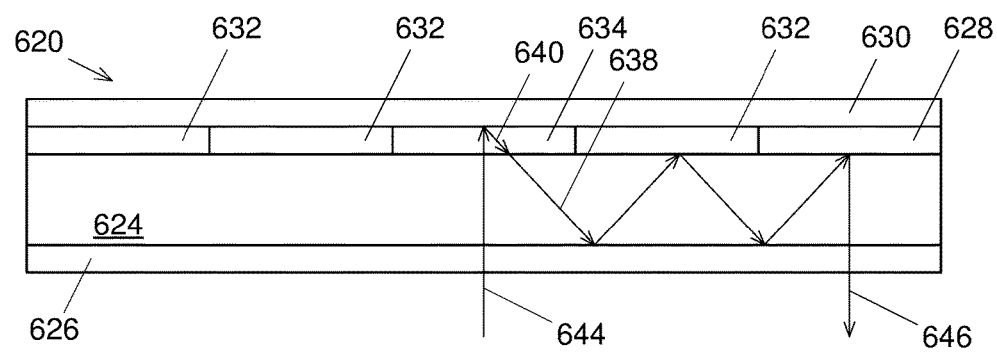
FIG. 48B shows a diagram of a shuttered waveguide in camera mode with one reflective shutter open.

FIG. 48A shows a diagram of the shuttered waveguide 620 operating in camera mode with one transmissive shutter 634 open, while FIG. 48B shows a diagram of a shuttered waveguide in camera mode with one reflective shutter 634 open. In both cases entering camera ray 644 is coupled into the core 624 of the waveguide via the second coupling grating 630 and the open shutter 634, and the corresponding sensed camera ray 646 is coupled out of the waveguide via the first coupling grating 628. Operation is camera mode is the reverse of the operation in display mode described previously in this specification. Rays impinging on closed shutters 632 are still deflected by the second grating 630, but are deflected again in the opposite direction at the interface between the closed shutters 632 and the core 624, and thus pass through the waveguide without being captured by the core 624.

The shutter 632 may be implemented using any optical component with a switchable refractive index, such as a nematic liquid crystal cell with its ordinary index of refraction approximating that of the cladding, and its extraordinary index of refraction approximating that of the core. The index of a nematic liquid crystal cell can be switched by applying a voltage in a direction normal to its rubbing direction, as previously described in this specification.

Figures 49A, 49B:
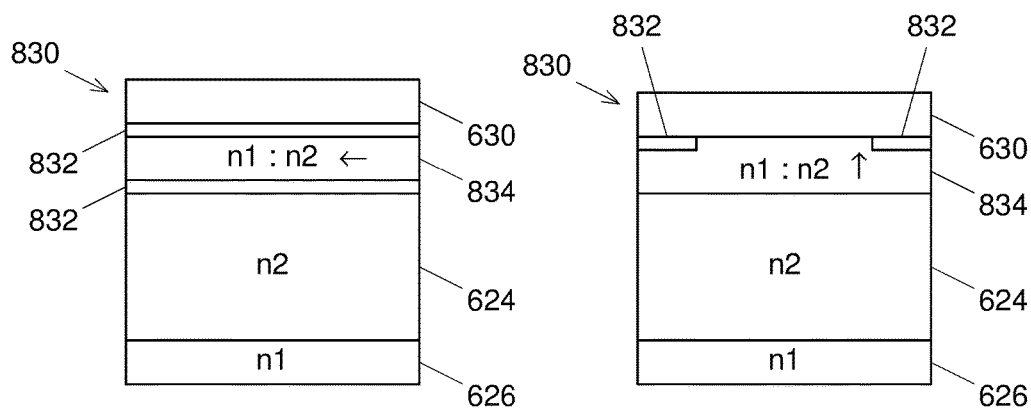
FIG. 49A shows a diagram of an active-closed shuttered element utilizing index matching.
FIG. 49B shows a diagram of an active-open shuttered element utilizing index matching.

FIG. 49A shows a single shuttered element 830 of the shuttered waveguide 620, i.e. corresponding to a section of the shuttered waveguide 620 one shutter wide, utilizing an index-matching liquid crystal shutter. The shutter consists of a nematic liquid crystal cell 834 sandwiched between a pair of electrodes 832, with its rubbing direction (and hence director) parallel to the waveguide as indicated by the arrow. When the director is parallel to the surface of the waveguide then a voltage must be applied to hold the shutter 632 closed. As shown in FIG. 49B, if the director is perpendicular to the surface of the waveguide then a voltage must be applied to hold the shutter 632 open, with the electrodes 832 bracketing (approximately) the ends of each cell 834.

In FIG. 49A and the figures that follow that show the shuttered element 830, each birefringent component, such as the liquid crystal cell 834, is labelled with its ordinary refractive index of n1 and its extraordinary refractive index of n2. Every other relevant fixed-index component is labelled with its approximately matching refractive index, i.e. either n1 or n2.

Figures 49C, 49D:
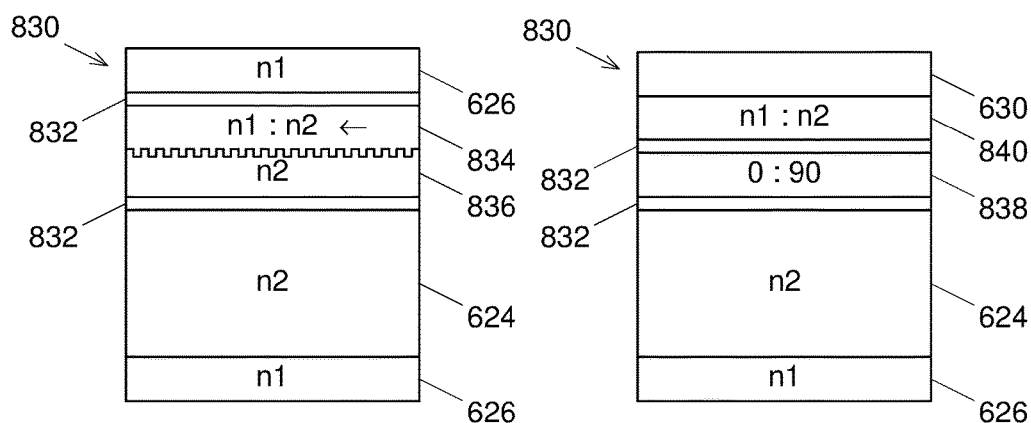
FIG. 49C shows a diagram of a shuttered element utilizing grating activation via index mismatching.
FIG. 49D shows a diagram of a shuttered element utilizing index matching via polarization rotation.

FIG. 49C shows a shuttered element 830 comprising a surface relief coupling grating 836 mated with a nematic liquid crystal cell 834. When the cell 834 is inactive then its extraordinary index matches that of the grating 836, the grating surface is invisible, and the grating is therefore inactive. When the cell 834 is active then its index differs from that of the grating 836, and the grating is then visible and therefore active. In the inactive state of the shutter light passes through the shutter and is reflected by the upper cladding 626. In the active state of the shutter light is coupled by the grating out of the waveguide. The shutter only works on one polarization of light, i.e. it is always visible to the orthogonal polarization, so light injected into the waveguide must be appropriately linearly polarized, and the waveguide itself must be polarization-preserving, e.g. by utilizing a suitably birefringent core 624.

FIG. 49D shows a shuttered element 830 comprising a polarization-rotating ferroelectric liquid crystal (FLC) cell 838 sandwiched between a pair of electrodes 832, and a birefringent upper cladding 840. The FLC cell 838 can be switched between two stable states via a positive or negative voltage applied across the electrodes, the first state imparting no polarization rotation, and the second state imparting a 90-degree polarization rotation. In the first state suitably-polarized light travelling through the waveguide sees the ordinary index of the birefringent cladding and experiences total internal reflection. In the second state the light sees the extraordinary index of the birefringent cladding 840, is transmitted through the cladding 840, and is coupled out of the waveguide by the coupling grating 630. Again, the light must already be appropriately linearly polarized and the waveguide polarization-preserving. Alternatively, a suitable linear polarizer can be included between the core 624 and the FLC rotator 838.

Figure 50A:
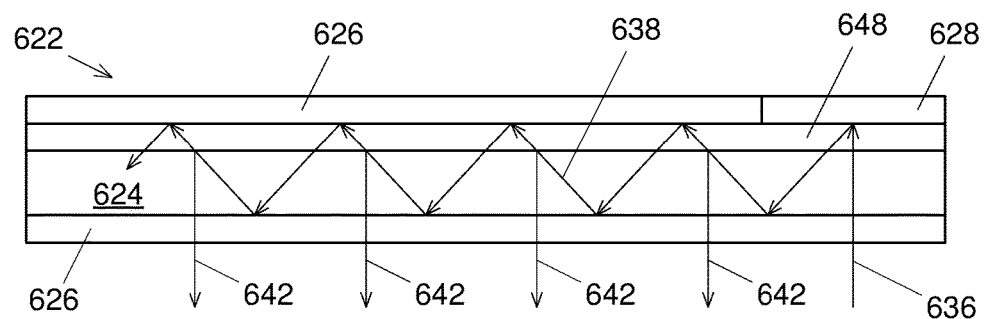
FIG. 50A shows a diagram of a waveguide-based exit pupil expander.

FIG. 50A shows a waveguide 622 comprising a weak coupling grating 648 that functions to couple a small number of rays 642 out of the waveguide, while allowing most rays to pass unimpeded to be totally internally reflected by the upper cladding 626 for continued propagation through the waveguide. The waveguide 622 therefore acts as an exit pupil expander [Simmonds11], or, in reverse, as an entrance pupil expander.

Figure 50B:
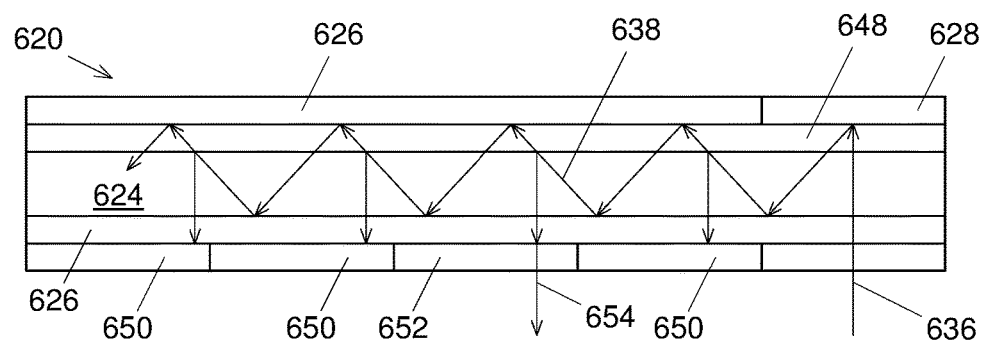
FIG. 50B shows a diagram of an externally-shuttered waveguide in display mode with one shutter open.

FIG. 50B shows a shuttered waveguide 620 comprising the exit pupil expander 622 of FIG. 50A with a set of external shutters 650. Each closed shutter 650 blocks exiting display rays 642 that are coupled out of the waveguide by the weak coupling grating 648. A single open shutter 652 is shown allowing a ray 654 to exit the waveguide. A disadvantage of this design is that only a small fraction of generated display rays 636 ultimately exit through the open shutter 652, resulting in wasted energy.

Figure 50C:
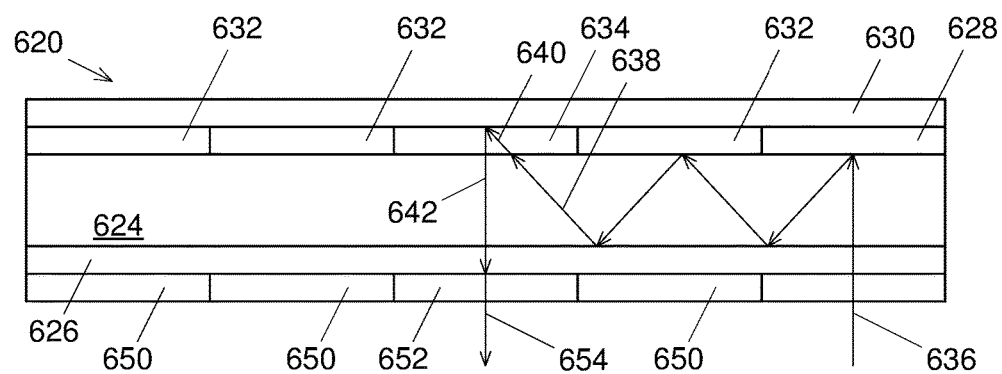
FIG. 50C shows a diagram of a hybrid-shuttered waveguide in display mode with one shutter open.

FIG. 50C shows a hybrid shuttered waveguide 620 comprising the internally-shuttered waveguide 620 of FIG. 47C with a set of additional external shutters 650. A ray 654 only exits the waveguide when both the internal shutter 634 and the external shutter 652 are open. If the external shutter 652 is faster than the internal shutter 634, then the hybrid design allows a group of internal shutters to be opened at once, relatively slowly, and for each external shutter in the group to be opened in succession relatively quickly. This has the advantage, relative to the shuttered exit pupil expander of FIG. 50B, of allowing the shutter coupling grating 630 to be more efficient than the weak coupling grating 648, thus consuming less energy. If N internal shutters 634 are opened at once, and the waveguide contains M elements overall, then the coupling grating 630 can be more efficient than the weak coupling grating 648 by a factor of M/N, and the intensity of the light carried by the hybrid shuttered waveguide can be a fraction N/M of the intensity carried by the shuttered exit pupil expander. By way of example, the external shutter 652 may be faster than the internal shutter 634 because the external shutter utilizes a ferroelectric liquid crystal design while the internal shutter utilizes a relatively slower nematic liquid crystal design, the former having a typical switching speed of tens of microseconds, the latter having a typical switching speed of several milliseconds. Although FIG. 50C shows the internal and external shutters having the same extent, in practice one internal shutter can span the extent of more than one external shutter.

If the internal shutter 634 has an asymmetric switching speed, i.e. it opens faster than it closes, or vice versa, and the external shutter 652 has a higher switching speed than the slower of the two switching speeds of the internal shutter 634, then it can be advantageous to use the external shutter in conjunction with even a single internal shutter to limit the effective open time of the corresponding element. For example, while the internal shutter of one element is still closing, the element can be closed quickly via its external shutter, and another element can be opened. The subsequent element may be an upstream element (i.e. closer to the view image generator) for maximum efficiency.

The externally-shuttered waveguide designs of FIGS. 50B and 50C are shown operating in display mode but can equally be used in reverse, i.e. in camera mode.

FIG. 51A shows an externally-shuttered waveguide element 830 that implements the externally-shuttered waveguide 620 of FIG. 50B. The external shutter comprises a polarization-rotating ferroelectric liquid crystal (FLC) cell 846 sandwiched between a pair of electrodes 844, further sandwiched between a pair of linear polarizers 844. The polarizations imparted by the two linear polarizers 844 may be parallel or orthogonal. If the polarizations are parallel then the shutter is open when the rotation imparted by the FLC rotator 846 is zero. If the polarizations are orthogonal then the shutter is open when the rotation imparted by the FLC rotator 846 is 90 degrees.

FIG. 51B shows an externally-shuttered waveguide element 830 that implements the hybrid shuttered waveguide 620 of FIG. 50C. It consists of the internally-shuttered design of FIG. 49A, combined with the external shutter of FIG. 51A. In general, a hybrid shuttered waveguide element 830 can be implemented using any suitable combination of internal and external shutters, including any of the internal shutter designs shown in FIGS. 49A through 49D, and any suitable blocking or reflecting external shutter, including any polarization rotator placed between a pair of linear polarizers (including twisted nematic rotators, FLC rotators, etc. [Sharp00]).

It may be desirable for the shuttered waveguide 620 to be transparent to ambient light, e.g. when utilized in a near-eye or head-mounted display. If the internal shutter 634 is transparent when closed, but the external shutter 652 is opaque when closed, then another advantage of the hybrid shuttered waveguide design of FIG. 50C is that the external shutters of inactive elements can be left open, and hence transparent, since the corresponding internal shutters can be closed and still remain transparent, allowing inactive elements to be transparent to ambient light.

Figure 52:
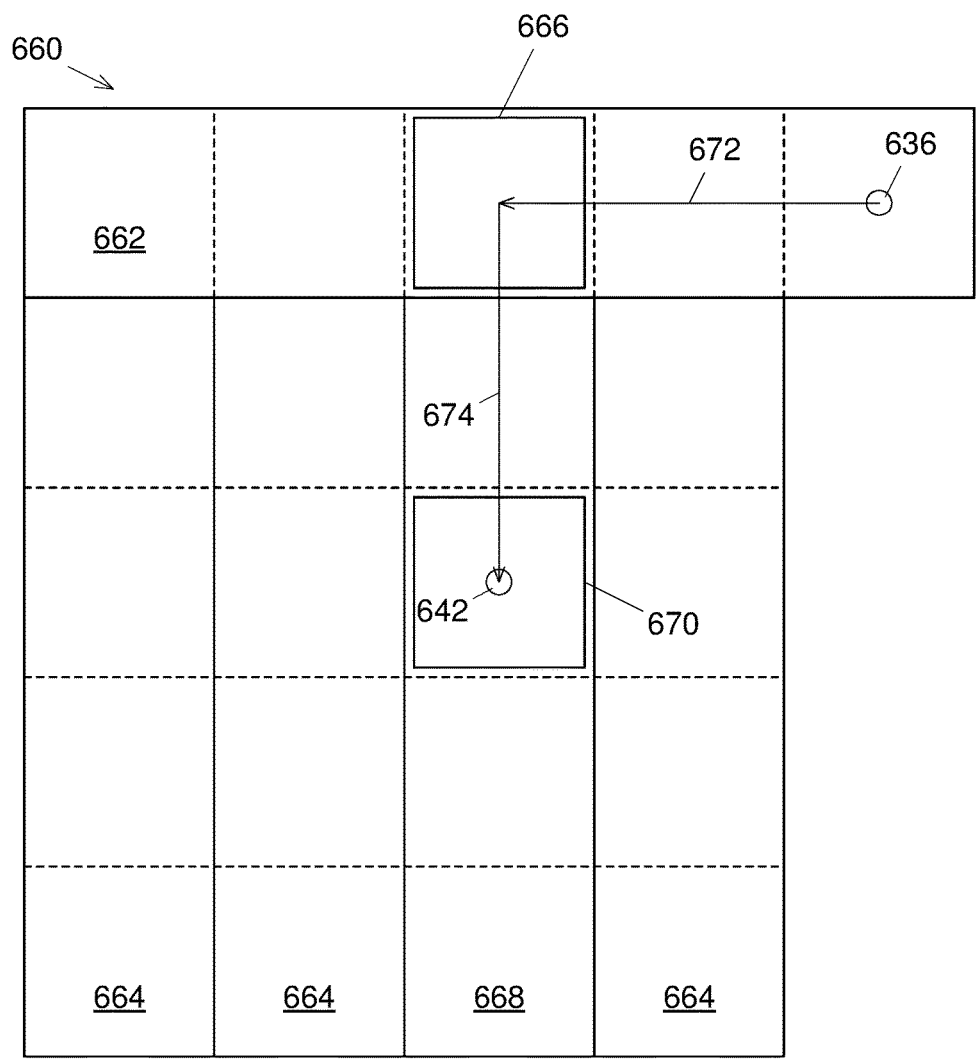
FIG. 52 shows a diagram of a shuttered 2D waveguide in display mode.

FIG. 52 shows a diagram of a shuttered 2D waveguide 660, i.e. a waveguide that can multiplex a single view image generator 452 or view image sensor 462 to/from a 2D array of display/camera elements. The shuttered 2D waveguide 660 consists of a shuttered row waveguide 662, e.g. implemented as a shuttered waveguide 620, and a set of shuttered column waveguides 664, e.g. each implemented as a shuttered waveguide 620. The shuttered 2D waveguide 660 is shown operating in display mode, but can equally operate in reverse in camera mode. A generated display ray 636 is coupled into the row waveguide 662 where it is transmitted via TIR as a set of row waveguide rays 672 in the usual way. An open column shutter 666 of the row waveguide 662 couples the ray into a selected column waveguide 668 where it is transmitted via TIR as a set of column waveguide rays 674. An open element shutter 670 of the selected column waveguide 668 couples the ray out of the waveguide as an exiting display ray 642. By selectively opening a different column shutter 666 and different element shutter 670, any element of the array can be addressed for output or input.

As an alternative to utilising multiple column waveguides 664, the 2D shuttered waveguide 660 can utilise a single 2D waveguide 620 with a 2D array of shutters, and a simple un-shuttered row waveguide, in place of the shuttered row waveguide 660, coupling light into the full width of the 2D waveguide via a weak coupling grating or hologram along its length.

Figure 53A:
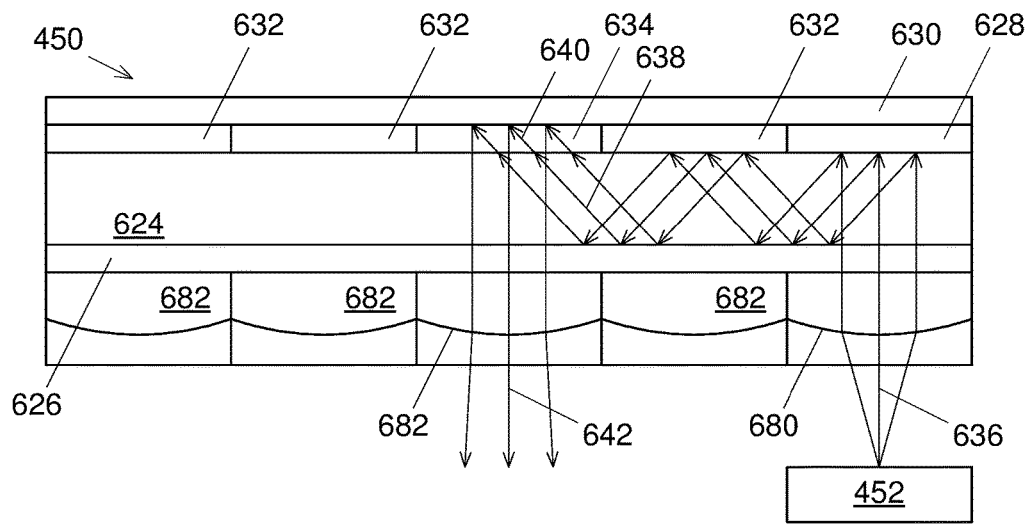
FIG. 53A shows a diagram of a multiplexed light field display module.

FIG. 53A shows a diagram of a multiplexed light field display module 450 utilising the shuttered waveguide 620 or the 2D shuttered waveguide 660, i.e. it provides an implementation of the display module shown in FIG. 44. The display module 620 includes a view image generator 452, a collimating lens 680 corresponding to the collimator 454, and per-element variable focus lenses 682 corresponding to the output focus modulators 530. The view image generator 452 generates the display rays 636 that are coupled into the waveguide. The collimating lens 680 collimates each beam of display rays 636 for transmission through the waveguide. The variable focus lenses 682 modulate the focus of each outgoing beam of display rays 642 to focus each beam at the required depth (typically corresponding to a virtual image behind the display).

If the shuttered waveguide 620 emits linearly polarized light and is transparent to light of the orthogonal polarization, then the variable-focus lenses 682 can be designed to be birefringent, as previously described in this specification, so that they only act on the polarization of the light emitted by the waveguide. The display module 450 is then transparent to ambient light of the orthogonal polarization. Conversely, if the shuttered waveguide 620 is only transparent to one polarization of light, e.g. if it incorporates linear polarizers in conjunction with a polarization rotator, then an additional controllable polarization rotator can be included in each element to allow the light emitted by the active element(s) to be selectively rotated to be acted upon by the corresponding birefringent variable-focus lens 682. Ambient light of the same polarization as the emitted light can then pass through inactive elements without being affected by the lenses 682.

Figure 53B:
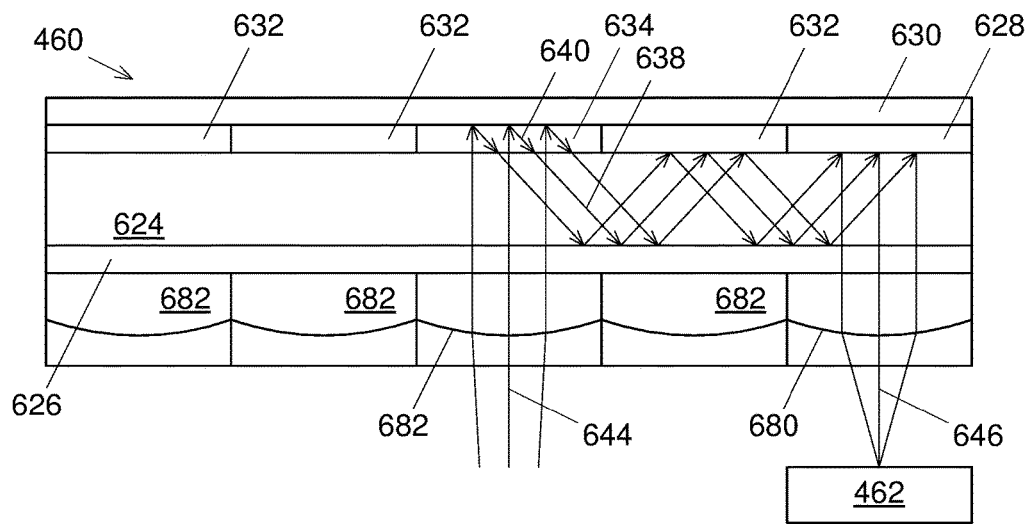
FIG. 53B shows a diagram of a multiplexed light field camera module.

FIG. 53B shows a diagram of a multiplexed light field camera module 460 utilising the shuttered waveguide 620 or the 2D shuttered waveguide 660, i.e. it provides an implementation of the camera module shown in FIG. 45. The camera module 460 includes a view image sensor 462, a collimating lens 680 corresponding to the decollimator 464, and per-element variable focus lenses 682 corresponding to the input focus modulators 612. The view image sensor 462 senses the camera rays 646 that are coupled out of the waveguide. The collimating lens 680 decollimates each beam of camera rays 646, focusing them onto the view image sensor 462. The variable focus lenses 682 modulate the focus of each incoming beam of camera rays 644 to focus each beam at the required depth in front of the camera.

For clarity, both FIG. 53A and FIG. 53B only show three rays of a single beam passing through the waveguide, exiting (or entering) the open shutter 634 at a right angle to the waveguide. In practice the waveguide transmits a collection of beams, limited by the smaller of the field of view of the view image generator 452 (or view image sensor 462) and the critical angle of the waveguide. Maximal use of the available field of view of the waveguide is achieved when the gratings 628 and 630 couple external orthogonal rays to the central field angle of the waveguide.

When the nominal position of a viewer relative to a display is approximately known, such as with a near-eye display, it can be advantageous to center the emitted field of each display element in the direction of the viewer. With the multiplexed light field display module 620, this can be achieved by varying the coupling angle of the second grating 630 along the waveguide to point in the direction of the viewer. With a light field display 200 comprising a set of multiplexed light field display modules 620 (e.g. one-dimensional modules), it can be achieved by rotating each waveguide about its longitudinal axis to point in the direction of the viewer.

If the viewing direction of the viewer is known, e.g. from eye tracking, then only a small number of display elements may be known to fall within the viewer's foveal field of view. In addition to the foveal optimisations described previously in this specification (and discussed further below), a shuttered waveguide 620 allows the additional optimisation of opening multiple adjacent shutters at once outside the foveal field, displaying the same view image 122 from all of them simultaneously (or capturing the same view image from all of them simultaneously). This has the effect of increasing the effective display aperture (or camera aperture) and therefore reducing depth of field, which is acceptable outside the foveal field. This requires another set of larger output focus modulators 530 (or input focus modulators 612), or variable focus lenses 682 in the case of the implementations of FIGS. 53A and 53B, matched in size to each group of shutters opened in unison. When a small focus modulator is in operation within the foveal field, the corresponding large focus modulator is set to infinite focus so it has no effect. When a large focus modulator is in operation outside the foveal field, the corresponding small focus modulator is set to infinite focus so it has no effect. More generally, any number of layers of focus modulators with varying sizes can be added and operated in this way.

Alternatively, a second display module 450 (or camera module 460) with larger elements can be layered with the first, with the second large-element module operated outside the foveal field and the first small-element module operated inside the foveal field. More generally, a light field display 200 (or light field camera 220) can contain any number of modules with varying element sizes layered and operated in this way.

Likewise, a two-way light field display 300 can consist of any number of two-way display modules 470 with varying element sizes layered and operated in this way, and/or any number of display modules 450 and camera modules 460 with varying element sizes layered and operated in this way. The display and camera modules are optionally arranged orthogonally in the plane so that they operate on orthogonal polarizations of light.

Figure 54A:
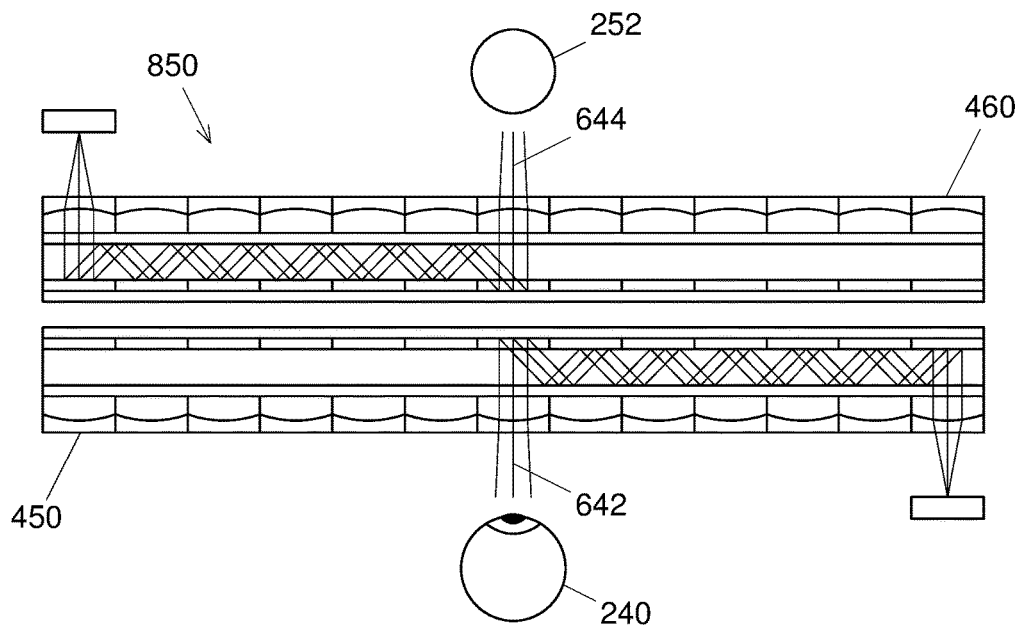
FIG. 54A shows a diagram of a multiplexed video see-through light field display module.

FIG. 54A shows a diagram of a multiplexed video see-through light field display module 850, consisting of a multiplexed light field camera module 460 mounted back-to-back with a multiplexed light field display module 450. For illustrative purposes, a focused bundle of rays 644 is shown entering the camera module 460 and being captured digitally, and then being re-generated and displayed as a focused bundle of rays 642 by the display module 450, optionally combined with other light field video and/or computer-generated graphics as required by the application, and optionally corrected for the viewer's vision. For illustrative purposes the display module 450 and camera module 460 are shown utilizing the internally-shuttered waveguide design of FIG. 47C. They could equally utilize the externally-shuttered waveguide design of FIG. 50B and the hybrid shuttered waveguide design of FIG. 50C.

Figure 54B:
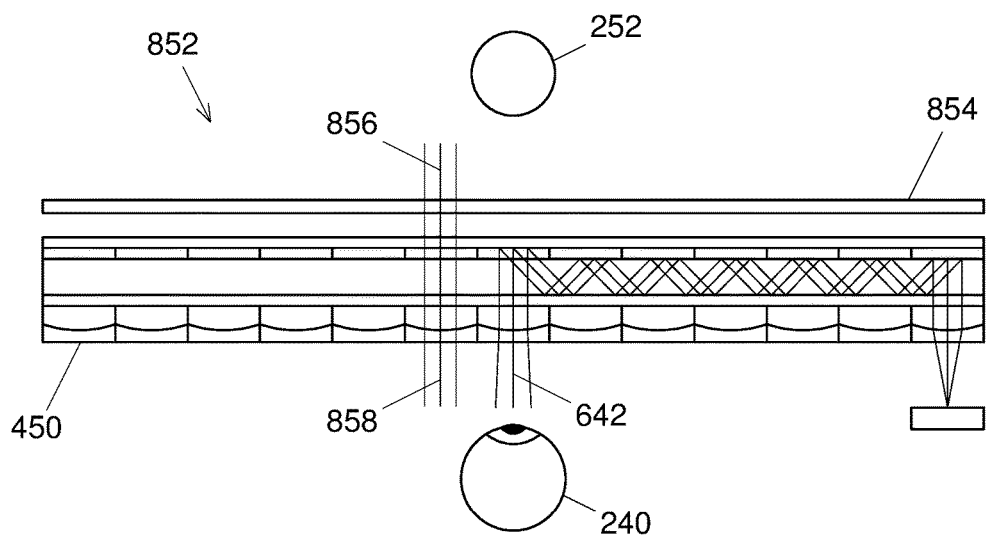
FIG. 54B shows a diagram of a multiplexed optical see-through light field display module.
Figure 56A:
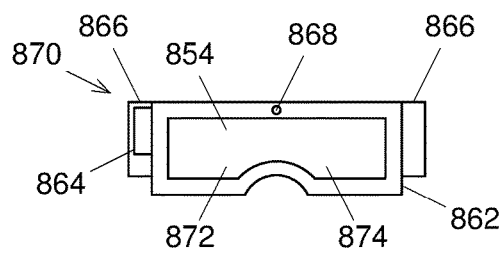
FIG. 56A shows a front elevation of an optical see-through head-mounted light field display.
Figure 56B:
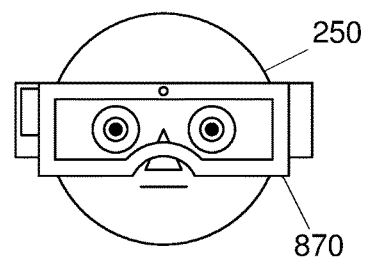
FIG. 56B shows a front elevation of an optical see-through head-mounted light field display, with viewer.
Figure 56C:
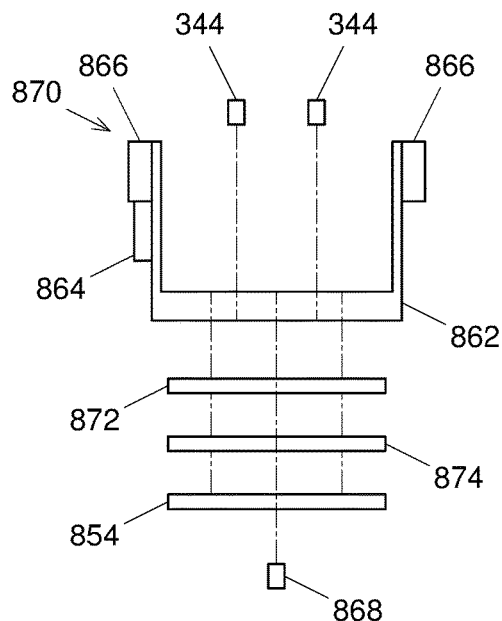
FIG. 56C shows an exploded plan view of an optical see-through head-mounted light field display.
Figure 56D:
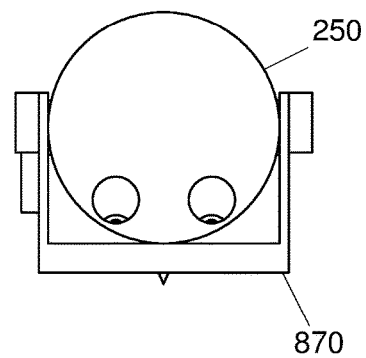
FIG. 56D shows a plan view of an optical see-through head-mounted light field display, with viewer.

FIG. 54B shows a diagram of a multiplexed optical see-through light field display module 852, consisting of a transparent multiplexed light field display module 450 and a linear polarizer 854. For illustrative purposes, a focused bundle of rays 642 is shown being generated and displayed by the display module 450, consisting of light field video and/or computer-generated graphics as required by the application, and optionally corrected for the viewer's vision.

The multiplexed light field display module 450 may emit light of one polarization and allow ambient light of the orthogonal polarization to pass unaffected. The linear polarizer 854 then ensures that of all ambient rays 856 impinging on the display module 852, only rays 858 with the correct polarization pass through the display module. Alternatively, as described previously in this specification, the light field display module 450 may emit light of one polarization and only allow ambient light of the same polarization to pass unaffected. The linear polarizer 854 then again ensures only rays 858 with the correct polarization pass through the display module.

Head-Mounted Light Field Display

FIGS. 55A through 55D show a video see-through head-mounted light field display 860 utilising an inward-facing light field display 200 and an outward-facing light field camera 220, i.e. utilising the back-to-back design previously described in this specification. As usual, the display 200 and camera 220 can both be two-way displays, allowing the viewer 250 of the HMD to remain visible to the outside world, and allowing video of the viewer's eyes to be transmitted remotely.

The light field display 200 may utilise one or more multiplexed light field display modules 450, and the light field camera 220 may utilise one or more multiplexed light field camera modules 460, i.e. the HMD 860 may utilise the design of the multiplexed video see-through light field display module 850 shown in FIG. 54A.

The HMD 860 can be used for both augmented reality (or mixed reality) (AR) applications and virtual reality (VR) applications. In the case of pure VR use, the outward-facing camera 220 is optional.

The HMD 860 consists of a head-worn frame 862 that holds the display 200, camera 220, and other components. The HMD includes a controller 864 that provides the various functions of the two-way display controller 322, as well as any other HMD-specific functions. A previously described in this specification, the controller 864 may operate independently, and/or it may receive/transmit light-field video and other data from/to external sources/targets, wirelessly and/or via a wired connection. The HMD may carry its own power supply, such as rechargeable battery or power generator, and/or it may be powered by cable to an external power supply.

The HMD 860 incorporates stereo headphones 866, or alternatively supports a headphone connection. The headphones 866 optionally incorporate stereo microphones.

The HMD 860 optionally incorporates one or more cameras 344 for tracking the viewer's gaze, as previously described in this specification. If the display 200 is a two-way display, then one or more of its two-way display elements may alternatively be used for tracking. The tracking cameras 344 may operate at several hundred frames per second in order to track saccades.

The HMD 860 optionally incorporates a range finder 868 for determining scene depth. It may consist of an emitter of ToF-coded light that is detected by individual elements of the camera 220, as previously described in this specification, or it may consist of a ToF-coded scanning laser and matching detector.

FIGS. 56A through 56D show an optical see-through head-mounted light field display 870 utilising an inward-facing transparent light field display 874, i.e. a light field display 200 that is transparent. As usual, the display 874 can be a two-way display 300, e.g. allowing video of the viewer's eyes to be transmitted remotely.

The transparent light field display 874 may utilise one or more multiplexed light field display modules 620, i.e. the HMD 870 may utilise the design of the multiplexed optical see-through light field display module 852 shown in FIG. 54B.

The HMD 870 optionally incorporates prescription optics 872 for correcting the viewer's vision. If the see-through light field display 874 only transmits one polarization of light clearly, then the HMD also incorporates a matching linear polarizer 854.

The optical see-through head-mounted light field display 870 can be used for both AR applications and VR applications. In the case of VR use, an optional opaque visor (not shown) can be closed to block ambient light. Alternatively or additionally the HMD can incorporate an electronically-controlled shutter for this purpose, such as a liquid crystal shutter, covering the entire display.

Other components of the HMD 870 are the same as in the HMD 860.

An advantage of an optical see-through near-eye light field display is that the registration between real imagery and imagery generated by the display is automatically maintained even as the viewer's head or eyes move relative to the display, without the need for calibration or eye tracking. Advantages of a video see-through near-eye light field display include automatic registration between real and generated imagery, as well as the ability for real objects to occlude generated objects based on depth.

The present invention has been described with reference to a number of preferred embodiments. It will be appreciated by someone of ordinary skill in the art that a number of alternative embodiments exist, and that the scope of the invention is only limited by the attached claims.

REFERENCES

The contents of the following publications, referred to within this specification, are herein incorporated by reference.

[Anguera07] X. Anguera et al, "Acoustic Beamforming for Speaker Diarization of Meetings", IEEE Transactions on Audio, Speech, and Language Processing, 15(7), September 2007

[Alatan07] A. A. Alatan et al, "Scene Representation Technologies for 3DTV—A Survey", IEEE Transactions on Circuits and Systems for Video Technology, 17(11), November 2007

[Amir03] A. Amir et al, "Calibration-Free Eye Gaze Tracking", U.S. Pat. No. 6,578,962, Jun. 17, 2003

[Aziz10] H. Aziz and J. A. Coggan, "Stacked OLED Structure", U.S. Pat. No. 7,750,561, Jul. 6, 2010

[Adelson91] E. H. Adelson and J. R. Bergen, "The Plenoptic Function and the Elements of Early Vision", Computational Models of Visual Processing, M. Landy and J. A. Movshon (eds), MIT Press, 1991, pp. 3-20

[Balogh06] T. Balogh, "Method and Apparatus for Displaying 3D Images", U.S. Pat. No. 6,999,071, Feb. 14, 2006

[Barabas11] J. Barabas et al, "Diffraction Specific Coherent Panoramagrams of Real Scenes", Proceedings of SPIE, Vol 7957, 2011

[Benzie07] P. Benzie et al, "A Survey of 3DTV Displays: Techniques and Technologies", IEEE Transactions on Circuits and Systems for Video Technology, 17(11), November 2007

[Berge07] B. Berge and J. Peseux, "Lens with Variable Focus", U.S. Pat. No. RE39,874, Oct. 9, 2007

[Bernstein02] J. Bernstein, "Multi-Axis Magnetically Actuated Device", U.S. Pat. No. 6,388,789, May 14, 2002

[Berreman80] D. W. Berreman, "Variable Focus Liquid Crystal Lens System", U.S. Pat. No. 4,190,330, Feb. 26, 1980

[Betke00] M. Betke et al, "Active Detection of Eye Scleras in Real Time", IEEE CVPR Workshop on Human Modeling, Analysis and Synthesis, 2000

[Brill98] M. H. Brill et al, "Prime Colors and Color Imaging", The Sixth Color Imaging Conference: Color Science, Systems and Applications, Nov. 17-20, 1998, IS&T

[Bright00] W. J. Bright, "Pipeline Analog-to-Digital Conversion System Using Double Sampling and Method of Operation", U.S. Pat. No. 6,166,675, Dec. 26, 2000

[Champion12] M. Champion et al, "Scanning Mirror Position Determination", U.S. Pat. No. 8,173,947, May 8, 2012

[Chang96] I-C. Chang, "Acousto-Optic Bragg Cell", U.S. Pat. No. 5,576,880, Nov. 19, 1996

[Chang06] C-L. Chang et al, "Light Field Compression Using Disparity-Compensated Lifting and Shape Adaptation", IEEE Transactions on Image Processing, 15(4), April 2006

[Connor11] R. A. Connor, "Holovision™ 3D Imaging with Rotating Light-Emitting Members", U.S. Pat. No. 7,978,407, Jul. 12, 2011

[deVries99] D. de Vries and M. M. Boone, "Wave Field Synthesis and Analysis Using Array Technology", Proceedings of the 1999 IEEE Workshop on Applications of Signal Processing to Audio and Acoustics, 17-20 Oct. 1999

[DiCarlo06] A. DiCarlo et al, "Yokeless Hidden Hinge Digital Micromirror Device", U.S. Pat. No. 7,011,415, Mar. 14, 2006

[Duchowski07] A. T. Duchowski, Eye Tracking Methodology—Theory and Practice, Second Edition, Springer 2007

[Fossum04] E. R. Fossum et al, "Active Pixel Sensor with Intra-Pixel Charge Transfer", U.S. Pat. No. 6,744,068, Jun. 1, 2004

[Fang08] J. Fang et al, "Wide-Angle Variable Focal Length Lens System", U.S. Pat. No. 7,359,124, Apr. 15, 2008

[Georgiev06] T. Georgiev et al, "Spatio-Angular Resolution Tradeoff in Integral Photography", Eurographics Symposium on Rendering, 2006

[Georgiev09] T. Georgiev et al, "Plenoptic Camera", U.S. Pat. No. 7,620,309, Nov. 17, 2009

[Gerhard00] G. J. Gerhard et al, "Scanned Display with Pinch, Timing and Distortion Correction", U.S. Pat. No. 6,140,979, Oct. 31, 2000

[Girod03] B. Girod et al, "Light Field Compression Using Disparity-Compensated Lifting", 2003 IEEE International Conference on Multimedia and Expo, July 2003

[Glassner89] A. S. Glassner (ed.), An Introduction to Ray Tracing, Academic Press, 1989

[Hamadani98] M. Hamadani and R-S. Kao, "MPEG Encoding and Decoding System for Multimedia Applications", U.S. Pat. No. 5,845,083, Dec. 1, 1998

[Hansen10] D. W. Hansen and Q. Ji, "In the Eye of the Beholder: A Survey of Models for Eyes and Gaze", IEEE Transactions on Pattern Analysis and Machine Intelligence, 32(3), March 2010

[Hartridge22] H. Hartridge, "Visual Acuity and the Resolving Power of the Eye", The Journal of Physiology, 57(1-2), Dec. 22, 1922

[Higuchi10] Y. Higuchi and K. Omae, "Method of Manufacturing Nitride Semiconductor Light Emitting Element and Nitride Semiconductor Light Emitting Element", US Patent Application Publication No. 2010/0098127, Apr. 22, 2010

[Hirabayashi95] Y. Hirabayashi et al, "Moving Magnet-Type Actuator", U.S. Pat. No. 5,434,549, Jul. 18, 1995

[Hoffman08] D. M. Hoffman et al, "Vergence-Accommodation Conflicts Hinder Visual Performance and Cause Visual Fatigue", Journal of Vision, 8(3):33, 28 Mar. 2008

[Hornbeck96] L. J. Hornbeck, "Active Yoke Hidden Hinge Digital Micromirror Device", U.S. Pat. No. 5,535,047, Jul. 9, 1996

[Hua11] G. Hua et al, "Face Recognition Using Discriminatively Trained Orthogonal Tensor Projections", U.S. Pat. No. 7,936,906, May 3, 2011

[Imai11] T. Imai et al, "Variable-Focal Length Lens", U.S. Pat. No. 8,014,061, Sep. 6, 2011

[Isaksen00] A. Isaksen et al, "Dynamically Reparameterized Light Fields", Proceedings of the 27th Annual Conference on Computer Graphics and Interactive Techniques, A C M, 2000

[Jacob07] S. A. Jacob, "Variable Focal Length Electro-Optic Lens", US Patent Application Publication No. 2007/0070491, Mar. 29, 2007

[Jones03] M. J. Jones and P. Viola, "Fast Multi-View Face Detection", Mitsubishi Electric Research Laboratories TR2003-96, August 2003

[Jones06] M. J. Jones and P. Viola, "Method and System for Object Detection in Digital Images", U.S. Pat. No. 7,099,510, Aug. 29, 2006

[Kasahara11] D. Kasahara et al, "Demonstration of Blue and Green GaN-Based Vertical-Cavity Surface-Emitting Lasers by Current Injection at Room Temperature", Applied Physics Express, 4(7), July 2011

[Kolb09] A. Kolb et al, "Time-of-Flight Sensors in Computer Graphics", Eurographics Conference 2009

[Kobayashi91] K. Kobayashi, "Laser Beam Scanning System", U.S. Pat. No. 4,992,858, Feb. 12, 1991

[Koike08] T. Koike et al, "Three-Dimensional Display Device", US Patent Application Publication No. 2008/0036759, Feb. 14, 2008

[Kowel86] G. T. Kowel et al, "Adaptive Liquid Crystal Lens", U.S. Pat. No. 4,572,616, Feb. 25, 1986

[Lazaros08] N. Lazaros et al, "Review of Stereo Vision Algorithms: from Software to Hardware", International Journal of Optomechatronics, 2, 2008

[Levinson96] R. A. Levinson and S. T. Ngo, "Pipelined Analog to Digital Converter", U.S. Pat. No. 5,572,212, Nov. 5, 1996

[Levoy96] M. Levoy and P. Hanrahan, "Light Field Rendering", Proceedings of the 23rd Annual Conference on Computer Graphics and Interactive Techniques, A C M, 1996

[Levoy00] M. Levoy and P. Hanrahan, "Method and System for Light Field Rendering", U.S. Pat. No. 6,097,394, Aug. 1, 2000

[Lin11] H-C. Lin et al, "A Review of Electrically Tunable Focusing Liquid Crystal Lenses", Transactions on Electrical and Electronic Materials, 12(6), 25 Dec. 2011

[Lienhart03] R. Lienhart et al, "A Detector Tree of Boosted Classifiers for Real-Time Object Detection and Tracking", Proceedings of the 2003 International Conference on Multimedia and Expo—Volume 1, 2003

[Love09] G. D. Love et al, "High-Speed Switchable Lens Enables the Development of a Volumetric Stereoscopic Display", Optics Express 17(18), 31 Aug. 2009

[Lu09] T-C. Lu et al, "Development of GaN-Based Vertical cavity Surface-Emitting Lasers", IEEE Journal of Selected Topics in Quantum Electronics, 15(3), May/June 2009

[Maserjian89] J. Maserjian, "Multiple Quantum Well Optical Modulator", U.S. Pat. No. 4,818,079, Apr. 4, 1989

[Melville97] C. D. Melville, "Position Detection of Mechanical Resonant Scanner Mirror", U.S. Pat. No. 5,694,237

[Merrill05] R. B. Merrill and R. A. Martin, "Vertical Color Filter Sensor Group and Semiconductor Integrated Circuit Fabrication Method for Fabricating Same", U.S. Pat. No. 6,894,265, May 17, 2005

[Mizoguchi04] H. Mizoguchi et al, "Visually Steerable Sound Beam Forming System Based On Face Tracking and Speaker Array", Proceedings of the 17th International Conference on Pattern Recognition, 23-26 Aug. 2004

[Moreton05] H. P. Moreton et al, "User Programmable Geometry Engine", U.S. Pat. No. 6,900,810, May 31, 2005

[Muller11] K. Muller et al, "3-D Video Representation using Depth Maps", Proceedings of the IEEE, 99(4), April 2011

[Naganuma09] K. Naganuma et al, "High-Resolution KTN Optical Beam Scanner", NTT Technical Review 7(12), 12 Dec. 2009

[Nakamura10] K. Nakamura et al, "Electrooptic Device", U.S. Pat. No. 7,764,302, Jul. 27, 2010

[Naumov99] A. F. Naumov et al, "Control Optimization of Spherical Modal Liquid Crystal Lenses", Optics Express 4(9), April 1999

[Neukermans97] A. P. Neukermans and T. G. Slater, "Micromachined Torsional Scanner", U.S. Pat. No. 5,629,790, May 13, 1997

[Ng05a] R. Ng et al, "Light Field Photography with a Hand-held Plenoptic Camera", Stanford Tech Report CTSR 2005-02, 2005

[Ng05b] R. Ng, "Fourier Slice Photography", ACM Transactions on Graphics, 24(3), July 2005

[Nishio09] M. Nishio and K. Murakami, "Deformable Mirror", U.S. Pat. No. 7,474,455, Jan. 6, 2009

[Oggier11] T. Oggier et al, "On-Chip Time-Based Digital Conversion of Pixel Outputs", U.S. Pat. No. 7,889,257, Feb. 15, 2011

[Ong93] E. Ong et al, "Static Accommodation in Congenital Nystagmus", Investigative Ophthalmology & Visual Science, 34(1), January 1993

[Palmer99] S. E. Palmer, Vision Science—Photons to Phenomenology, MIT Press, 1999

[Patel78] M. P. Patel, "Bucket Brigade Circuit", U.S. Pat. No. 4,130,766, Dec. 19, 1978

[Petersen82] C. C. Petersen, "Linear Motor", U.S. Pat. No. 4,363,980, Dec. 14, 1982

[Plainis05] S. Plainis et al, "The Effect of Ocular Aberrations on Steady-State Errors of Accommodative Response", Journal of Vision, 5(5):7, 23 May 2005

[Qi05] J. Qi et al, "Tailored Elliptical Holographic Diffusers for LCD Applications", Journal of the SID, 13(9), 2005

[Saleh07] B. E. A. Saleh and M. C. Teich, Fundamentals of Photonics (Second Edition), Wiley, 2007

[Sangster77] F. L. J. Sangster, "Charge Transfer Device", U.S. Pat. No. 4,001,862, Jan. 4, 1977

[Schwerdtner06] A. Schwerdtner et al, "Device for Holographic Reconstruction of Three-Dimensional Scenes", US Patent Application Publication No. 2006/0250671, Nov. 9, 2006

[Seitz06] S. M. Seitz et al, "A Comparison and Evaluation of Multi-View Stereo Reconstruction Algorithms", IEEE Computer Society Conference on Computer Vision and Pattern Recognition, 17-22 Jun. 2006

[Shechter02] R. Shechter et al, "Compact Beam Expander with Linear Gratings", Applied Optics 41(7), 1 Mar. 2002

[Sharp00] G. D. Sharp, "Switchable Achromatic Polarization Rotator", U.S. Pat. No. 6,097,461, Aug. 1, 2000

[Shibaguchi92] T. Shibaguchi, "Electrooptic Device", U.S. Pat. No. 5,140,454, Aug. 18, 1992

[Shih00] S-W. Shih and J. Liu, "A Calibration-Free Gaze Tracking Technique", Proceedings of the 15th International Conference on Pattern Recognition, 3-7 Sep. 2000

[Simmonds11] M. D. Simmonds and R. K. Howard, "Projection Display", U.S. Pat. No. 7,907,342, Mar. 15, 2011

[Spors08] S. Spors et al, "The Theory of Wave Field Synthesis Revisited", 124th Convention of the Audio Engineering Society, 17-20 May 2008

[Svelto10] 0. Svelto, Principles of Lasers (Fifth Edition), Springer, 2010

[Szeliski99] R. S. Szeliski and P. Golland, "Method for Performing Stereo Matching to Recover Depths, Colors and Opacities of Surface Elements", U.S. Pat. No. 5,917,937, Jun. 29, 1999

[Tashev08] I. Tashev and H. Malvar, "System and Method for Beamforming Using a Microphone Array", U.S. Pat. No. 7,415,117, Aug. 19, 2008

[Titus99] C. M. Titus et al, "Efficient, Accurate Liquid Crystal Digital Light Deflector", Proc. SPIE Vol. 3633, Diffractive and Holographic Technologies, Systems, and Spatial Light Modulators VI, June 1999

[Tompsett78] M. F. Tompsett, "Charge Transfer Imaging Devices", U.S. Pat. No. 4,085,456, Apr. 18, 1978

[Turk92] M. Turk and A. P. Pentland, "Face Recognition System", U.S. Pat. No. 5,164,992, Nov. 17, 1992

[Turner05] A. M. Turner et al, "Pulse Drive of Resonant MEMS Devices", U.S. Pat. No. 6,965,177, Nov. 15, 2005

[Urey11] H, Urey and M. Sayinta, "Apparatus for Displaying 3D Images", US Patent Application Publication No. 2011/0001804, Jan. 6, 2011

[Vallese70] L. M. Vallese, "Light Scanning Device", U.S. Pat. No. 3,502,879, Mar. 24, 1970

[VanVeen88] B. D. Van Veen and K. M. Buckley, "Beamforming: A Versatile Approach to Spatial Filtering", IEEE ASSP Magazine, April 1988

[Vetro11] A. Vetro et al, "Overview of the Stereo and Multiview Video Coding Extensions of the H.264/MPEG-4 AVC Standard", Proceedings of the IEEE, 99(4), April 2011

[Vetterli09] M. Vetterli and F. P. C. Pinto, "Audio Wave Field Encoding", US Patent Application Publication No. 2009/0248425, Oct. 1, 2009

[vonGunten97] M. K. von Gunten and P. Bevis, "Broad Band Polarizing Beam Splitter", U.S. Pat. No. 5,625,491, Apr. 29, 1997

[Watanabe96] M. Watanabe, "Minimal Operator Set for Passive Depth from Defocus", Proceedings of the IEEE Computer Society Conference on Computer Vision and Pattern Recognition, 18-20 Jun. 1996

[Wilburn05] B. Wilburn et al, "High Performance Imaging Using Large Camera Arrays", ACM Transactions on Graphics—Proceedings of ACM SIGGRAPH 2005

[Wilburn11] B. Wilburn et al, "Apparatus and Method for Capturing a Scene Using Staggered Triggering of Dense Camera Arrays", U.S. Pat. No. 8,027,531, Sep. 27, 2011

[Xiaobol0] C. Xiaobo et al, "A 12 bit 100 MS/s pipelined analog to digital converter without calibration", Journal of Semiconductors 31(11), November 2010

[Yan06] J. Yan et al, "MEMS Scanner with Dual Magnetic and Capacitive Drive", U.S. Pat. No. 7,071,594, Jul. 4, 2006

[Yaras10] F. Yaras et al, "State of the Art in Holographic Displays", Journal of Display Technology, 6(10), October 2010

The invention claimed is:

1. A light field display device comprising at least one multiplexed light field display module, the multiplexed light field display module comprising a view image generator, a waveguide, and a set of first shutters spatially distributed along the waveguide, the view image generator optically coupled to the waveguide, the waveguide optically coupled to each first shutter, the view image generator operable to generate a set of beams of light from one of a set of view images, the waveguide configured to transmit the set of beams along its length via internal reflection, each first shutter operable to be switched between a closed state and an open state, the closed state of the first shutter configured to prevent the beams from escaping the waveguide, the closed state of the first shutter configured to allow the beams to propagate along the waveguide past the first shutter, the open state of the first shutter configured to allow the beams to escape the waveguide, the module operable to generate, over time, the set of beams from a different one of the set of view images, and to open, over time, a different subset of the set of first shutters, thereby to allow the set of beams escaping from the subset to correspond to a different one of the set of view images.

2. The device of claim 1, wherein the set of view images constitute a light field frame.

3. The device of claim 1, wherein the set of view images constitute a light field video.

4. The device of claim 1, further comprising a set of focus modulators, each focus modulator optically coupled to a subset of the set of first shutters, each focus modulator operable to impart a specified focus to the set of beams escaping the subset.

5. The device of claim 1, wherein the waveguide comprises a core at least partially surrounded by a cladding, the core having a larger refractive index than the cladding, thereby to allow the waveguide to transmit the set of beams along its length via total internal reflection.

6. The device of claim 5, wherein the first shutter is opened by overcoming total internal reflection.

7. The device of claim 5, wherein the first shutter is opened by activating a grating configured to couple the set of beams out of the waveguide.

8. The device of claim 5, wherein the first shutter comprises a birefringent liquid crystal cell adjacent to the core, and the first shutter is opened by switching the cell to select a refractive index of the cell matching the core refractive index, thereby to overcome total internal reflection.

9. The device of claim 5, wherein the core incorporates a surface relief grating with a refractive index matching the core refractive index, the grating is configured to couple the set of beams out of the waveguide, the first shutter comprises a birefringent liquid crystal cell adjacent to the grating, and the first shutter is opened by switching the cell to select a refractive index of the cell not matching the grating refractive index, thereby to activate the grating.

10. The device of claim 5, wherein the cladding on at least one side is birefringent, the first shutter comprises a polarization rotator, and the first shutter is opened by switching the rotator to rotate a polarization of the set of beams to select a refractive index of the birefringent cladding matching the core refractive index, thereby to overcome total internal reflection.

11. The device of claim 5, wherein the core incorporates a grating configured to weakly couple the set of beams out of the waveguide, thereby to allow the waveguide to act as an exit pupil expander.

12. The device of claim 11, wherein the first shutter comprises a polarization rotator sandwiched between two linear polarizers, and the first shutter is opened by switching the rotator to rotate a polarization of the set of beams to match a relative rotation of the two linear polarizers.

13. The device of claim 1, further comprising a set of second shutters spatially distributed along the waveguide, the waveguide optically coupled to each second shutter, each second shutter operable to be switched between a closed state and an open state, the closed state of the second shutter configured to prevent the beams from escaping the waveguide, the open state of the second shutter configured to allow the beams to escape the waveguide when a corresponding one of the set of first shutters is also open.

14. The device of claim 13, wherein the set of view images constitute a light field frame.

15. The device of claim 13, wherein the set of view images constitute a light field video.

16. The device of claim 13, further comprising a set of focus modulators, each focus modulator optically coupled to a subset of the set of first shutters, each focus modulator operable to impart a specified focus to the set of beams escaping the subset.

17. The device of claim 13, wherein the waveguide comprises a core at least partially surrounded by a cladding, the core having a larger refractive index than the cladding, thereby to allow the waveguide to transmit the set of beams along its length via total internal reflection.

18. The device of claim 17, wherein the first shutter is opened by overcoming total internal reflection.

19. The device of claim 17, wherein the first shutter comprises a birefringent liquid crystal cell adjacent to the core, and the first shutter is opened by switching the cell to select a refractive index of the cell matching the core refractive index, thereby to overcome total internal reflection.

20. The device of claim 19, wherein the second shutter comprises a polarization rotator sandwiched between two linear polarizers, and the second shutter is opened by switching the rotator to rotate a polarization of the set of beams to match a relative rotation of the two linear polarizers.

* * * * *